United States Patent [19]
Kanegae et al.

[11] Patent Number: 5,841,602
[45] Date of Patent: Nov. 24, 1998

[54] PRML REGENERATING APPARATUS

[75] Inventors: Masahide Kanegae; Masao Kondou, both of Kawasaki, Japan

[73] Assignee: Fujitsu Limited, Kawasaki, Japan

[21] Appl. No.: 715,040

[22] Filed: Sep. 17, 1996

Related U.S. Application Data

[62] Division of Ser. No. 400,720, Mar. 8, 1995.

[30] Foreign Application Priority Data

| Mar. 18, 1994 | [JP] | Japan | 6-074435 |
| Mar. 18, 1994 | [JP] | Japan | 6-074436 |
| Apr. 27, 1994 | [JP] | Japan | 6-112029 |
| May 31, 1994 | [JP] | Japan | 6-141233 |
| Jun. 3, 1994 | [JP] | Japan | 6-145338 |

[51] Int. Cl.$^6$ .................................................. G11B 5/09
[52] U.S. Cl. ............................ 360/51; 360/65; 360/46; 360/50
[58] Field of Search ............................. 360/65, 46, 51, 360/50; 375/262, 341

[56] References Cited

U.S. PATENT DOCUMENTS

| 4,272,729 | 6/1981 | Riley, Jr. . | |
| 4,644,564 | 2/1987 | Dolivo et al. . | |
| 4,707,681 | 11/1987 | Eggenberger et al. . | |
| 4,786,890 | 11/1988 | Marcus et al. | 341/81 |
| 4,888,775 | 12/1989 | Karabed et al. . | |
| 4,970,609 | 11/1990 | Cunningham et al. | 360/51 |
| 5,060,088 | 10/1991 | Dolivo et al. | 360/46 |
| 5,105,316 | 4/1992 | Cronch et al. . | |
| 5,222,002 | 6/1993 | Hase et al. . | |
| 5,248,970 | 9/1993 | Sooch et al. . | |
| 5,367,411 | 11/1994 | Nishiyama et al. . | |

(List continued on next page.)

FOREIGN PATENT DOCUMENTS

| 0369962 | 5/1990 | European Pat. Off. . |
| 4120270 | 9/1992 | Germany . |
| 59-132406 | 7/1984 | Japan . |
| 60-124005 | 7/1985 | Japan . |
| 61-102831 | 5/1986 | Japan . |
| 62-101128 | 5/1987 | Japan . |
| 63-201954 | 8/1988 | Japan . |
| 63-304407 | 12/1988 | Japan . |

(List continued on next page.)

OTHER PUBLICATIONS

IBM TDB, vol. 36, No. 3, pp. 457 to 467; Mar. 1993.
Tietze/Schenk, Halbleiter–Schaltungstechnik, 6th Edition; Springer Publications; Berlin, Hidelberg, New York, Tokyo; pp. 745 to 747; 1983.
M.J. Ferguson, *Optimal Reception for Binary Partial–Response Channels*, The Bell System Technical Journal, vol. 51, No. 2, pp. 493–505, Feb., 1972.

(List continued on next page.)

*Primary Examiner*—Aristotelis M. Psitos
*Assistant Examiner*—Alan Faber
*Attorney, Agent, or Firm*—Greer, Burns & Crain Ltd.

[57] ABSTRACT

Disclosed is a PRML regenerating apparatus for regenerating a signal read by a head from a storage medium. This PRML regenerating apparatus has a waveform equalizing circuit for waveform-equalizing the read signal, a maximum-likelihood decoder for maximum-likelihood-decoding, after obtaining a determination value by comparing the equalized output with upper and lower slice levels, this determination value and a control circuit for setting variable a distance between the upper slice level and the lower slice level of the maximum-likelihood decoder. The distance between the upper and lower slice levels can be thereby set variable in accordance with an equalization characteristic. A ternary determination circuit of the maximum-likelihood decoder is constructed of a memory for storing a correspondence table of the equalized output and the upper or lower slice level versus the determination result and the next upper or lower slice level. The ternary determination circuit can be thereby actualized with a simple configuration.

2 Claims, 40 Drawing Sheets

U.S. PATENT DOCUMENTS

| | | | |
|---|---|---|---|
| 5,406,427 | 4/1995 | Shimoda | 360/51 |
| 5,442,492 | 8/1995 | Cunningham et al. . | |
| 5,442,760 | 8/1995 | Abbott et al. . | |
| 5,459,679 | 10/1995 | Ziperovich . | |
| 5,526,200 | 6/1996 | Yada . | |
| 5,638,225 | 6/1997 | Tsuboi et al. . | |

FOREIGN PATENT DOCUMENTS

| | | |
|---|---|---|
| 63-304409 | 12/1988 | Japan . |
| 178523 | 3/1989 | Japan . |
| 1143082 | 6/1989 | Japan . |
| 1276919 | 11/1989 | Japan . |
| 1293718 | 11/1989 | Japan . |
| 22216 | 1/1990 | Japan . |
| 2164128 | 6/1990 | Japan . |
| 46914 | 1/1992 | Japan . |
| 4162263 | 6/1992 | Japan . |
| 4192161 | 7/1992 | Japan . |
| 4195773 | 7/1992 | Japan . |
| 4195774 | 7/1992 | Japan . |
| 2223063 | 9/1992 | Japan . |

OTHER PUBLICATIONS

F. Dolivo, W. Scott and G. Ungerbock, *Fast Timing Recovery For Partial–Response Signaling Systems*, 1989 IEEE CH2655–9/89/0000–0573, pp. 573–577.

IEEE Transactions on Magnetics, vol. 31, No. 2., Mar. 1995, pp. 1003 to 1108.

Fig. 9

| CYLINDER ADDRESS | HEAD 0 | | | ~ | HEAD n | | |
|---|---|---|---|---|---|---|---|
| | DRIVE CURRENT | FILTER VALUE | FILTER COEFFICIENT | | DRIVE CURRENT | FILTER VALUE | FILTER COEFFICIENT |
| 0 | | | | | | | |
| ~ | | | | | | | |
| m | | | | | | | |

Fig. 14
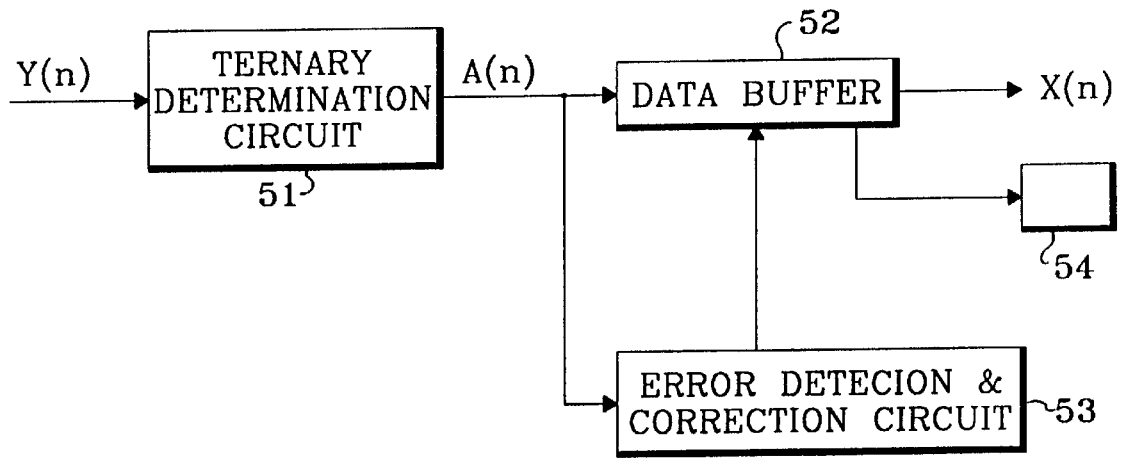
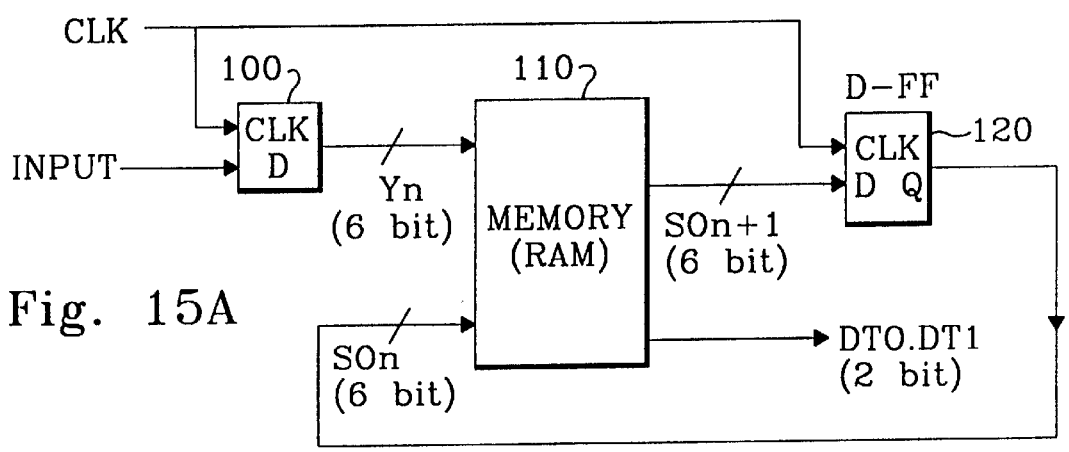
Fig. 15A
| An | DT0 | DT1 |
|----|-----|-----|
| +1 | 1   | 0   |
| 0  | 0   | 0   |
| −1 | 0   | 1   |
Fig. 15B

| SO(n) | | | Y(n) | | SO(n+1) | |
|---|---|---|---|---|---|---|
| 00 | SO(n+1) | DT0/DT1 | | 3F | DT0/DT1 | |
| | 00 | 10 | | | 3F | 10 |
| | | | | | | |
| 3F | | | | | | |

Fig. 16

PRML REGENERATING APPARATUS

This is a divisional of copending application Ser. No. 08/400,720 filed on Mar. 8, 1995 pending.

BACKGROUND OF THE INVENTION

1. Field of the Invention

The present invention relates to a PRML regenerating apparatus making use of partial-response signaling with a maximum-likelihood sequence detection.

2. Description of the Related Art

A PRML (Partial-Response Signaling with Maximum-Likelihood Sequence Detection) has been utilized for enhancing a recording density of the magnetic disc and a magneto-optic disc apparatus in recent years. In such a PRML system, a PRML regenerating apparatus for regenerating a read signal is provided.

In a disc storage apparatus making use of the partial-response signaling, the regenerating apparatus is constructed of a waveform equalizing circuit and a maximum-likelihood decoder. A receiving filter of the waveform equalizing circuit of this regenerating circuit equalize-shapes an output signal of a record channel into a partial-response signal. Then, the maximum-likelihood sequence detector (maximum-likelihood decoder) performs, after making a ternary determination of the equalizing signal, the maximum-likelihood detection and thus reconstructs a recorded data string.

This type of PRML regenerating apparatus is disclosed in the specifications of U.S. Pat. No. 5,060,088, U.S. Pat. No. 4,644,564, U.S. Pat. No. 4,707,681, U.S. Pat. No. 4,786,890 and U.S. Pat. No. 4,888,775.

In the conventional PRML regenerating apparatus, parameters of the waveform equalizing circuit and the maximum-likelihood decoder are set to fixed values when delivered from the manufacturer of the apparatus. Therefore, characteristics of the waveform equalizing circuit and the maximum-likelihood decoder are also fixed. For example, in a ternary determination circuit of the maximum-likelihood decoder, a distance between two slice levels for slicing the input signal is fixed.

As a matter of fact, however, a sample signal quality is deteriorated due to a defect on a magnetic medium. Further, there is also the deterioration in terms of the sample signal quality in a case where a signal-to-signal interference described by a polynomial (1-D) can not be quantitatively controlled due to an equalization error. In addition, there exists the deterioration of the signal quantity that is derived from a scatter in terms of characteristics of an MR (magneto-resistive) head. If the equalization error occurs because of the characteristics of the above head, the magnetic medium and the waveform equalizing circuit, there arises such a problem that effective maximum-likelihood decoding can not be executed according to the prior art in which the distance between the above slice levels is fixed.

Besides, if the characteristics of the head and the waveform equalizing circuit are not proper, a problem is caused, wherein the equalization error is often produced, and an optimum regeneration can not be performed.

Further, the conventional PRML regenerating apparatus presents a problem in which a configuration thereof is complicated.

SUMMARY OF THE INVENTION

It is a primary object of the present invention to provide a PRML regenerating apparatus for minimizing an equalization error.

It is another object of the present invention to provide a PRML regenerating apparatus for executing proper maximum-likelihood decoding by optimally setting a distance between slice levels.

It is still another object of the present invention to provide a PRML regenerating apparatus for minimizing an equalization error by optimally setting a head characteristic.

It is a further object of the present invention to provide a PRML regenerating apparatus for minimizing an equalization error by optimally setting a characteristic of a waveform equalizing circuit.

It is a still further object of the present invention to provide a PRML regenerating apparatus for simplifying a configuration of a circuit.

To accomplish the objects given above, according to a first aspect of the present invention, there is provided a PRML regenerating apparatus for regenerating a signal read by a head from a storage disc, comprising: a waveform equalizing circuit for waveform-equalizing the read signal; a maximum-likelihood decoder for maximum-likelihood-decoding, a determination value by comparing the equalized output with upper and lower slice levels; and a control circuit for setting variable a distance between the upper slice level and the lower slice level of the maximum-likelihood decoder.

In this first aspect of the present invention, the control circuit sets variable a distance between the slice levels of the maximum-likelihood decoder, whereby an optimum ternary determination corresponding to an equalization error quantity can be performed.

According to a second aspect of the present invention, there is provided a PRML regenerating apparatus for regenerating a signal read by a head from a storage disc, comprising: a waveform equalizing circuit for waveform-equalizing the read signal; and a maximum-likelihood decoder for maximum-likelihood-decoding, after obtaining a determination value by comparing the equalized output with upper and lower slice levels. The maximum-likelihood decoder includes: a ternary determination circuit for making a ternary determination by comparing the equalized output with the upper and lower slice levels and, at the same time, changing the upper and lower slice levels in accordance with a result of the determination, the ternary determination circuit being constructed of a memory for storing a correspondence table of the equalized output and the upper or lower slice level versus the determination result and the next upper or lower slice level; a data buffer for holding the ternary determination signal; and a correction circuit for correcting the ternary determination signal of the data buffer by detecting an error from the consecutive ternary determination signals.

In this second aspect of the present invention, the ternary determination circuit involves the use of the memory for storing the conversion table. In the ternary determination, when the sample value (equalization output) and one of the present slice levels are established, a result of the ternary determination and the next slice level become obvious. Then, there is provided the conversion table which stores the ternary determination result and the next slice level that correspond to the sample value and the present slice level. Then, with the sample value and the present slice level serving as inputs, the corresponding ternary determination result and next slice level are obtained by searching the conversion table.

When constructed in this way, the ternary determination can be performed simply by providing the memory, and this leads to a simpler configuration. Further, the ternary determination can be effected simply by accessing the memory, and it is therefore possible to make the ternary determination at a high speed. Moreover, the ternary determination characteristic may be changed as in the case of changing the distance between the slice levels only by varying the content of the memory. Therefore, the determination characteristic can be easily changed.

According to a third aspect of the present invention, there is provided a PRML regenerating apparatus for regenerating a signal read by a head from a storage discs comprising: a waveform equalizing circuit for waveform-equalizing the read signal; and a maximum-likelihood decoder for maximum-likelihood-decoding a determination value by comparing the equalized output with upper and lower slice levels. The waveform equalizing circuit includes: a gain control amplifier for imparting a gain to the read signal; an electric filter for fixedly equalizing an output of the gain control amplifier; an analog-to-digital converter for converting an output of the electric filter into a digital value; a cosine equalizer for equalizing an output of the analog-to-digital converter; a subtracter for generating n-bit amplitude error signals by subtracting a target amplitude from the equalized output; m-pieces (m<n) of charge pump circuits for outputting electric currents corresponding to weights of the respective bits to the gain control amplifier; and a multiplexer for selecting high-order m-bits from the n-bit error signals when in a pull-in operation and low-order m-bits therefrom when in a steady operation and outputting the selected bits to the charge pump circuits.

In this third aspect of the present invention, when the error quantity in the pull-in operation is large, the low-order bits exert a small influence on the control quantity, whereas the high-order bits exert a large influence on the control quantity. Contrastingly, when there is a small fluctuation in the steady operation, the high-order bits exert the small influence on the control quantity, whereas the low-order bits exert the large influence on the control quantity. For this reason, when in the pull-in operation, the control is conducted based on the high-order bits. When the fluctuation is small after the data in the steady operation have been substantially converged, the control is performed based on the low-order bits. Accordingly, the multiplexer selects the high- and low-order bits depending on the pull-in operation and the steady operation. In consequence of this, with respect to n-bit inputs, a smaller number, i.e., m-pieces of charge pump circuits are capable of converting the digital error signal into the analog control quantity. Hence, the number of the charge pump circuits can be reduced.

According to a fourth aspect of the present invention, there is provided a PRML regenerating apparatus for regenerating a signal read by a head from a storage disc, comprising: a waveform equalizing circuit for waveform-equalizing the read signal; a maximum-likelihood decoder for maximum-likelihood-decoding a determination value by comparing the equalized output with upper and lower slice levels; and a phase synchronizing circuit for generating a clock which phase-synchronizes with the read signal. The phase synchronizing circuit includes: a voltage controlled oscillator for generating a clock having a phase corresponding to a voltage to be inputted; a phase error detector for generating n-bit phase error signals on the basis of the equalized output; m-pieces (m<n) of charge pump circuits for outputting electric currents corresponding to weights of the respective bits to the voltage controlled oscillator; and a multiplexer for selecting high-order m-bits from the n-bit error signals when in a pull-in operation and low-order m-bits therefrom when in a steady operation and outputting the selected bits to the charge pump circuits.

In this fourth aspect of the present invention also, when in the pull-in operation, the control is conducted based on the high-order bits. When the fluctuation is small after the data in the steady operation have been substantially converged, the control is effected based on the low-order bits. For this reason, the multiplexer selects the high- and low-order bits depending on the pull-in operation and the steady operation. In consequence of this, with respect to the n-bit inputs, the smaller number, i.e., m-pieces of charge pump circuits are capable of converting the digital error signal into the analog control quantity. Hence, the number of the charge pump circuits can be reduced.

According to a fifth aspect of the present invention, there is provided a PRML regenerating apparatus for regenerating a signal read by a head from a storage disc, comprising: a waveform equalizing circuit for waveform-equalizing the read signal; a maximum-likelihood decoder for maximum-likelihood-decoding a determination value by comparing the equalized output with upper and lower slice levels; and a phase synchronizing circuit for generating a clock which phase-synchronizes with the read signal. The phase synchronizing circuit includes: a voltage controlled oscillator for generating a clock having a phase corresponding to a voltage to be inputted; a voltage difference arithmetic unit for converting a phase difference between the equalized output and the clock into a voltage difference; and an integration type filter for smoothing an output of the voltage difference arithmetic unit and outputting the smoothed output to the voltage controlled oscillator.

In this fifth aspect of the present invention, the voltage control filter involves the use of the integration type passive filter. According to the prior art, the reason why the voltage control filter involves the use of a gm amplifier is that the gm amplifier filter changes the frequency characteristic per zone on the disc. It is, however, known that the variation in the frequency characteristic due to a track density per zone can be absorbed to some extent by the operation intrinsic to the voltage frequency oscillator. As a result of this, in this embodiment, the voltage control filter involves the use of the integration type passive filter. With this arrangement, the voltage control filter can be actualized with a simple configuration. In addition, the voltage control filter can be constructed at low cost.

According to sixth aspect of the present invention, there is provided a PRML regenerating apparatus for regenerating a signal read by a head from a storage disc, comprising: a waveform equalizing circuit for waveform-equalizing the read signal; a maximum-likelihood decoder for maximum-likelihood-decoding a determination value by comparing the equalized output with upper and lower slice levels; and a phase synchronizing circuit for generating a clock which phase-synchronizes with the read signal. The phase synchronizing circuit includes: a ternary determination unit for making a ternary determination of the equalized output; an error detector for detecting an offset error when the ternary determination value is zero from the equalized output from within a gap pattern of the read signal and holding this offset error; a subtracter for subtracting the detected error value from the equalized output when the ternary determination value is zero in the data pattern of the read signal; a phase comparator for calculating a phase error value from the equalized output undergoing the subtraction and the ternary determination value; and a voltage controlled oscillator for generating a synchronous clock having a phase corresponding to the phase error value.

In this sixth aspect of the present invention, the offset error is detected in the gap pattern and subtracted from the amplitude value in the data pattern. Hence, the amplitude value inputted to the phase comparator can be corrected to a value containing no offset error with this processing, it is feasible to prevent an influence of a positive/negative asymmetric waveform of the MR head from exerting on the phase error. Further, the offset error gives an influence when the determination value is zero. For this reason, a level at which the determination value is zero in the gap pattern is detected as an offset error. The offset error can be thereby accurately detected.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which:

FIG. 9 is an explanatory diagram of a memory in the construction of FIG. 8;

FIG. 14 is a block diagram of the maximum-likelihood decoder in another embodiment of the present invention;

FIGS. 15A and 15B are diagrams each illustrating a configuration of a ternary determination circuit of FIG. 14;

FIG. 16 is an explanatory diagram showing a conversion table of the memory of FIG. 15A;

DETAILED DESCRIPTION OF THE PREFERRED EMBODIMENTS

Figure 1:
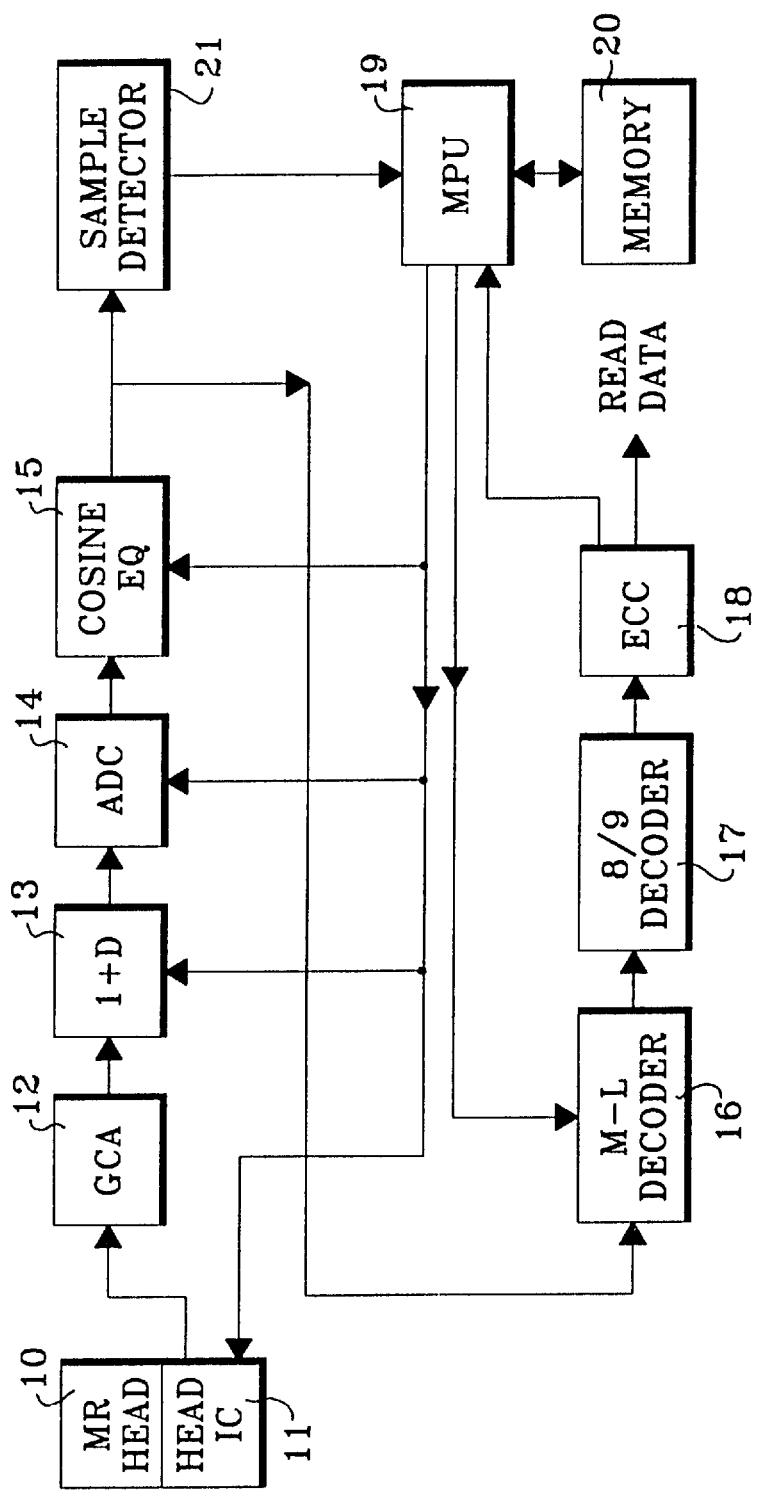
FIG. 1 is a block diagram illustrating a PRML regenerating apparatus in one embodiment of the present invention.

FIG. 1 is a block diagram illustrating a PRML regenerating apparatus in one embodiment of the present invention. This regenerating apparatus is defined as a magnetic recording/regenerating apparatus to which a partial-response class 4 and a maximum-likelihood decoder are applied.

As illustrated in FIG. 1, an MR (magnetic reluctance) head 10 serves to read data on a magnetic disc. A head IC circuit 11 serves to drive the MR head 10. A gain control amplifier 12 imparts a predetermined gain to a read signal and then outputs the signal. An equalizing filter (electric filter) 13 exhibits a (1+D) characteristic and fixedly equalizes an output of the gain control amplifier 12. An analog-to-digital converting circuit 14 effects sampling of a binary data string having a signaling speed $1/T$ at the time of $nT+\tau$ and then outputs a digital sample value Yn.

A cosine equalizer 15 is provided for correcting a partial-response characteristic in a radial direction of the disc. In this cosine equalizer 15, a tap coefficient is optimally adjusted by a training pattern. Then, this type of cosine equalizer 15 is constructed of a known transversal filter as disclosed in, e.g., the specification of U.S. Pat. No. 5,060, 088. The cosine equalizer can be replaced with a digital filter having many taps, such as a ten-tap FIR filter.

A maximum-likelihood decoder 16 processes the output sample Yn of the cosine equalizer 15 and reconstructs the record data string. The maximum-likelihood decoder 16, when regenerating a data sequence recorded to have a data-to-data correlation, detects a maximum-likelihood sequence. The operation of this maximum-likelihood decoder 16 is stated in "Optimal Reception for Binary Partial-response Channels", The Bell System Technical Journal, Vol.51, No.2, February, 1972 (ATT). A construction of this maximum-likelihood decoder 16 will be discussed with reference to FIG. 3 and subsequent figures.

A piece of 9-bit data of the data sequence decoded by the maximum-likelihood decoder 16 is converted into 8-bit data by an 8/9 decoder 17. This decoder 17 is also known as disclosed in, e.g., the specifications of U.S. Pat. No. 4,707,681 and U.S. Pat. No. 4,786,890. An ECC circuit 18 detects and corrects an error in the data sequence decoded by the decoder 17.

A control circuit 19 is constructed of a microprocessor. The control circuit 19 observes the output sample value Yn of a sample detection circuit 21 which will be mentioned later and automatically controls a head drive current of the head IC circuit 11 so as to minimize an equalization error. The control circuit 19 likewise automatically controls a frequency characteristic of the electric filter 13, an offset voltage of the A/D converting circuit 14 and an equalization coefficient of the cosine equalizer 15. Further, the control circuit 19 automatically controls a distance of a slice level of the maximum-likelihood decoder 16 in accordance with a result of the error detection by the ECC circuit 18.

A memory 20 stores a value of the controlled offset voltage of the A/D converting circuit 14. The memory 20 also stores a head drive current value of the head IC circuit 11 per head, a frequency characteristic value of the electric filter 13, the equalization coefficient of the cosine equalizer 15 and the distance of the slice level of the maximum-likelihood decoder 16.

The sample detection circuit 21, as will hereinafter be stated referring to FIG. 8, determines a level of the sample value Yn of the cosine equalizer 15 and, besides, outputs the classified sample value. The sample detection circuit 21 is employed when the control circuit 19 performs the automatic control to minimize the equalization error.

Figure 2:
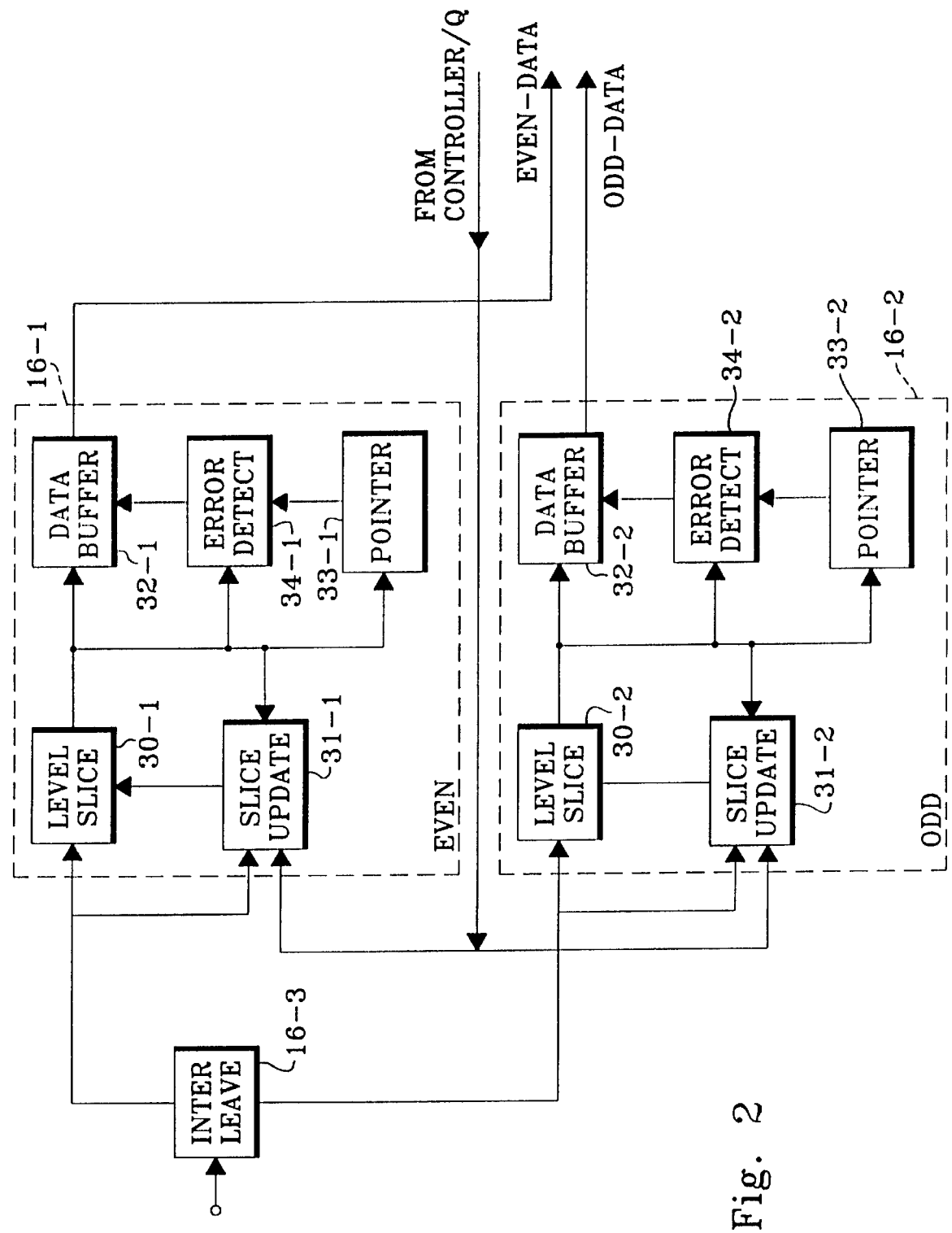
FIG. 2 is a block diagram showing a maximum-likelihood decoder in the construction of FIG. 1.
Figure 3:
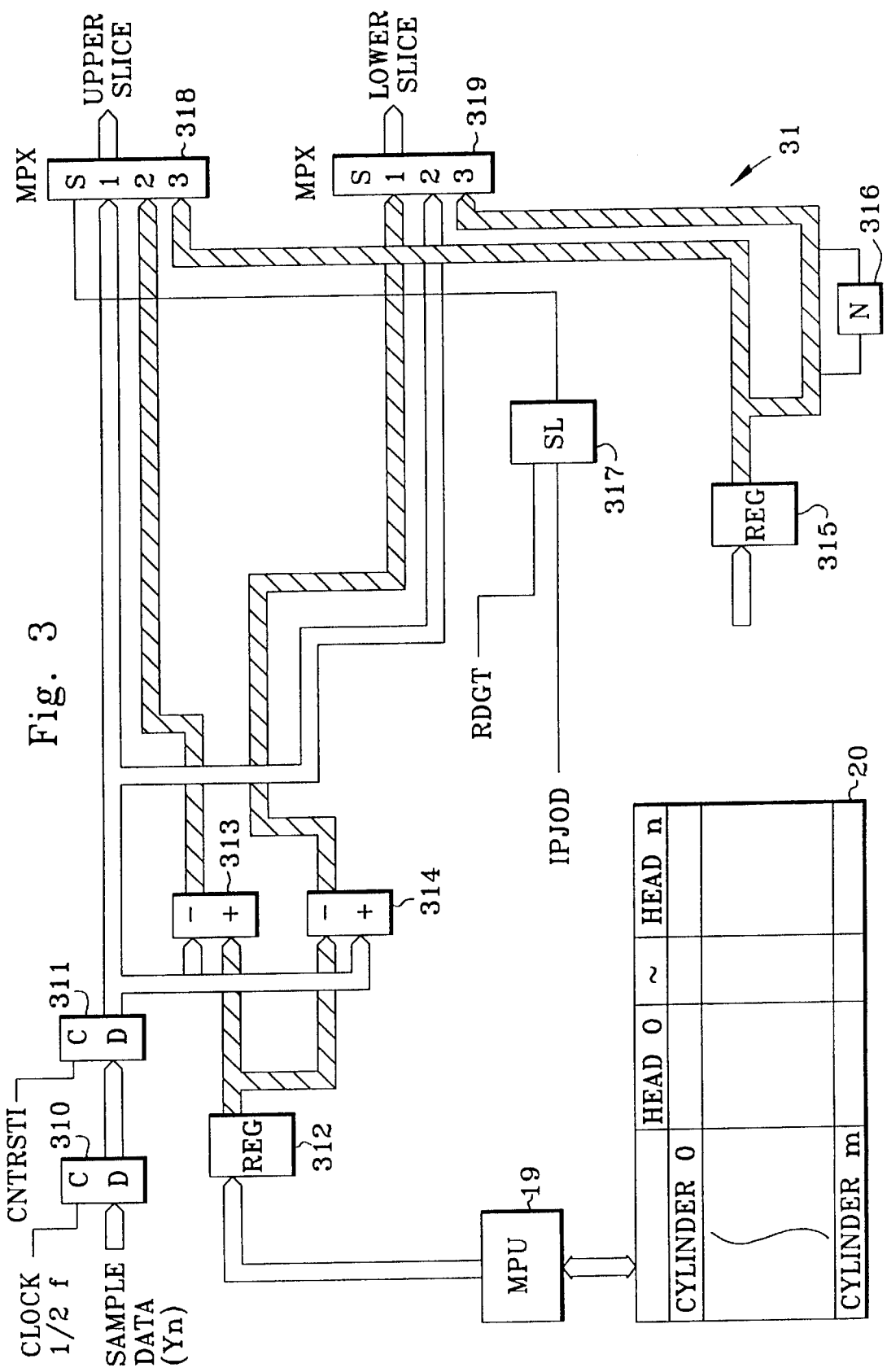
FIG. 3 is a circuit diagram (Part 1) illustrating the maximum-likelihood decoder of the construction of FIG. 2.
Figure 4:
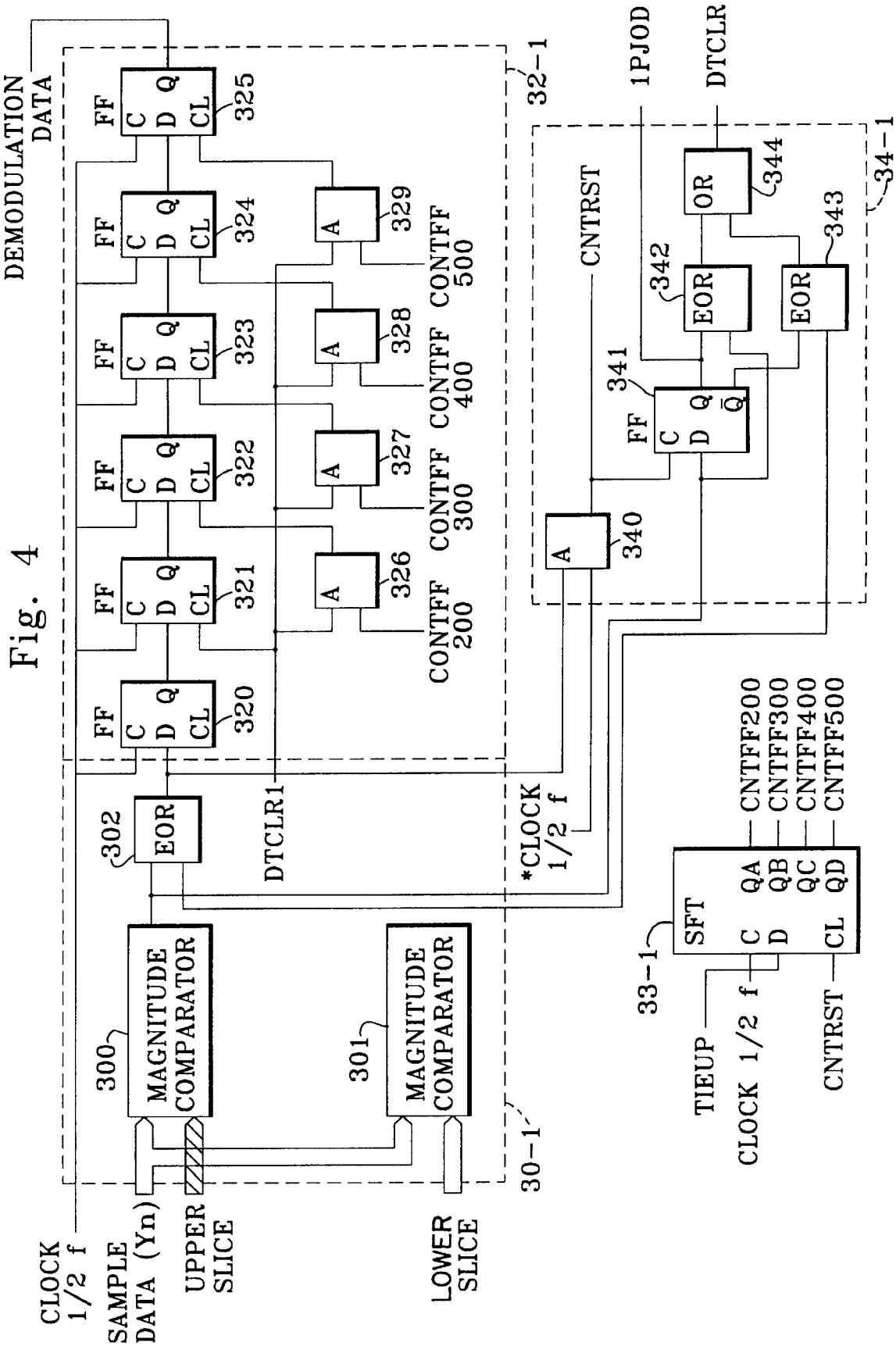
FIG. 4 is a circuit diagram (Part 2) illustrating the maximum-likelihood decoder of the construction of FIG. 2.
Figure 5:
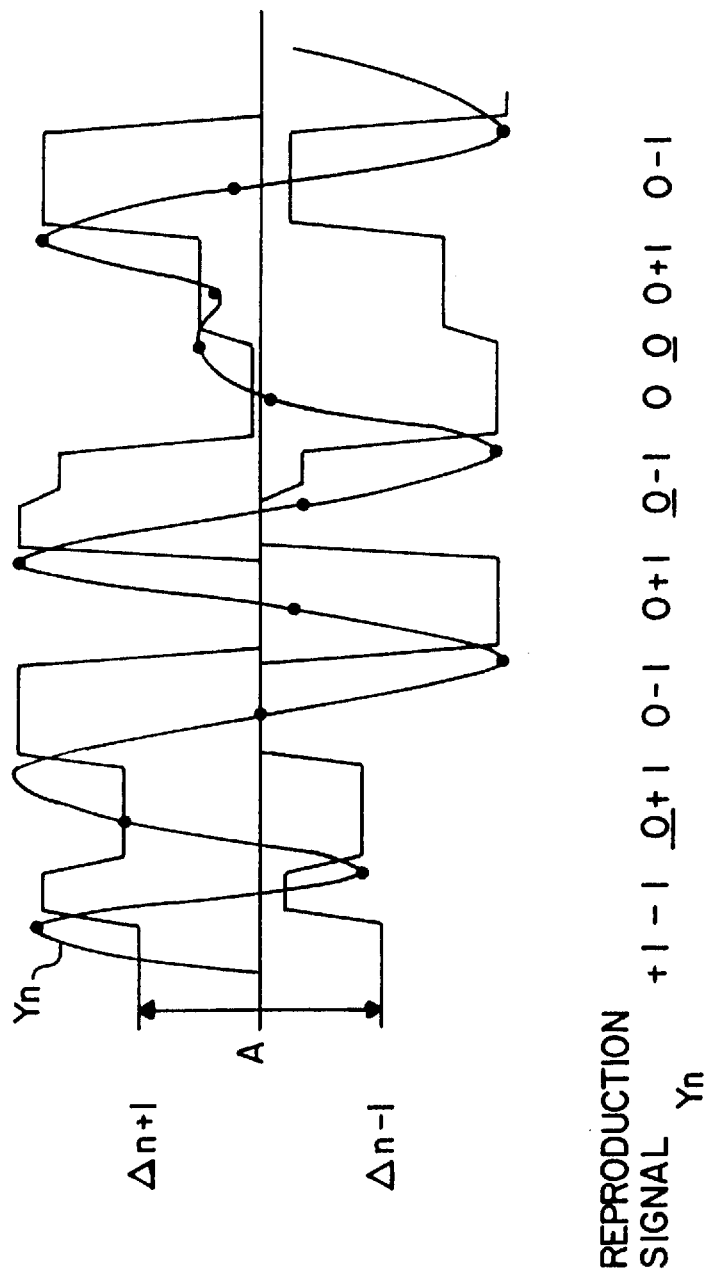
FIG. 5 is a diagram of assistance in explaining a maximum-likelihood decoding operation according to the present invention.
Figure 6:
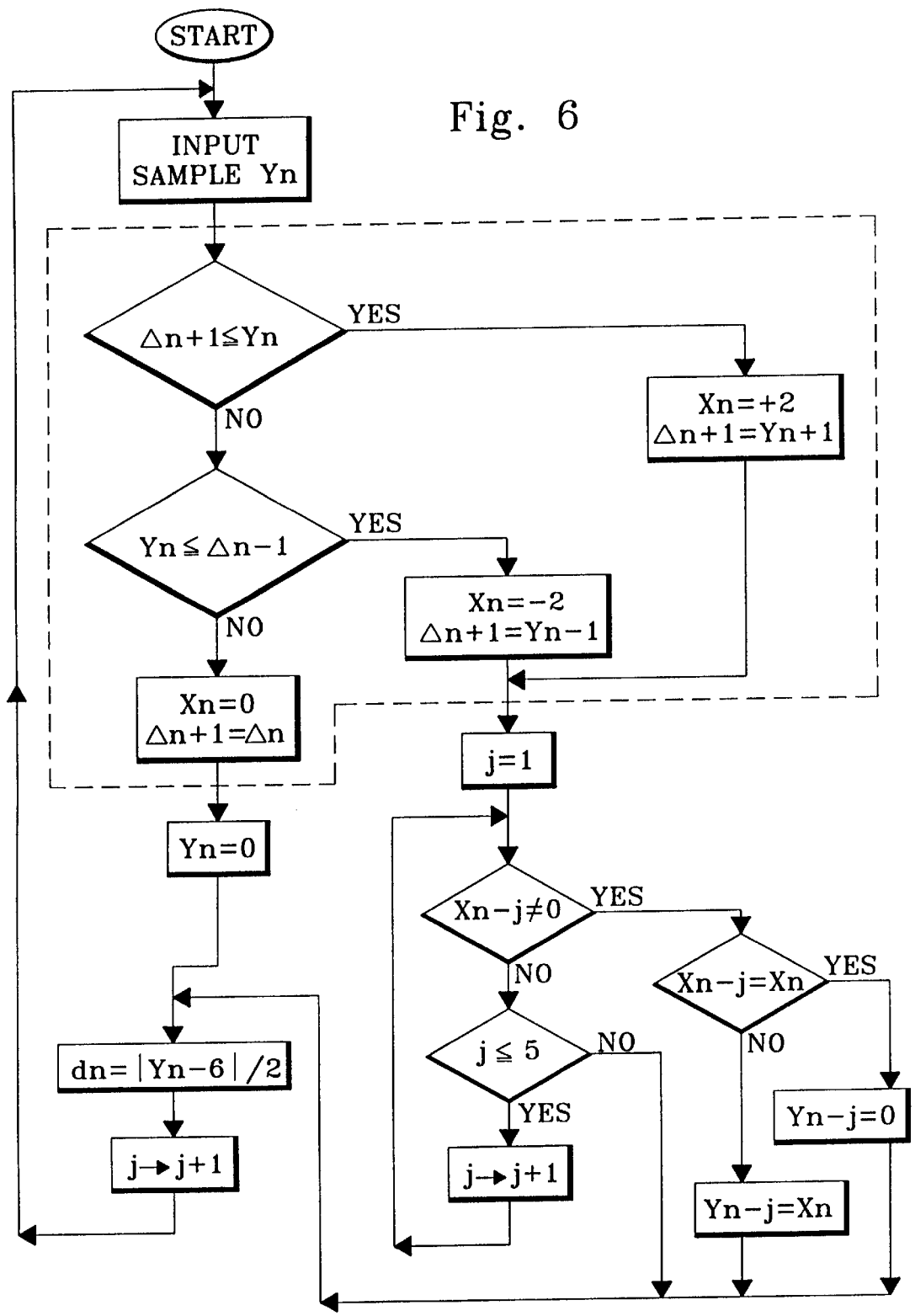
FIG. 6 is a flowchart of the maximum-likelihood decoding in the construction of FIG. 2.

FIG. 2 is a block diagram illustrating the maximum likelihood decoder of FIG. 1. FIGS. 3 and 4 are circuit diagrams of the maximum-likelihood decoder. FIG. 5 is a diagram of assistance in explaining the operation of the maximum-likelihood decoder. FIG. 6 is a flowchart of maximum-likelihood signal processing.

As illustrated in FIG. 2, the input data strings are classified into an odd-numbered data string and an even-numbered data string by an interleave circuit 16-3. The data of the even-numbered data string are inputted to an even-numbered data string oriented maximum-likelihood decoder 16-1. Further, the data of the odd-numbered data string are inputted to an odd-numbered data string oriented maximum-likelihood decoder 16-2.

Each of the maximum-likelihood decoders 16-1, 16-2 includes level slicers (ternary discriminator) 30-1, 30-2, slice level updating circuits 31-1, 31-2, data buffers 32-1. 32-2, pointers 33-1, 33-2 and error detection circuits 34-1, 34-2.

The level slicers 30-1, 30-2 perform level slicing by use of an upper (+1 side) slice level Δn+1 and a lower (−1 side) slice level Δn−1, thus obtaining a ternary determination value Xn. The slice level updating circuits 31-1, 31-2 output, to the level slicers 30, 1, 30-2, the upper slice level Δn+1 and the lower slice level Δn−1 spaced at a distance between the slice levels given from the control circuit 19 in accordance with the ternary determination value.

The data buffers 32-1, 32-2 are constructed of series registers and store a plurality of consecutive determination values. The pointers 33-1, 33-2 indicate the determination values to be checked. The error detection circuits 34-1, 34-2 detect an error of the determination value and correct the determination values of the data buffers 32-1, 32-2.

FIG. 3 illustrates details of the slice level updating circuits 31-1, 31-2. Herein, only the slice level updating circuit 31-1 is illustrated, but the slice level updating circuit 31-2 also has the same configuration.

As shown in FIG. 3, timing registers 310, 311 adjust a timing of the sample value Yn. A slice amplitude setting register 312 sets an amplitude A, as a distance, of the slice level given from the control circuit 19.

The memory 20 connected to this control circuit 19 stores the above amplitudes in predetermined cylinder positions 0–m for each of heads 0–n. With respect to these cylinder positions 0–m, for example, 1000 cylinders are set into one group, and the amplitude of one of the cylinder positions is represented as an amplitude of this group.

Accordingly, the control circuit 19, upon receiving a head number to be selected and the cylinder position, reads the group amplitude in this cylinder position of the head number from the memory 20 and sets this amplitude in the register 312.

An adder 313 subtracts the sample value Yn from the amplitude A set in the register 312. An adder 314 subtracts the amplitude A set in the register 312 from the sample value Yn. An initial value of the slice level from the control circuit 19 is set in a slice initial value setting register 315. A polarity bit inverter circuit 316 inverts a polarity bit of the register 315 and creates an initial value of the lower (−1 side) slice level.

A selector 317 generates select signals of a pair of multiplexers 318, 319 in accordance with a determination value 1PJOD. The selector 317 outputs a No.3 input selection at a start-of-read time. Further, when the determination value is [1], the selector 317 outputs a No.1 input selection and outputs, when the determination value is [−1], a No.2 input selection.

The first (plus side) multiplexer 318 has three pieces of input terminals and outputs, as an upper slice level, an input of the terminals selected by the select signal. The sample value Yn is inputted to the first input terminal. An output of the adder 313 is inputted to the second input terminal. An initial level of the register 315 is inputted to the third input terminal. Hence, the first multiplexer 318, as illustrated in FIG. 5, outputs the initial level in the form of the upper determination slice level Δn+1 when started. Then, the first multiplexer 318, when the determination value is [1], outputs the sample value Yn. Further, the first multiplexer 318, when the determination value is [−1], outputs (Set Amplitude−Sample Value).

The second (minus side) multiplexer 319 has three pieces of input terminals and outputs, as a lower slice level, an input of the terminal selected by the select signal. An output of the adder 314 is inputted to the first input terminal. The sample value Yn is inputted to the second input terminal. An invert initial level of the inverter circuit 316 is inputted to the third input terminal. Accordingly, the second multiplexer 319, as illustrated in FIG. 5, outputs the initial level in the form of the −1 determination level Δn−1 when started. Then, the second multiplexer 319, when the determination value is [1], outputs (Sample Value−Set Amplitude) and also outputs, when the determination value is [−1], the sample value Yn.

FIG. 4 illustrates details of the level slicer 30-1, the data buffer 32-1, the pointer 33-1 and the error detection circuit 34-1. Note that the level slicer 30-2, the data buffer 32-2, the pointer 33-2 and the error detection circuit 34-2 also have the same configurations.

As illustrated in FIG. 4, the level slicer 30-1 includes a comparator 300 for comparing the sample value Yn with the upper determination slice level and a comparator 301 for comparing the sample value Yn with the lower determination slice level. The level slicer 30-1 further includes an EOR circuit 302 for taking the EXOR outputs of the two comparators 300, 301.

The comparator 300 outputs [1] when the sample value Yn is the upper determination slice level or above. The comparator 301 outputs [−1] when the sample value Yn is the lower determination slice level or under. Accordingly, the EOR circuit 302 outputs [1] when the sample value Yn is the upper determination slice level or above and the lower determination slice level or under. On the other hand, the EOR circuit 302 outputs [0] when the sample value Yn is between the upper determination slice level and the lower determination slice level.

The data buffer 32-1 includes a receiving register 320, 5-stage buffer registers 321–325 and four AND gates 326–329. The receiving register 320 holds the output of the EOR circuit 302. The 5-stage buffer registers 321–325 restricts a sequence of the determination values [0] by 5 and are therefore constructed at five stages.

The AND gates 326–329 take the AND of a data clear signal DTCLR with pointer signals CNTFF2OD–CNTFF5OD. Then, the data clear signal ADT-CLR is inputted to a clear terminal of the register 321. Outputs of the respective AND gates 326–329 are inputted to clear terminals of other registers 322–325.

The pointer 33-1 is a 5-bit shift register. The pointer 33-1 sequentially outputs pointer signals CNTFF2OD–CNTFF5OD in accordance with clocks Clock. Then, the pointer 33-1 is reset by a counter reset signal CNTRST.

The error detection circuit 34-1 has an AND gate 340, a register 341, a pair of EOR circuits 342, 343 and an OR circuit 344. The AND gate 340 outputs the clock when an output of the EOR circuit 302 is [1], whereby an error detecting operation is carried out. The register 341 holds an output of the comparator 300.

The EOR circuit 342 takes the exclusive OR of the output of the register 341 with the output of the comparator 300. The EOR circuit 343 takes the exclusive OR of an inverted Q-output of the register 341 with the output of the comparator 301. The OR circuit 344 takes an OR with respect to the two EOR circuits 341, 342 and outputs the data clear signal DTCLR.

Accordingly, when X(n−j) defined as an output of the EOR circuit 302 is not [0], the EOR circuits 342, 343 determines whether or not the determination value X(n−j) coincides with a determination value X(n). If the determination value X(n−j) is coincident with the determination value X(n), the OR circuit 344 outputs the data clear signal DTCLR. With this processing, the contents held in the buffer registers 321–325 but indicated by the pointer signals are cleared to [0], thus correcting the error.

Hence, in the circuit of FIG. 3, as illustrated in FIG. 5, the slice level fluctuates in accordance with the determination value, and the amplitude (distance between the slice levels) A is variably controlled by each head and each cylinder position.

Further, FIG. 6 illustrates a maximum-likelihood decode flow for obtaining a maximum-likelihood decode sequence when inputting the sample value Yn. As shown in FIG. 6, the determination slice level is changed by processing indicated by a dotted line in the figure. Then, when X(n−j) defined as the output of the EOR circuit 302 is not [0], the EOR circuits 342, 343 determines whether or not the determination value X(n−j) coincides with the determination value X(n). If the determination value X(n−j) is coincident with the determination value X(n), the OR circuit 344 outputs the data clear signal DTCLR. With this processing, the contents held in the buffer registers 321–325 but indicated by the pointer signals are cleared to [0], thus correcting the error.

Note that referring to FIG. 6, for restricting a circuit scale of the decoder, as explained in FIG. 4, there is employed a modulation/demodulation code for restricting the number of consecutive 0 in the binary signal string to be recorded.

Referring to FIGS. 4 and 6, the sequence of [0] is restricted by [5]. A condition thereof reflects in $j \leq 5$. Referring again to FIG. 6, Yn takes a ternary value of [0, +2, −2]. As a matter of fact, however, as explained in FIG. 4, the binary data replaced with [0, 1] is outputted. This corresponds to dn in FIG. 6.

Figure 7A:
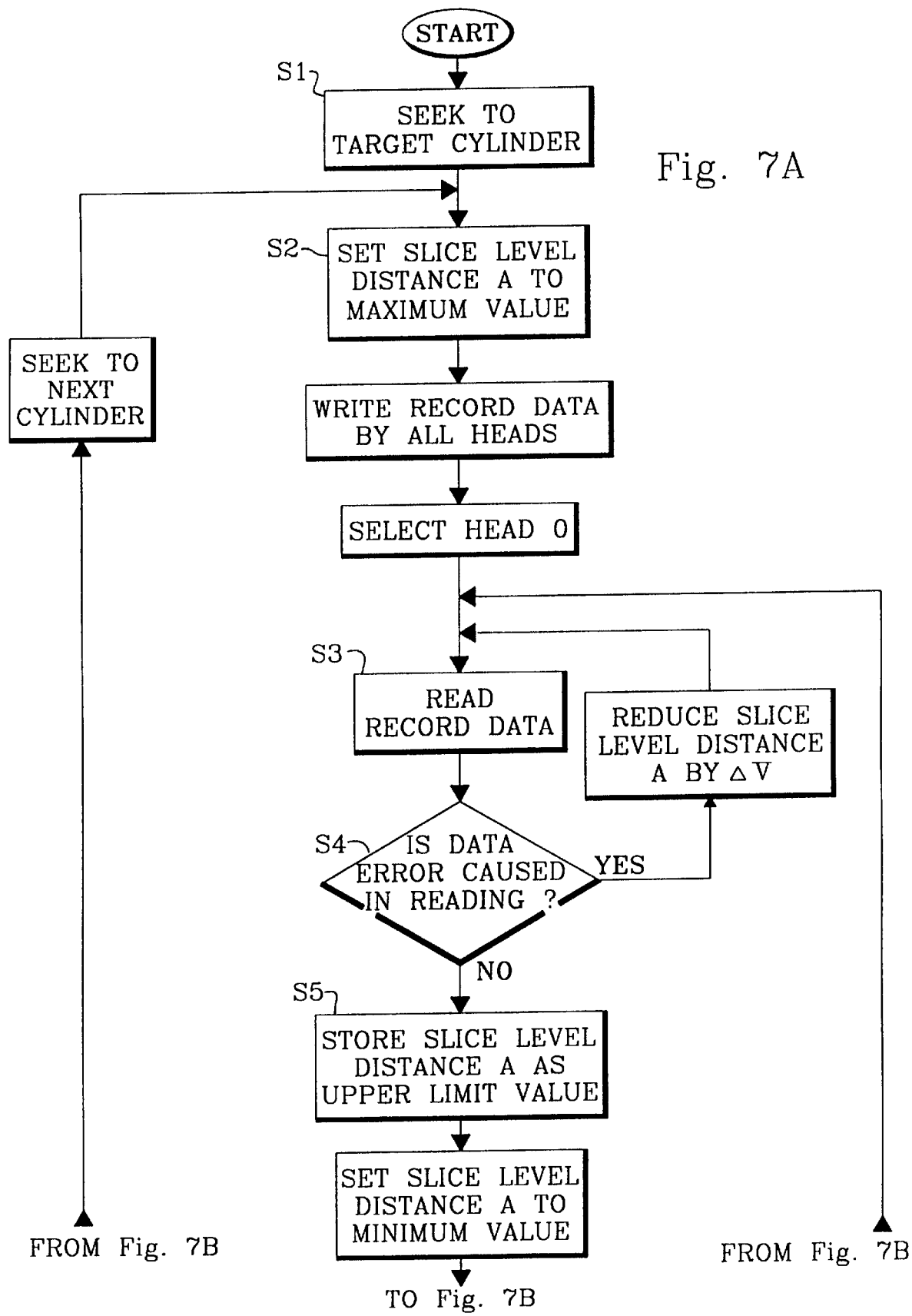
FIGS. 7A and 7B are flowcharts of slice level adjustment processing in one embodiment of the present invention.
Figure 7B:
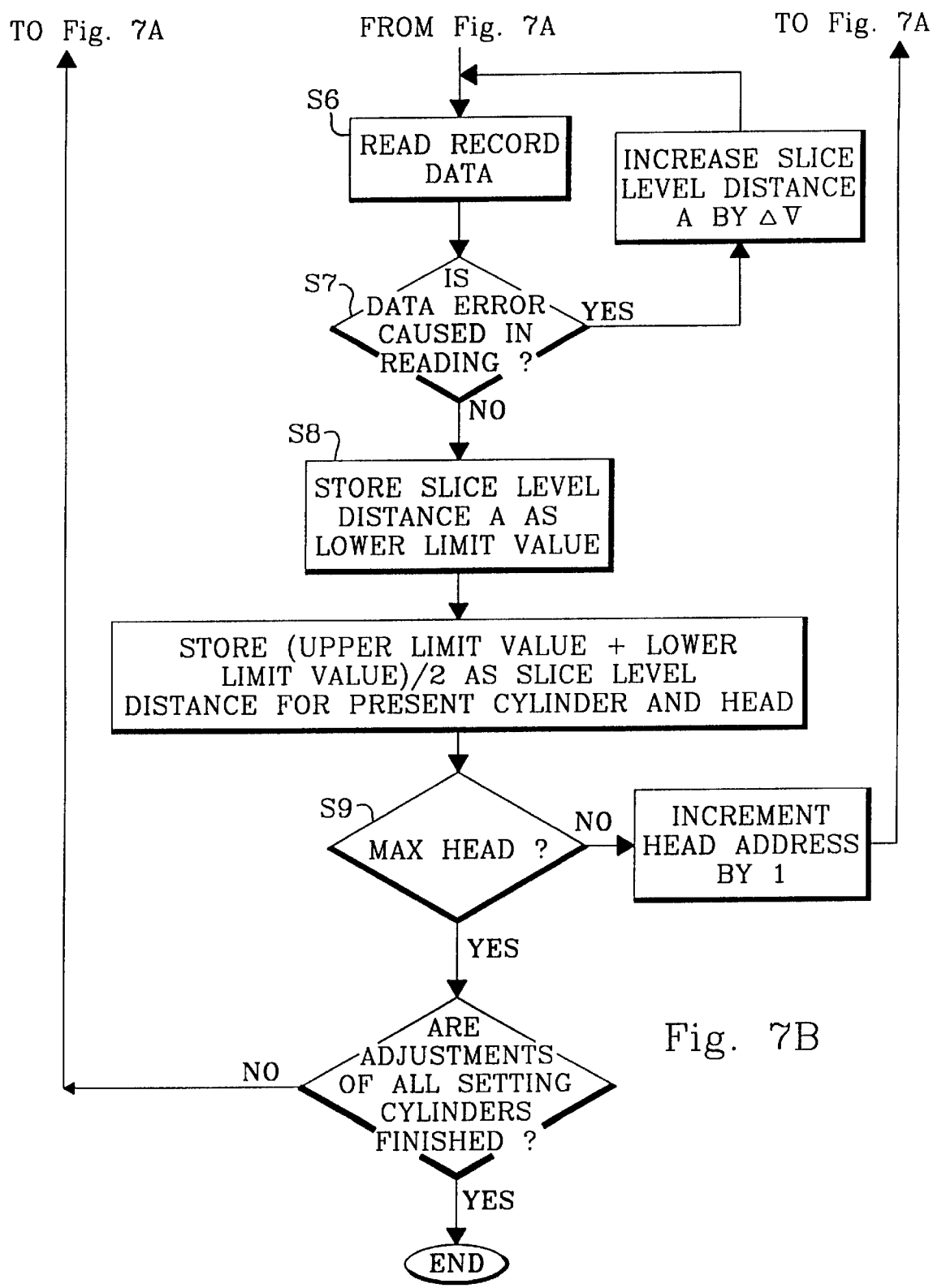

FIGS. 7A and 7B are flowcharts of slice level adjustment processing.

(S1) The control circuit (hereinafter referred to as a processor) 19 drives an unillustrated actuator and seeks the head to a target cylinder.

(S2) The processor 19 causes the amplitude setting register 312 of the maximum-likelihood decoder 16 to set the distance (amplitude) A of the slice level at the maximum value. Next, the processor 19 writes the record data on that cylinder with the above-mentioned head. Further, the processor 19 selects a head 0.

(S3) The processor 19 reads the record data by use of the selected head. This item of read data is transmitted via a route shown in FIG. 1 and error-checked in the ECC circuit 18. The processor 19 examines whether or not the data error occurs in a specified number of bits from a determination output of the ECC circuit 18.

(S4) The processor 19, when determining that the data error occurs in the specified number of bits, reduces the distance A of the slice level by ΔV. Then, this is written to the register 312, and the processing returns to step S3.

(S5) The processor 19, when determining that no error is produced in the specified number of bits, stores the distance A of this slice level as an upper limit value. Next, the processor 19 causes the amplitude setting register 312 of the maximum-likelihood decoder 16 to set the distance (amplitude) A of the slice level at the minimum value.

(S6) The processor 19 reads the record data by use of the selected head. This item of read data is transmitted via the route shown in FIG. 1 and error-checked in the ECC circuit 18. The processor 19 examines whether or not the data error occurs in the specified number of bits from the determination output of the ECC circuit 18.

(S7) The processor 19, when determining that the data error occurs in the specified number of bits, increases the distance A of the slice level by ΔV. Then, this is written to the register 312, and the processing returns to step S6.

(S8) The processor 19, when determining that no error is produced in the specified number of bits, stores the distance A of this slice level as a lower limit value. Next, the processor 19 performs a calculation of (Upper Limit Value+ Lower Limit Value)/2. Then, the processor 19 makes the memory 20 (see FIG. 3) store a result of this calculation as the distance A of the slice level of the present head and the present cylinder.

(S9) Next, the processor 19 checks whether or not a designated head is a maximum (MAX) head. If the designated head is not the maximum head, a designated head address is incremented by 1, and the processing goes back to step S3. Whereas if the designated head is the maximum head, the processor 19 examines whether or not adjustments of all the setting cylinders are finished. For instance, the adjusting cylinder is set at an interval of 100 cylinders. The processor 19, when determining that the adjustments of all the setting cylinders are not finished, effects a seek to the next cylinder, and the processing returns to step S2. The processor 19, reversely when determining that the adjustment of all the setting cylinders come to an end, finishes the adjustments.

In this way, as illustrated in FIG. 3, the memory 20 stores the distance (amplitude) of the optimum slice level in the cylinder positions where all the heads are set. This operation is carried out at the time of delivery from the factory. Then, at a normal accessing time, the processor 19 receives a selected head address and a cylinder address and reads the distance of the cylinder corresponding to the selected head address and set for this cylinder address out of the memory 20. The thus read distance is set in the amplitude setting register 312 of the maximum-likelihood decoder 16.

Therefore, it is possible to set the distance having a maximum margin corresponding to the characteristics of a waveform equalizing circuit and the head. Maximum-likelihood decoding can be thereby executed at the optimum slice level. Further, the characteristic differs depending on the head, and, hence, the adjustment to the optimum slice level is effected per head. Also, a variation in recording density that depends on the cylinder position exerts an influence on a regenerative signal, and, therefore, the maximum-likelihood decoding is executed at the optimum slice level in accordance with the cylinder position.

Figure 8:
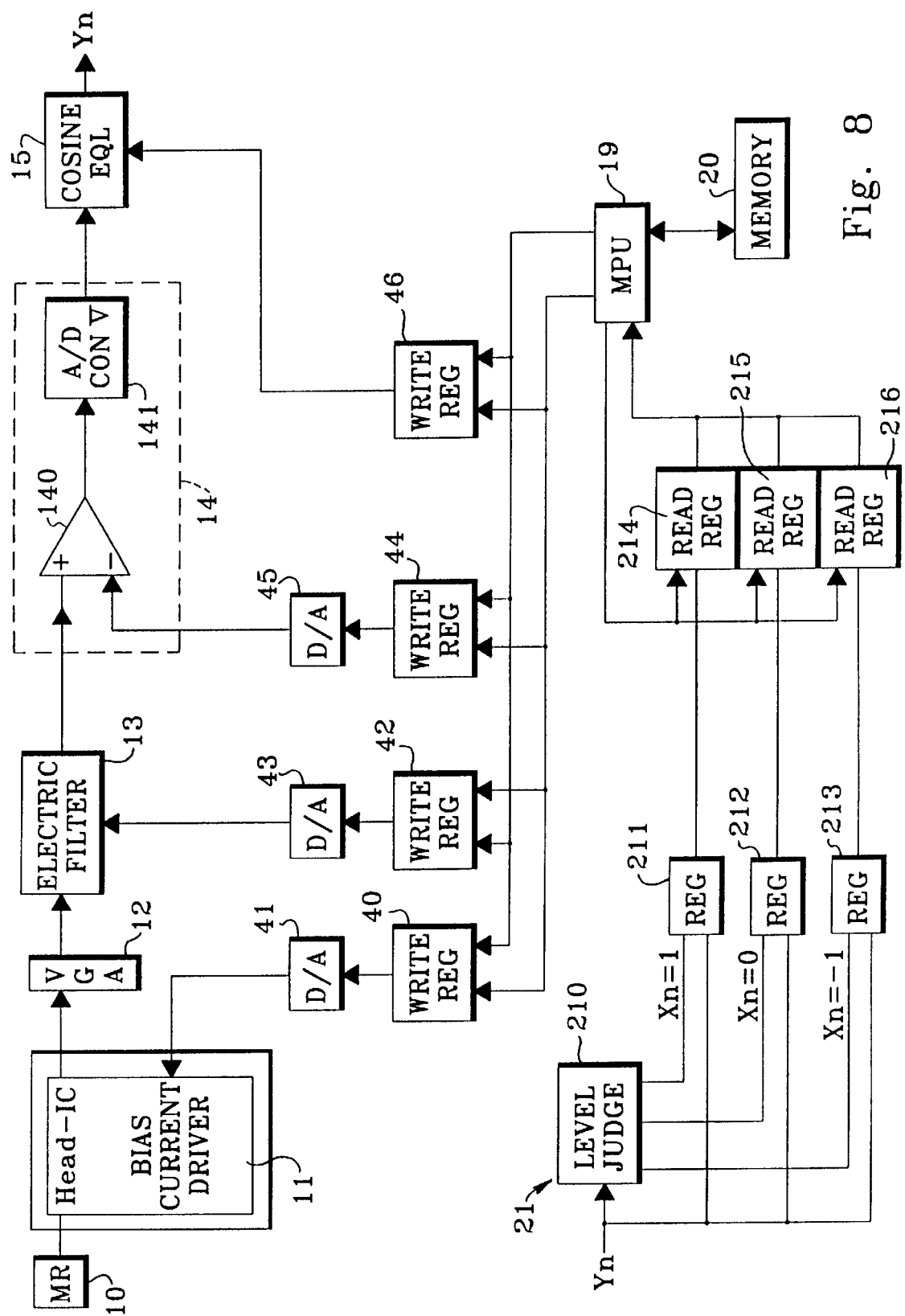
FIG. 8 is a block diagram showing an adjusting circuit in one embodiment of the present invention.

FIG. 8 is a block diagram illustrating an adjusting circuit in one embodiment of the present invention. FIG. 9 is a diagram of assistance in explaining the memory.

In the magnetic recording/regenerating circuit, an S/N ratio of the signal is deteriorated due to a variety of factors, and there is a high probability that a regenerative signal error occurs. The factors for causing this error may be an offset voltage of the AID converting circuit for sampling, an up-and-down asymmetry of the regenerative signal due to a deviation in terms of a bias magnetic field of the MR head 10, an equalization error due to a deviation in terms of the adjustment of the electric filter 13, an equalifation error derived from an adjustment deviation of the cosine equalizer 15, a scatter in terms of characteristic of the reproducing head and the variation in the recording density depending on the cylinder position. In accordance with this embodiment, these characteristics are to be adjusted.

Referring to FIG. 8, the same elements as those explained in FIG. 1 are marked with the like numerals. The processor 19 writes a bias current value of the MR head 10 to a write register 40. A D/A converter 41 converts the bias current value written to the write register 40 into an analog quantity and supplies this to a bias current drive circuit of the head IC circuit 11.

The processor 19 writes a frequency characteristic value (cut-off frequency, etc.) of the electric filter 13 to a write register 42. A D/A converter 43 converts, into an analog quantity, the frequency characteristic value of the electric filter that has been written to the write register 42 and controls the frequency characteristic of the electric filter 13.

The processor 19 writes an offset value of the A/D converting circuit 14 to a write register 44. A D/A converter 45 converts, into an analog quantity, the offset value of the A/D converter 14 that has been written to the write register 44 and outputs this analog quantity to an add amplifier 140 provided anterior to the A/D converter 141. Note that the add amplifier 140 subtracts an offset quantity of the D/A converter 45 from an output of the electric filter 13 and inputs the result thereof to the A/D converter 141.

The processor 19 writes an equalization coefficient of the cosine equalizer 15 to a write register 46, and this coefficient is outputted to a coefficient setting register of the cosine equalizer 15.

The sample detection circuit 21 shown in FIG. 1 includes a level determination unit 210 for determining the sample value (equalization output) Yn at a ternary level, three write registers 211–213 and three read registers 214–216.

The level determination unit 210 compares a level of the sample value Yn with the upper and lower determination levels and thus makes a classification into determination values Xn of [+1], [0], [−1]. When the determination value Xn is [+1], the sample value Yn is written to the write register 211. When the determination value Xn is [0], the sample value Yn is written to the write register 212. When the determination value Xn is [−1], the sample value Yn is written to the write register 213.

In conformity with an indication of the processor 19, the read register 214 holds a content of the write register 211 and informs the processor 19 of this. In conformity with the indication of the processor 19, the read register 215 holds a content of the write register 212 and informs the processor 19 of this. In conformity with the indication of the processor 19, the read register 216 holds a content of the write register 213 and informs the processor 19 of this.

The memory 20, as illustrated in FIG. 9, stores adjusted drive current values (bias current values) in the adjusting cylinder positions 0–m of the respective heads 0–n, a filter constant value (frequency characteristic value) and a filter (equalization) coefficient.

When normally accessed, the processor 19 receives the selected head address and the cylinder address and reads the drive current corresponding to the cylinder corresponding to the selected head address and set for this cylinder address, the filter constant value and the filter coefficient out of the memory 20. These values are set in the respective write registers 40, 42, 46. With this processing, there is obtained a regenerative signal in which the up-and-down asymmetry due to the characteristic of the MR head 10 is compensated. Further, the deviation in terms of the adjustment of the electric filter 13 can be compensated. Moreover, the adjustment deviation of the cosine equalizer 15 can be also compensated.

Figure 10:
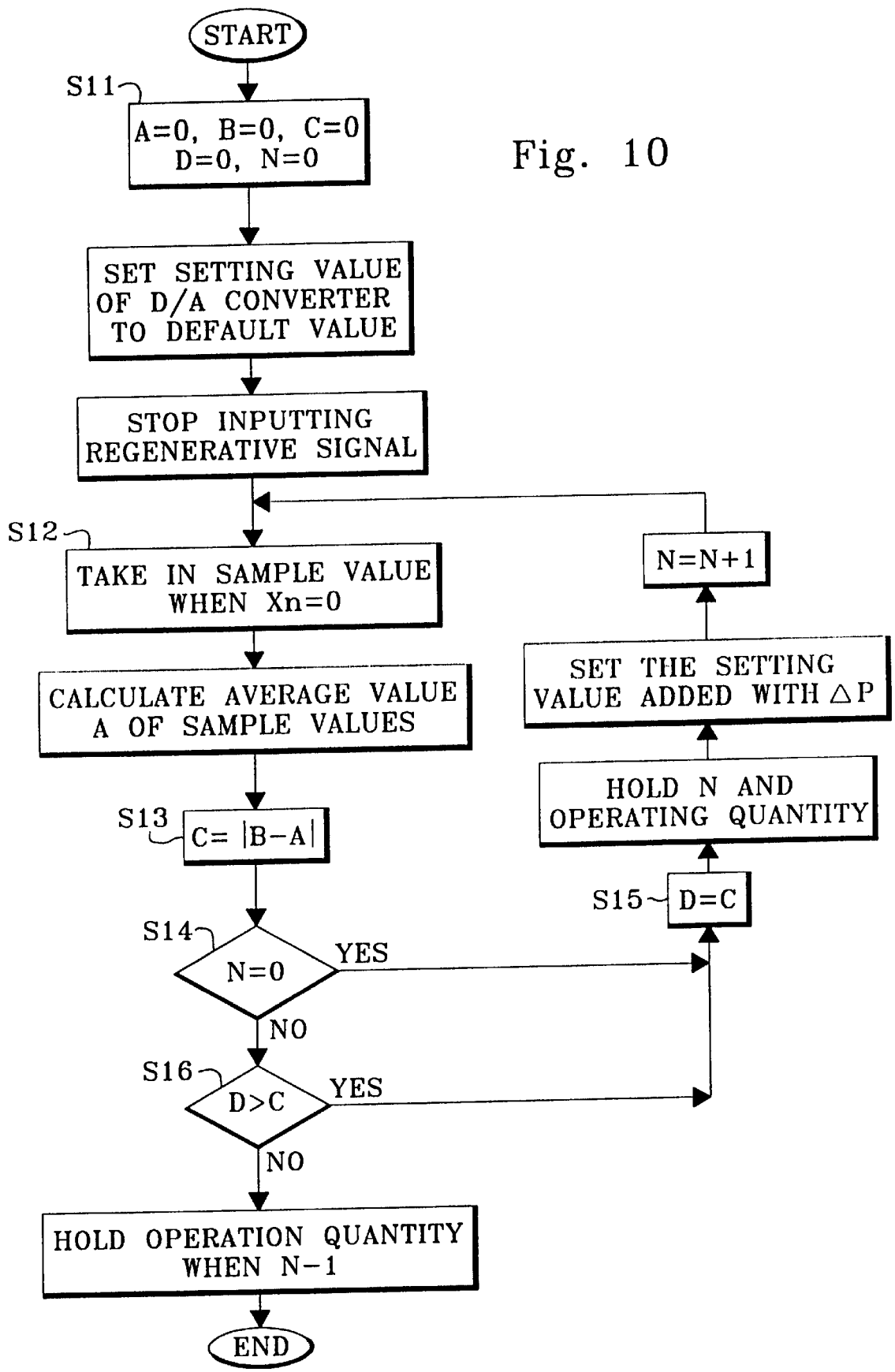
FIG. 10 is a flowchart showing how an offset voltage is adjusted in one embodiment of the present invention.

FIG. 10 is a flowchart for adjusting the offset voltage of the A/D converter.

In the adjustment of the offset voltage of the A/D converter, the offset voltage of the A/D converter itself is checked without effecting the reading operation.

(S11) The processor 19 initializes five parameters A, B, C, D, N to [0]. Next, the processor 19 sets, in a write register 44, a default value as an initial operation value of a correcting D/A converter 45. Further, the processor 19 stops the read operation, thereby stopping the inputting of the A/D converter 14 to the add amplifier 140.

(S12) In this state, the processor 19 reads the sample value Yn when Xn=0 a predetermined number of times from the read register 215. Then, the processor 19 calculates an average value A of the sample values Yn taken in a predetermined number of times.

(S13) The processor 19 calculates an error C from an absolute value of (B−A). Herein, B is the ideal sample value when Xn=0. In this example, the ideal sample value is set to [0].

(S14) Next, the processor 19 checks whether a number-of-times parameter N is [0] or not.

(S15) The processor 19, when the parameter N is [0], for the first processing, updates a measured value D of the last time to the error C. Next, the processor 19 stores a work area of the memory 20 with the parameter N and an operation quantity of the correcting converter while making them corresponding to each other. Further, the processor 19 adds Δp to the operation quantity of the correcting D/A converter. This value is written as an operation quantity of the correcting D/A converter 45 to the write register 44. Besides, the processor 19 updates the parameter N to (N+1). Then, the processing returns to step S12.

(S16) The processor 19, when the parameter N is not [0], compares the measured value D of the last time with the measured value C of this time. If D>C, the measured value of the last time is not the minimum value, and, hence, the processing goes back to step S15. Whereas if D>C is not established, the measured value of the last time is the minimum value. For this reason, the memory 20 holds the operation quantity, as a result of the adjustment, of the correcting D/A converter in the case of (N−1) of the last time.

Thus, there is measured such an operation quantity that the offset voltage of the A/D converter 141 is minimized, and this measured quantity is held in the memory 20. Then, when operated, this optimum operation quantity is read out, and a result of adding this quantity to the default value is set in the register 44. The offset voltage of the A/D converter 141 can be thereby minimized.

Figure 11A:
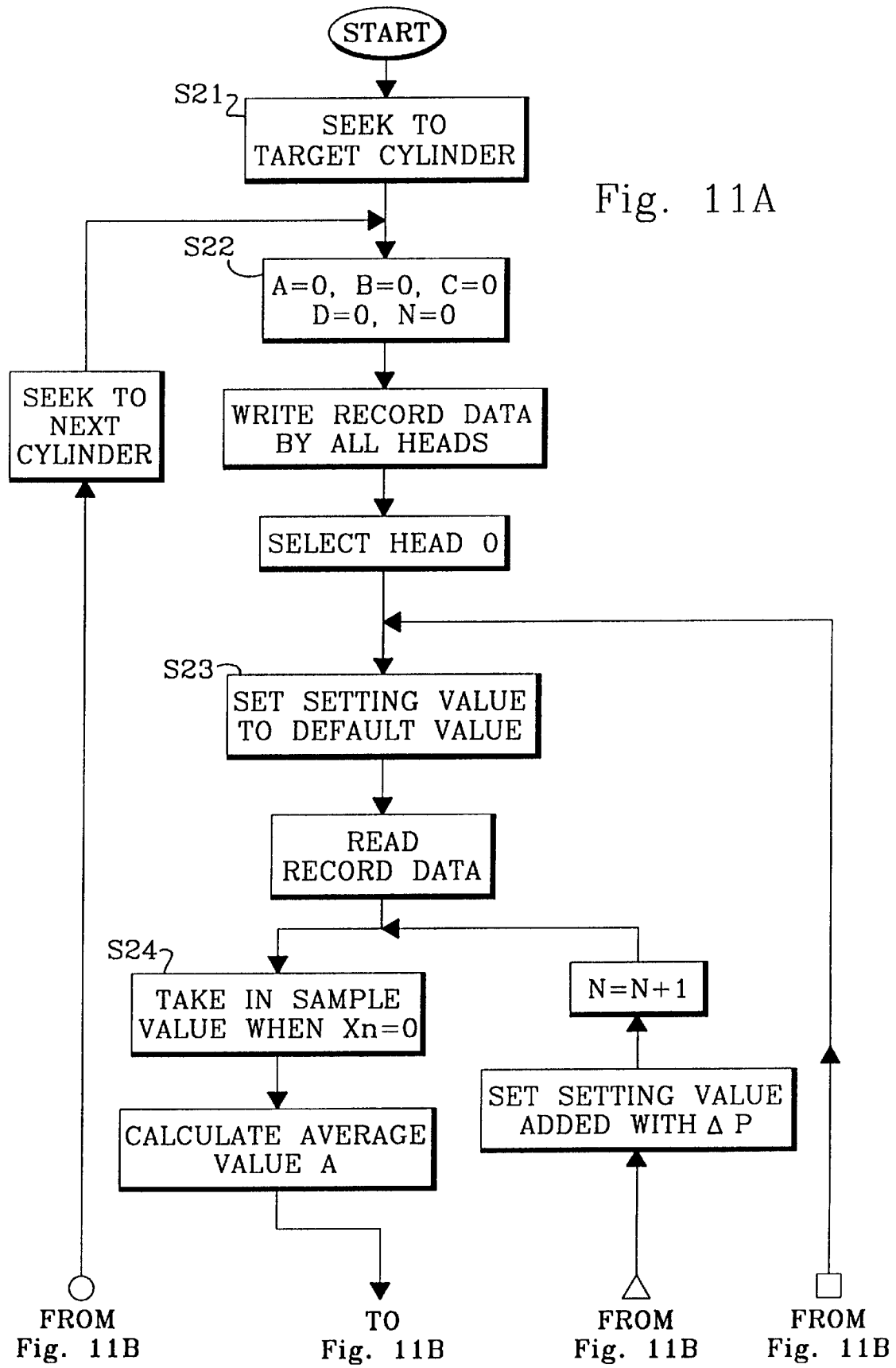
FIGS. 11A and 11B are flowcharts each showing how a characteristic of an MR head is adjusted in one embodiment of the present invention.
Figure 11B:
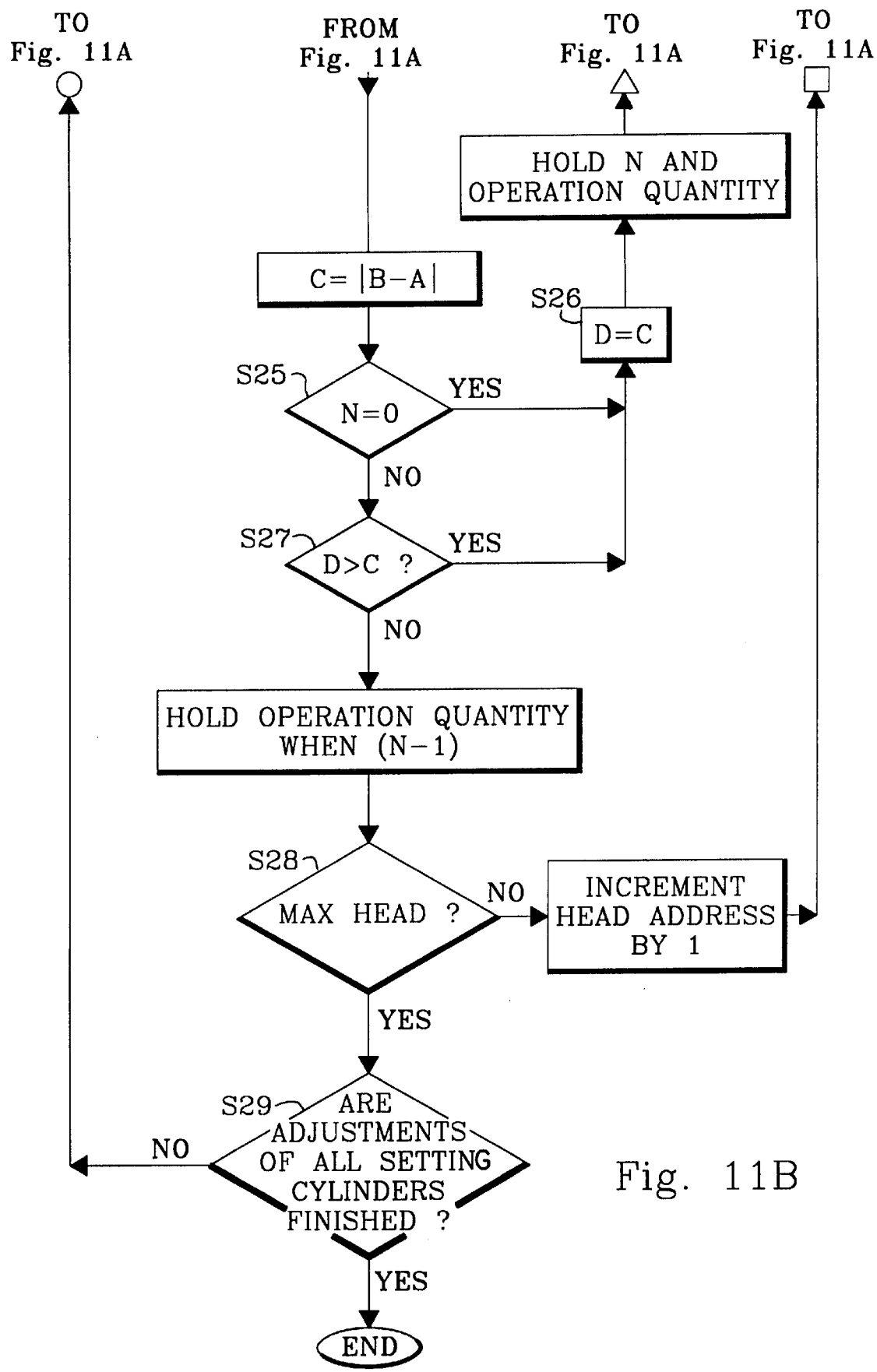

FIGS. 11A and 11B are flowcharts for adjusting the characteristics of the MR head.

(S21) The processor 19 drives the unillustrated actuator and thus performs the seek of the head to a target cylinder.

(S22) The processor 19 initializes the five parameters A, B, C, D, N to [0]. Next, the processor 19 writes the record data on that cylinder by use of the head. Further, the processor 19 selects the head 0.

(S23) The processor 19 sets the set value of the correcting D/A converter 14 to the default value. That is, the processor 19 writes the default value to the write register 40. Next, the processor 19 reads the record data through the selected head.

(S24) In this state, the processor 19 reads the sample value Yn when Xn=0 a predetermined number of times from the read register 215. Then, the processor 19 calculates the average value A of the sample values Yn taken in a predetermined number of times. Furthermore, the processor 19 calculates the error C from the absolute value of (B−A). Herein, the parameter B is the ideal sample value when Xn=0. In this example, the ideal sample value is set to [0].

(S25) Next, the processor 19 checks whether the parameter N is [0] or not.

(S26) The processor 19, when the parameter N is [0], for the first processing, updates the measured value D of the last time to the measured value C of this time. Next, the processor 19 stores the work area of the memory 20 with the parameter N and the operation quantity of the correcting converter while making them corresponding to each other. Further, the processor 19 adds Δp to the operation quantity of the correcting D/A converter. This value is written as an operation quantity of the correcting D/A converter 45 to the write register 40. Besides, the processor 19 updates the parameter N to (N+1). Then, the processing returns to step S24.

(S27) The processor 19, when the parameter N is not [0], compares the measured value D of the last time with the measured value C of this time. If D>C, the measured value of the last time is not the minimum value, and, hence, the processing goes back to step S26. Whereas if D≦C, the measured value D of the last time is the minimum value. Hence, the memory 20 shown in FIG. 9 stores the operation quantity, as a result of adjusting the relevant cylinder position of the relevant head, of the correcting D/A converter in the case of (N−1) of the last time.

(S28) Next, the processor 19 checks whether or not the designated head is the maximum (MAX) head. If the designated head is not the maximum head, the designated head address is incremented by 1, and the processing goes back to step S23.

(S29) Whereas if the designated head is the maximum head, the processor 19 examines whether or not adjustments of all the setting cylinders are finished. For instance, the adjusting cylinder is set at the interval of 100 cylinders. The processor 19, when determining that the adjustments of all the setting cylinders are not finished, effects a seek to the next cylinder, and the processing returns to step S22. The processor 19, reversely when determining that the adjustments of all the setting cylinders come to an end, finishes the adjustments.

In this way, as illustrated in FIG. 9, the memory 20 stores the optimum bias current value in the cylinder positions where all the heads are set. This operation is carried out at the time of delivery from the factory. Then, at the normal accessing time, the processor 19 receives the selected head address and the cylinder address and reads the bias current value corresponding to the selected head address and set for this cylinder address out of the memory 20. This bias current value is set in the write register 40.

In this manner, the bias current of the MR head 10 is set to minimize the level of the sample value Yn when the determination value Xn=0. It is therefore possible to minimize the up-and-down asymmetry of the read waveform due to the characteristic of the MR head 10. Further, the variation in the recording density that depends on the cylinder position exerts the influence on the regenerative signal, and hence there is effected setting to the optimum bias current value in accordance with the cylinder position.

Figure 12A:
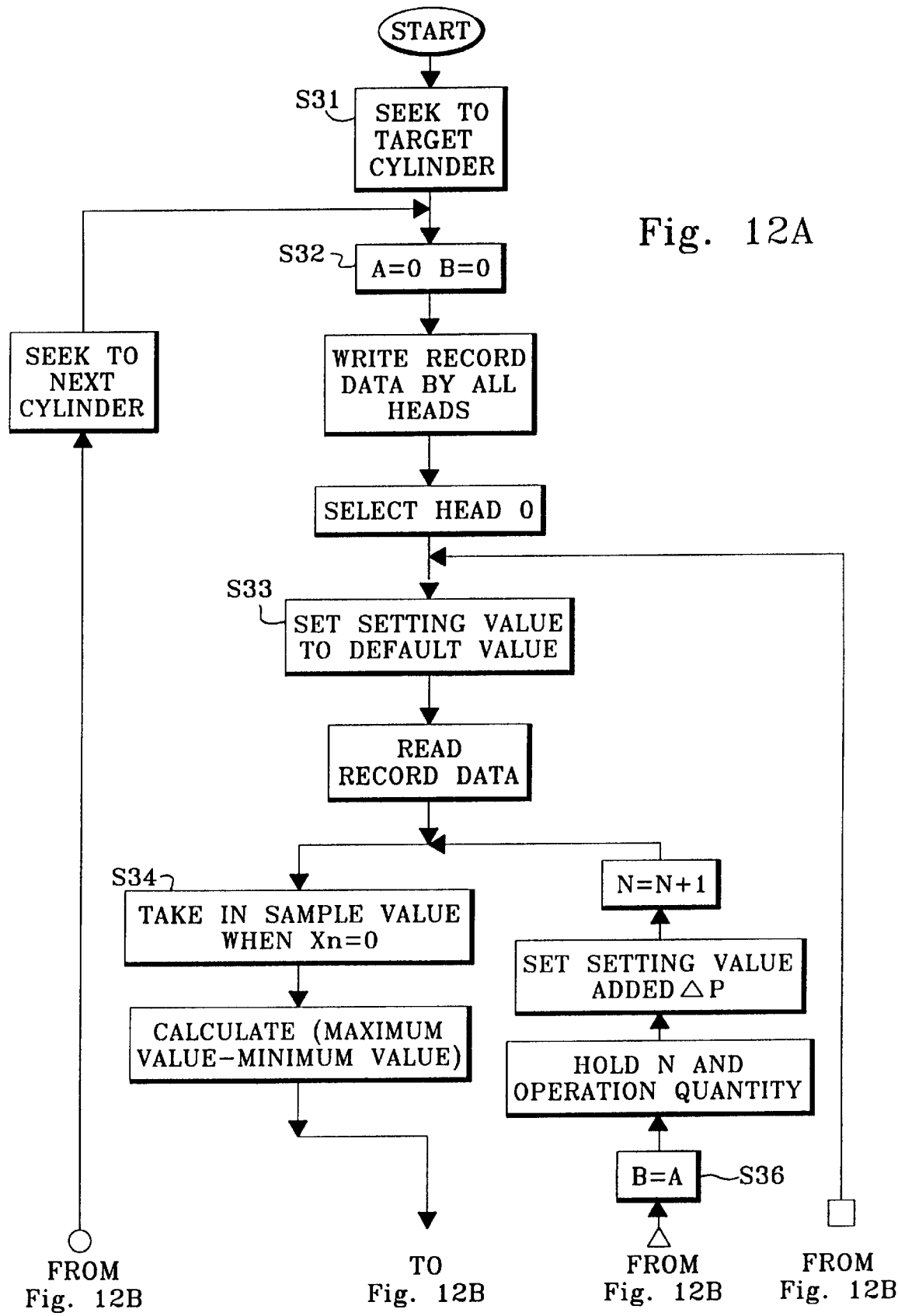
FIGS. 12A and 12B are flowcharts each showing how a characteristic of an electric filter is adjusted in one embodiment of the present invention.
Figure 12B:
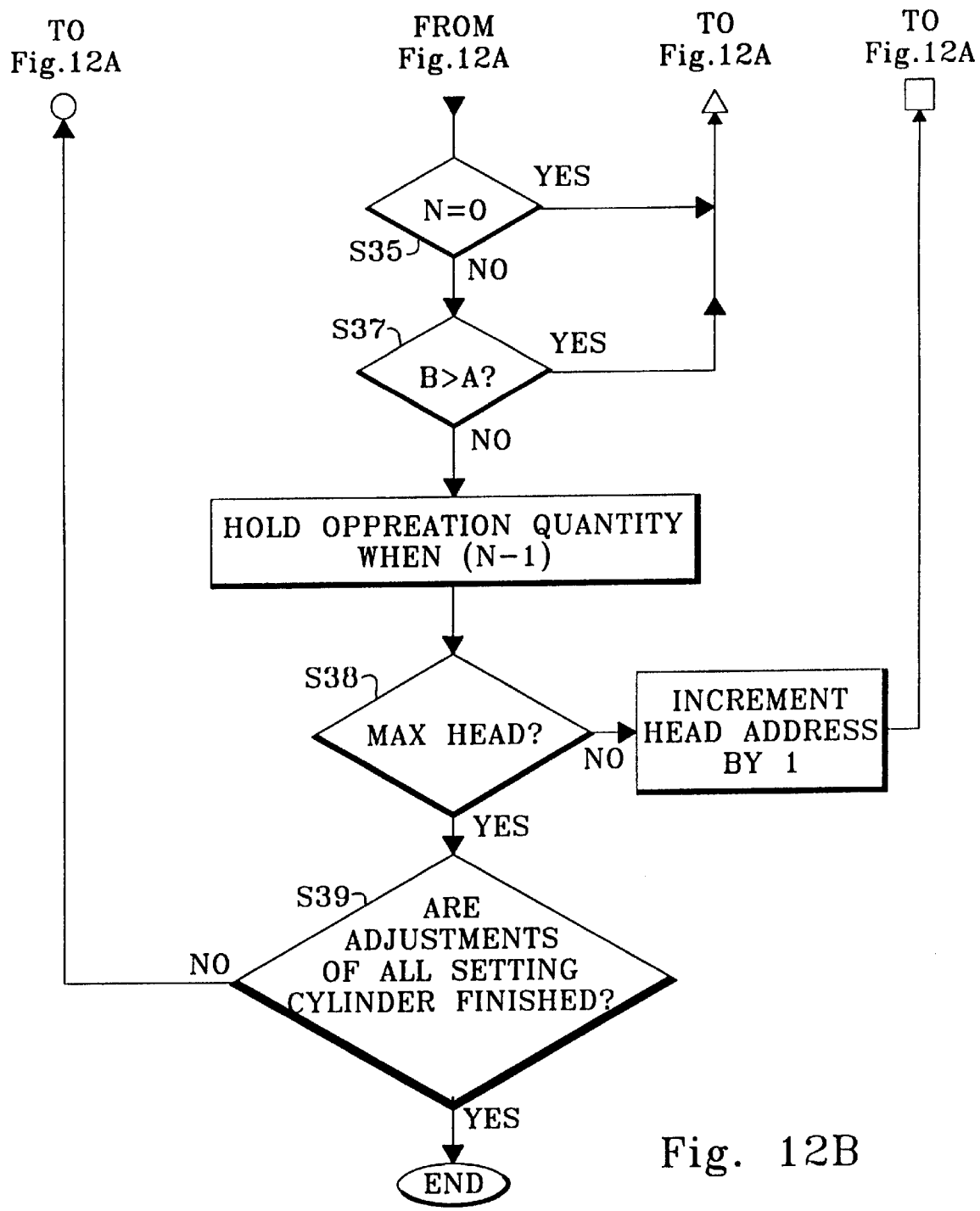

FIGS. 12A and 12B are flowcharts for adjusting the characteristic of the electric filter.

(S31) The processor 19 drives the unillustrated actuator and thus performs the seek of the head to a target cylinder.

(S32) The processor 19 initializes the two parameters A, B to [0]. Next, the processor 19 writes the record data on that cylinder by use of all the heads. Further, the processor 19 selects the head 0.

(S33) The processor 19 sets the set value of the correcting D/A converter 43 to the default value. That is, the processor 19 writes the default value to the write register 42. Next, the processor 19 reads the record data through the selected head.

(S34) In this state, the processor 19 reads the sample value Yn when Xn=X a predetermined number of times from one of the read registers 214–216. This value X is one of [+1], [0], [−1]. Then, the processor 19 makes a calculation of (Maximum Value−Minimum Value) of the sample values Yn taken in a predetermined number of times. This is set as a parameter A. A standard deviation is calculated instead of this calculation of (Maximum Value−Minimum Value), and the result thereof may be set as the parameter A.

(S35) Next, the processor 19 checks whether the parameter N is [0] or not.

(S36) The processor 19, when the parameter N is [0], for the first processing, updates the measured value B of the last time to the measured value A of this time. Next, the processor 19 stores the work area of the memory 20 with the parameter N and the operation quantity of the correcting converter while making them corresponding to each other. Further, the processor 19 adds Δp to the operation quantity of the correcting D/A converter. This value is written as an operation quantity of the correcting D/A converter 41 to the write register 42. Besides, the processor 19 updates the parameter N to (N+1). Then, the processing returns to step S34.

(S37) The processor 19, when the parameter N is not [0], compares the measured value B of the last time with the measured value A of this time. If B>A, the measured value of the last time is not the minimum value, and, hence, the processing goes back to step S36. Whereas if B≦A, the measured value of the last time is the minimum value. Hence, the memory 20 shown in FIG. 9 stores the operation quantity, as a result of adjusting the relevant cylinder position of the relevant head, of the correcting D/A converter in the case of (N−1) of the last time.

(S38) Next, the processor 19 checks whether or not the designated head is the maximum (MAX) head. If the designated head is not the maximum head, the designated head address is incremented by 1, and the processing goes back to step S33 of FIG. 12A.

(S39) Whereas if the designated head is the maximum head, the processor 19 examines whether or not the adjustments of all the setting cylinders are finished. For instance, the adjusting cylinder is set at the interval of 100 cylinders. The processor 19, when determining that the adjustments of all the setting cylinders are not finished, effects the seek to the next cylinder, and the processing returns to step S32. The processor 19, reversely when determining that the adjustments of all the setting cylinders come to an end, finishes the adjustments.

In this way, as illustrated in FIG. 9, the memory 20 stores the optimum frequency characteristic value in the cylinder positions where all the heads are set. This operation is carried out at the time of delivery from the factory. Then, at the normal accessing time, the processor 19 receives the selected head address and the cylinder address and reads the frequency characteristic value corresponding to the selected head address and set for this cylinder address out of the memory 20. This frequency characteristic value is set in the write register 42.

In this manner, the frequency characteristic value of the electric filter 13 is set to minimize the standard deviation or a difference between the maximum value and the minimum value of the sample values Yn when the determination value xn=X. It is therefore possible to minimize the adjustment error of the electric filter. Further, the characteristic differs per head, and hence the frequency characteristic value is set per head. Moreover, since the regenerative signal is influenced by the variation in the recording density depending on the cylinder position, the frequency characteristic value is set to the optimum value in accordance with the cylinder position.

Figure 13A:
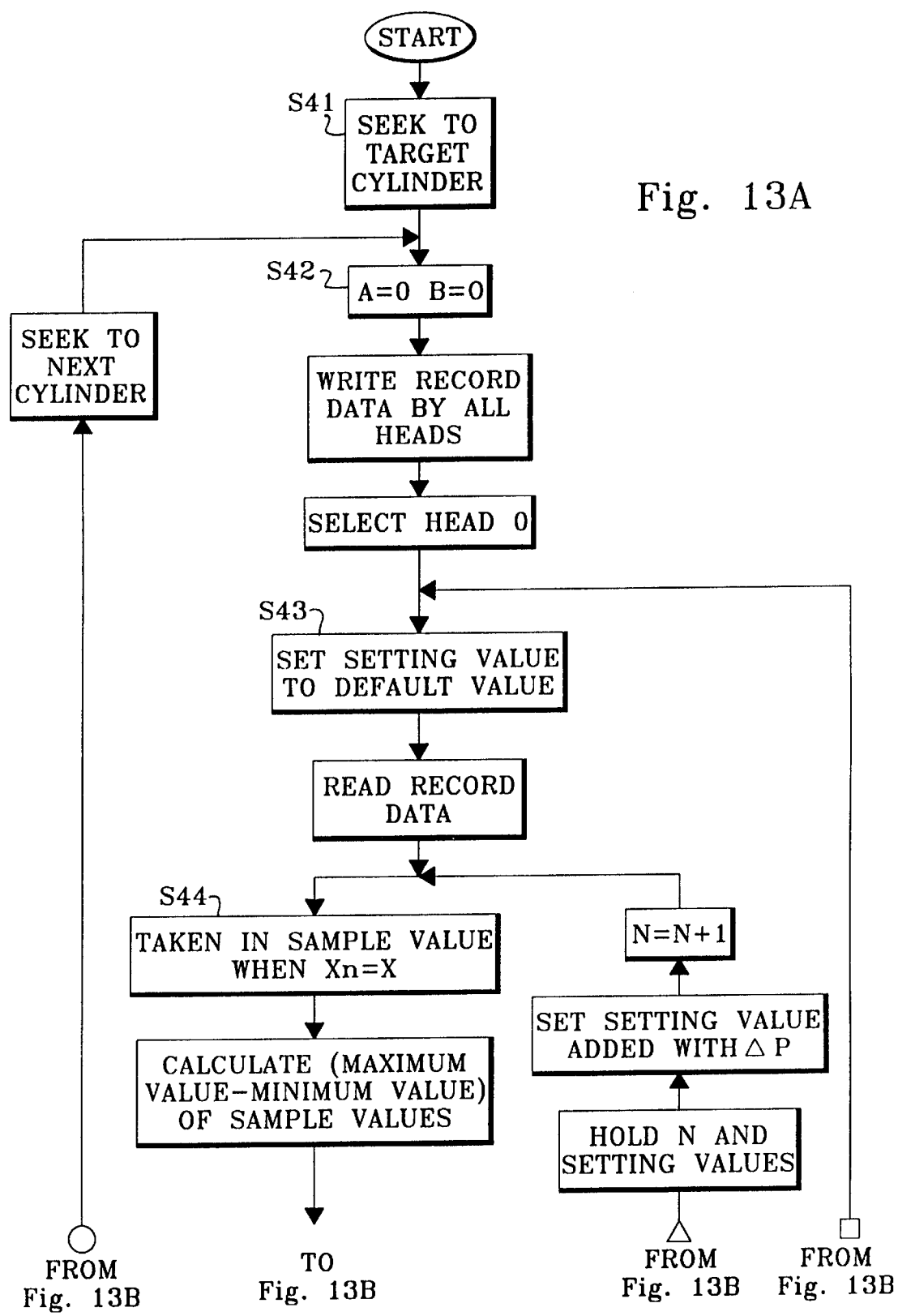
FIGS. 13A and 13B are flowcharts each showing how a characteristic of a cosine equalizer is adjusted in one embodiment of the present invention.
Figure 13B:
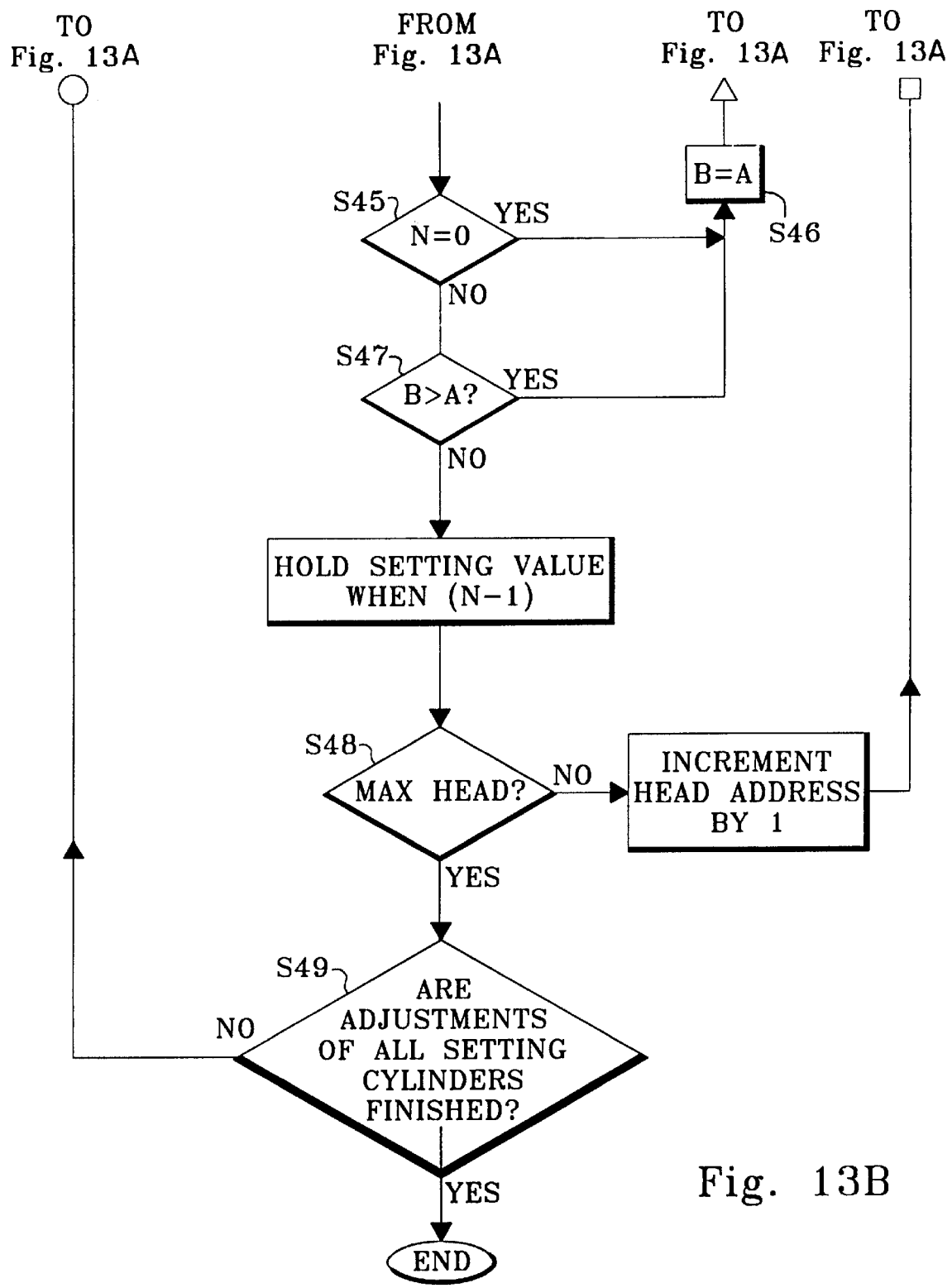

FIGS. 13A and 13B are flowcharts for adjusting the characteristics of the cosine equalizer.

(S41) The processor 19 drives the unillustrated actuator and thus performs the seek of the head to a target cylinder.

(S42) The processor 19 initializes the two parameters A, B to [0]. Next, the processor 19 writes the record data on that cylinder by use of all the heads. Further, the processor 19 selects the head 0.

(S43) The processor 19 sets the set value of the coefficient setting register of the cosine equalizer to the default value. That is, the processor 19 writes the default value to the write register 46. Next, the processor 19 reads the record data through the selected head.

(S44) In this state, the processor 19 reads the sample value Yn when Xn=0 a predetermined number of times from one of the read registers 214, 215, 216. This value X is one of [+1], [0], [−1]. Then, the processor 19 makes a calculation of (Maximum Value−Minimum Value) of the sample values Yn taken in a predetermined number of times. This is set as a parameter A. A standard deviation is calculated instead of this calculation of (Maximum Value−Minimum Value), and the result thereof may be set as the parameter A.

(S45) Next, the processor 19 checks whether the parameter N is [0] or not.

(S46) The processor 19, when the parameter N is [0], for the first processing, updates the measured value B of the last time to the measured value A of this time. Next, the processor 19 stores the work area of the memory 20 with the parameter N and the operation quantity of the correcting converter while making them corresponding to each other. Further, the processor 19 adds Δp to the operation quantity of the correcting D/A converter. This value is written as an operation quantity of the coefficient setting register to the write register 46. Besides, the processor 19 updates the parameter N to (N+1). Then, the processing returns to step S44.

(S47) The processor 19, when the parameter N is not [0], compares the measured value B of the last time with the measured value A of this time. If B>A, the measured value of the last time is not the minimum value, and, hence, the processing goes back to step S46. Whereas if B>A is not established, the measured value of the last time is the minimum value. Hence, the memory 20 shown in FIG. 9 stores the operation quantity, as a result of adjusting the relevant cylinder position of the relevant head, of the correcting D/A converter in the case of (N−1) of the last time.

(S48) Next, the processor 19 checks whether or not the designated head is the maximum (MAX) head. If the designated head is not the maximum head, the designated head address is incremented by 1, and the processing goes back to step S43 of FIG. 13A.

(S49) Whereas if the designated head is the maximum head, the processor 19 examines whether or not adjustments of all the setting cylinders are finished. For instance, the adjusting cylinder is set at the interval of 100 cylinders. The processor 19, when determining that the adjustments of all the setting cylinders are not finished, effects the seek to the next cylinder, and the processing returns to step S42. The processor 19, reversely when determining that the adjustment of all the setting cylinders come to an end, finishes the adjustments.

In this way, as illustrated in FIG. 9, the memory 20 stores the optimum filter coefficient in the cylinder positions where all the heads are set. This operation is carried out at the time of delivery from the factory. Then, at the normal accessing time, the processor 19 receives the selected head address and the cylinder address and reads the filter coefficient corresponding to the selected head address and set for this cylinder address out of the memory 20. This filter coefficient is set in the write register 46.

In this manner, the frequency characteristic value of the cosine equalizer 15 is set to minimize the standard deviation or the difference between the maximum value and the minimum value of the sample values Yn when the determination value Xn=X. It is therefore possible to minimize the adjustment error of the cosine equalizer 15. Further, the characteristic differs per head, and hence the frequency characteristic value is set per head. Moreover, since the regenerative signal is influenced by the variation in the recording density depending on the cylinder position, the filter coefficient is set to the optimum value in accordance with the cylinder position.

As discussed above, the control circuit 19 variably controls the distance between the slice levels of the maximum-likelihood decoder 16, and hence the optimum ternary determination corresponding to the equalization error quantity can be conducted. Further, there can be also performed the maximum decoding operation corresponding to the characteristics of the equalizing circuit and the head.

Given next is an explanation of a modified example of the ternary determination unit. A problem inherent in the PRML system is a scale-up of the circuit. For this reason, it is desirable that the decoder be simply constructed and be high in terms of a decoding capability even under a condition where the S/N ratio is not good.

Positive and negative peaks alternately appear in an even- or odd-numbered sample string of the regenerative signals of the recording apparatus based on a partial-response class IV system. Paying attention to the above-stated fact that the positive and negative peaks alternately appear therein, there is proposed a method of effecting the ternary determination. More specifically, after detecting the positive signal, an upper slice level S0(n+1) is set to a detected slice level Y(n) and a lower slice level S1(n+1) is set to a next slice level while keeping it at a fixed distance A from an upper slice level.

Reversely, after detecting the negative signal, the lower slice level S1(n+1) is set to a detected slice level Y(n) and the upper slice level S0(n+1) is set to a next slice level while keeping it at the fixed distance A from the lower slice level. Further, when detecting [0], both the upper and lower slice levels remain unchanged.

That is, two slice levels S0(n) and S1(n) there are for [+1] and [−1] detections. A difference between the two slice levels S0(n) and S1(n) is predetermined to a suitable value A (S0(n)−S1(n)=A>0).

Supposing that there is the sample value Y(n), and when Y(n)≧S0(n), a ternary regenerative signal A(n) is set such as [+1], S0(n+1)=Y(n), and S1(n+1)=Y(n)−A. Also, when S1(n)<Y(n)<S0(n), the ternary regenerative signal A(n) is set such as [0], S0(n+1)=S0(n), and S1(n+1)=S1(n). Further, when Y(n)≦S1(n), the ternary regenerative signal A(n) is set such as [−1], S0(n+1)=Y(n)+A, and S1(n+1)=Y(n).

If such a ternary determination is carried out, the negative or positive signal is easy to detect after detecting the positive or negative signal, with the result that [1] is not mistaken for [0] due to a level drop.

If each of such ternary determination circuits is constructed in a discrete manner, the configuration becomes complicated. Further, a determination speed is lowered, and, in turn, the maximum-likelihood decoding speed is also decreased. Moreover, it is desirable that the difference between the two slice levels be changed according to the characteristics of every head and every cylinder. However, adding such a function involves an intricacy in terms of configuration.

Under such circumstances, in this modified example, there is provided the maximum-likelihood decoder for making the ternary determination with a simpler construction.

FIG. 14 is a diagram illustrating a construction of the maximum-likelihood decoder in one embodiment of the present invention.

As depicted in FIG. 14, a ternary determination circuit 51 performs ternary determinations of the sample values Y(n) equalized by a partial equalizer 15 (see FIG. 1) and outputs ternary determination results A(n). A data buffer 52 holds a predetermined number of ternary determination results A(n) and outputs an item of demodulation data X(n). An error detection correcting circuit 53 detects an error from the ternary determination results S(n) and thus corrects the corresponding data in the data buffer 52. Note that the numeral 54 designates an address mark detection circuit.

Figure 17:
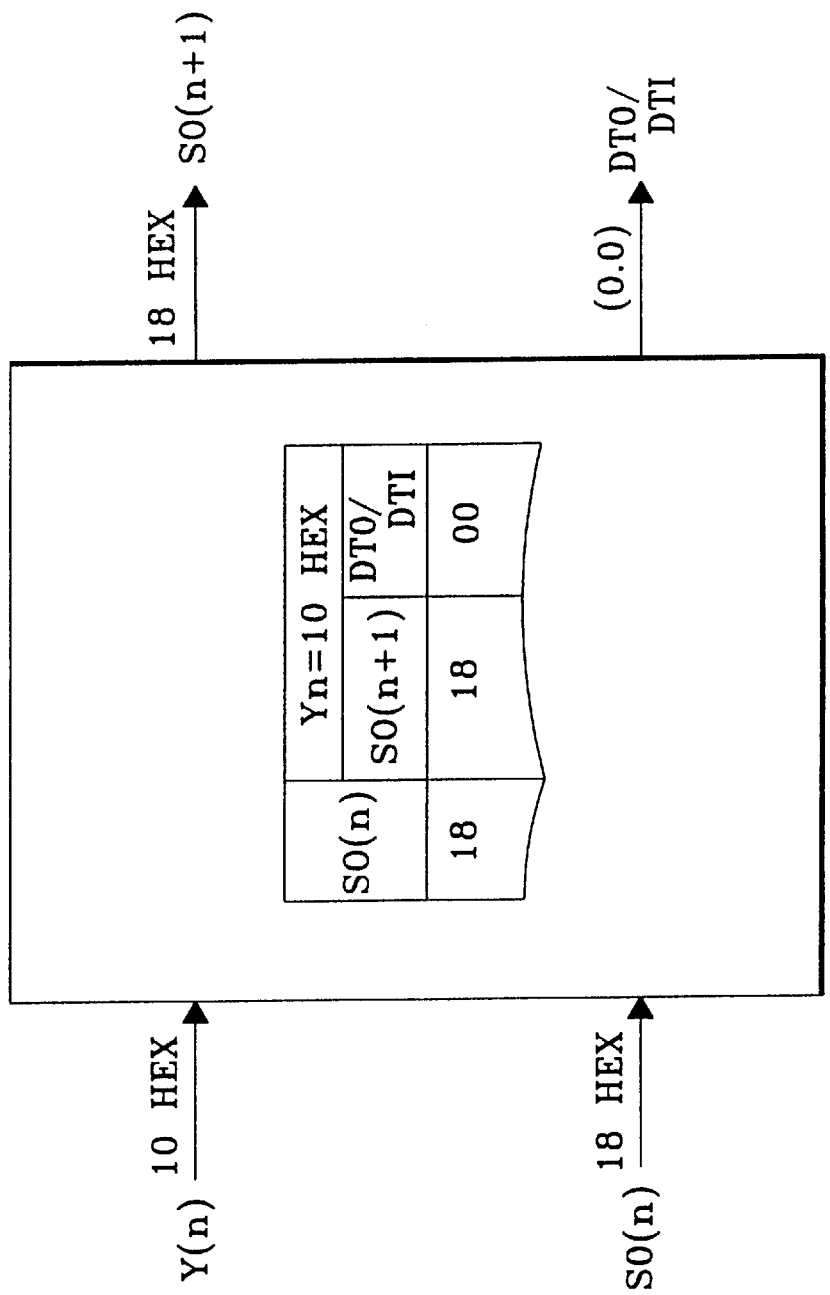
FIG. 17 is a diagram of assistance in explaining a converting operation in the construction of FIG. 15A.

FIGS. 15A and 15B are diagrams illustrating the ternary determination circuit of FIG. 14. FIG. 16 is an explanatory diagram showing a conversion table of the memory of FIG. 15A. FIG. 17 is a diagram of assistance in explaining a converting operation of FIG. 15A.

As shown in FIG. 15A, the ternary determination circuit 51 comprises an input buffer 100, a memory 110 and a output buffer 120. The input buffer 100 holds high-order 6 bits of the 8-bit sample value Y(n) to be inputted.

The memory 110 is constructed of a RAM. Inputted to the memory 110 are the sample value Y(n) of the input buffer 100 and the present 6-bit upper slice level S0(n). Then, the memory 110 outputs 2-bit ternary determination results DT0, DT1, as shown in FIG. 15B, and a next 6-bit upper slice level S0(n+1). The output buffer 120 holds the next 6-bit upper slice level S0(n+1) and feeds it back to a slice level input of the memory 110.

As illustrated in FIG. 16, the conversion table stored in the memory 110 is a correspondence table of the ternary determination result DT0, DT1 and the next upper slice level S0(n+1) that correspond to the sample value Y(n) and the upper slice level S0(n). This correspondence relationship conforms with the relationship between the above-mentioned ternary determinations.

More specifically, when Y(n)≧S0(n), the ternary regenerative signal A(n) (DT0, DT1) is [+1] (10), and therefore S0(n+1)=Y(n). Further, when S1(n)<Y(n)<S0(n), the ternary regenerative signal A(n) (DT0, DT1) is [0] (00), and hence S0(n+1)=S0(n). Moreover, when Y(n)≦S1(n)=S0(n) −A, the ternary regenerative signal A(n) (DT0, DT1) is [−1] (01), and therefore S0(n+1)=Y(n)+A.

For instance, as shown in FIG. 16, when Y(n)=00 (HEX) and S0(n)=00 (HEX), Y(n)≧S0(n), and therefore the ternary regenerative signal DT0, DT1 contains +1 (10), S0(n+1)=Y(n)=00 (HEX). Similarly, when Y(n)=3F (HEX) and S0(n)=00 (HEX), Y(n)≧S0(n), and therefore the ternary regenerative signal DT0, DT1 contains +1 (10), S0(n+1)=Y(n)=3F (HEX).

Accordingly, as shown in FIG. 17, when Y(n)=10 (HEX) and S0(n)=18 (HEX), S1(n)<Y(n)<S0(n), and therefore the ternary regenerative signal DT0, DT1 is outputted as 0(00), S0(n+1)=S0(n)=18 (HEX).

Such a conversion table is stored in the memory 110, thereby simplifying the configuration of the ternary determination circuit. Further, a general-purpose memory is usable, and hence the circuit can be constructed at low costs. Besides, the ternary determination result can be obtained simply by accessing the memory 110, whereby the ternary determination can be done at a high speed. In addition, the difference between the two slice levels can be changed simply by varying the content of the memory 110, and this makes the ternary determination characteristic changeable.

This conversion table is prepared per head or cylinder, with the result that the conversion table corresponding to every head or cylinder can be used.

Next, a path memory and an error correction circuit will be explained.

Figure 18:
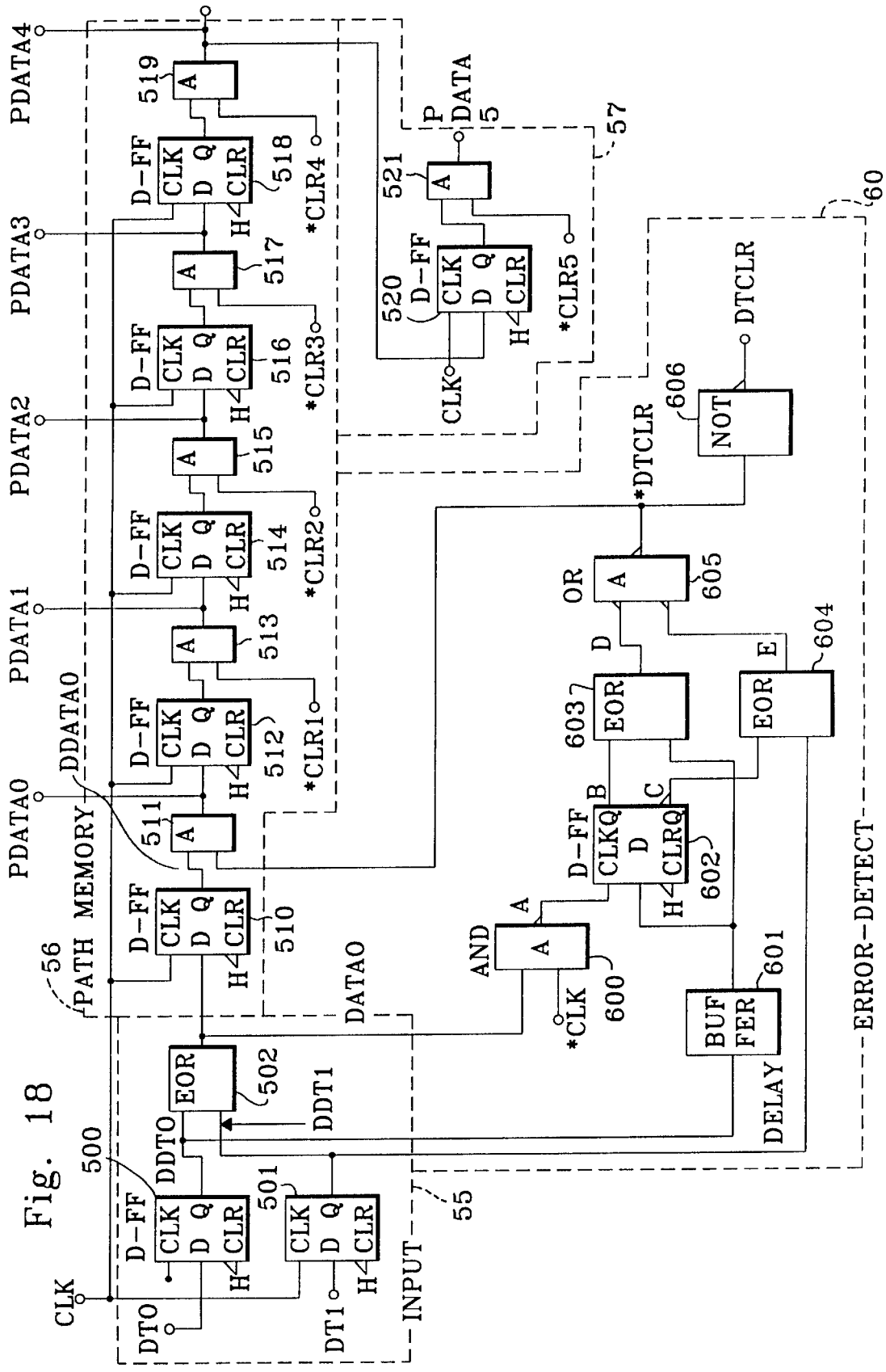
FIG. 18 is a diagram illustrating a configuration of a data buffer in the construction of FIG. 14.
Figure 19:
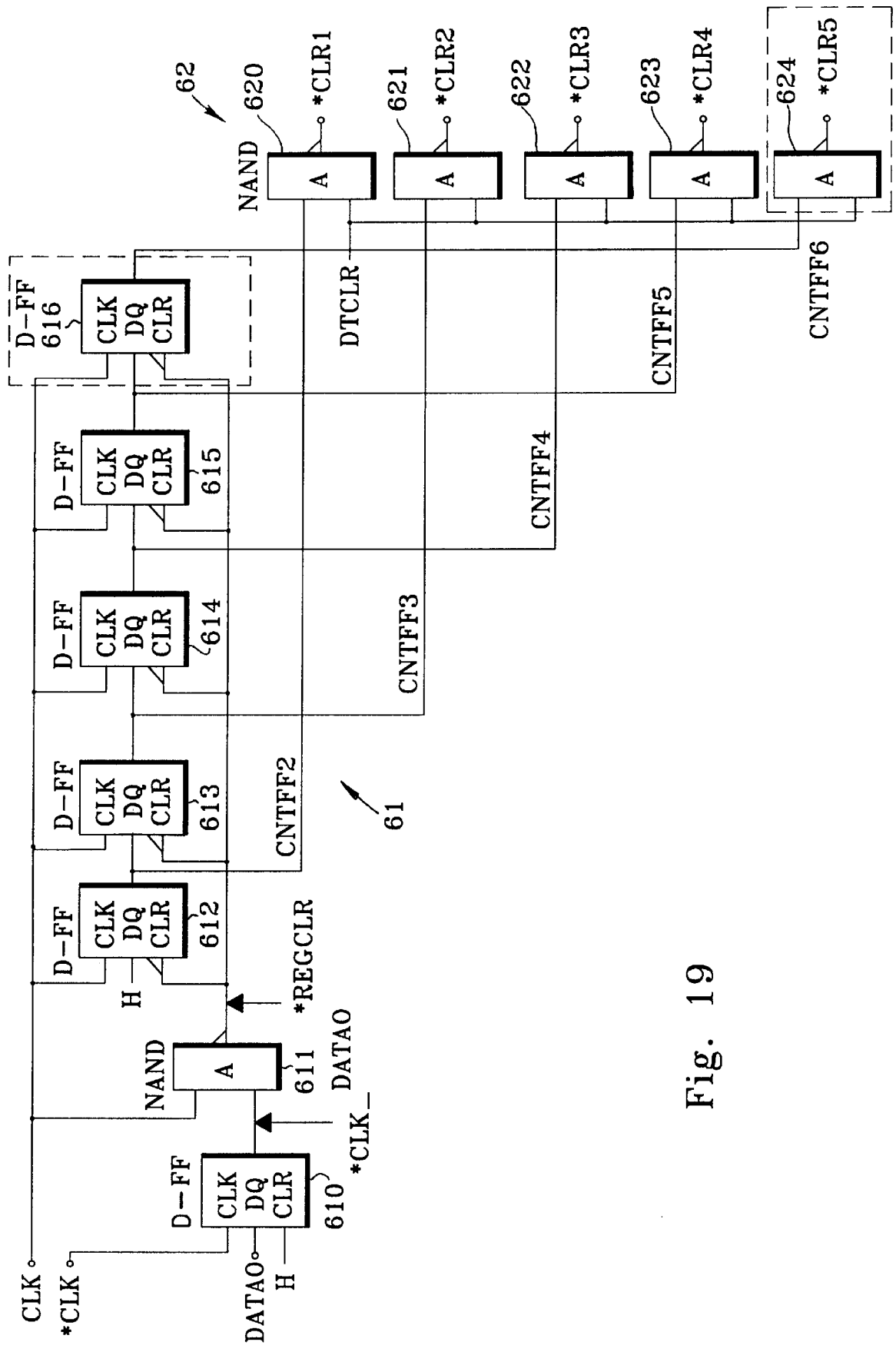
FIG. 19 is a diagram showing a configuration of an error detection circuit in the construction of FIG. 14.
Figure 20:
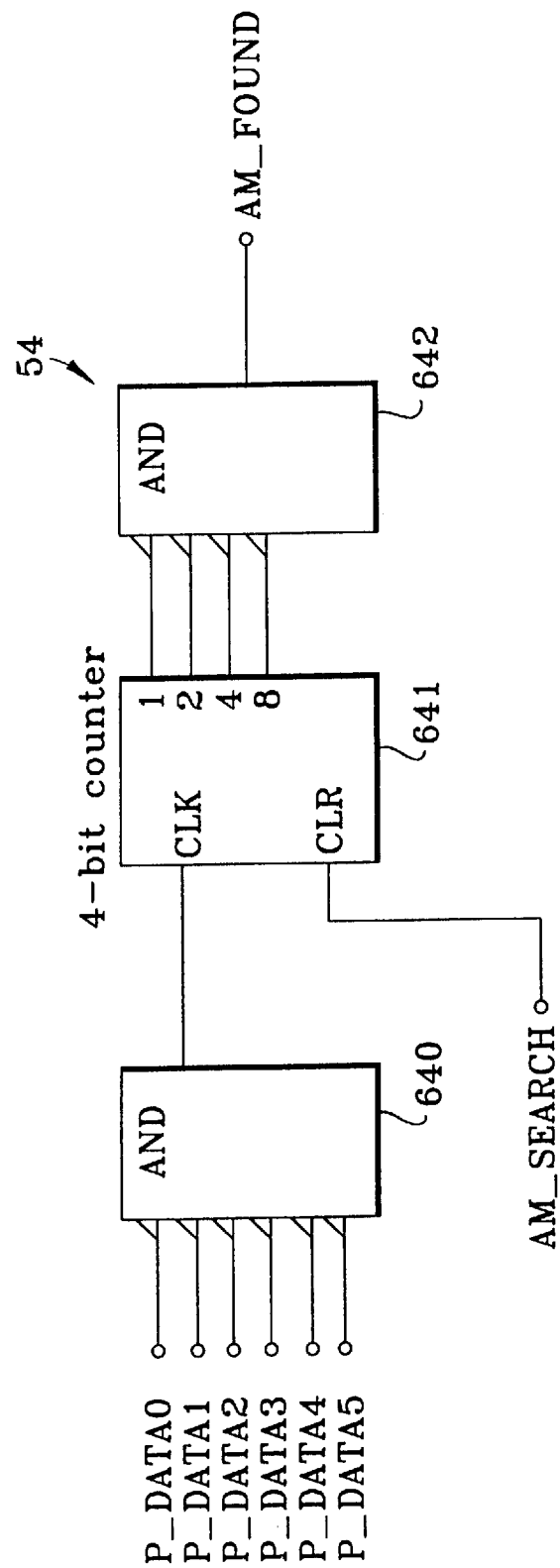
FIG. 20 is a diagram showing a configuration of an address mark detection circuit in the construction of FIG. 14.

FIG. 18 is a diagram illustrating a configuration of the data buffer of FIG. 14. FIG. 19 is a diagram showing a configuration of the error correction circuit of FIG. 14. FIG. 20 is a diagram illustrating a configuration of the address mark detection circuit.

As depicted in FIG. 18, the data buffer 52 is constructed of a ternary data input circuit 55, a path memory circuit 56 and an address mark detection path memory circuit 57. The ternary data input circuit 55 includes registers 500, 501 for respectively holding the ternary determination values DT0, DT1 and an EOR circuit 502 for taking the exclusive OR of outputs DDT0, DDT1 of the two registers 500, 501.

Accordingly, the EOR circuit 502 outputs [1] when the ternary determination values DT0, DT1 are [+1] (10) and [−1] (01). Then, the EOR circuit 502 outputs [0] when both of the ternary determination values DT0, DT1 are [0].

The path memory circuit 56 comprises 5-stage series buffer registers 510, 512, 514, 516, 518 and AND gates 511, 513, 515, 517, 519. The buffer register 510 holds an output of the EOR circuit 502 and outputs it to the AND gate 511. The AND gate 511 takes the AND of a data clear signal *DTCLR with an output of the buffer register 510 and outputs path data P-DATA0.

The buffer register 512 holds an output of the AND gate 511 and outputs it to the AND gate 513. The AND gate 513 takes the AND of a clear signal *CLR1 with an output of the buffer register 512 and outputs path data P-DATA1.

The buffer register 514 holds an output of the AND gate 513 and outputs it to the AND gate 515. The AND gate 515 takes the AND of a clear signal *CLR2 with an output of the buffer register 514 and outputs path data P-DATA2. The buffer register 516 holds an output of the AND gate 515 and outputs it to the AND gate 517. The AND gate 517 takes the AND of a clear signal *CLR3 with an output of the buffer register 516 and outputs path data P-DATA3.

The buffer register 518 holds an output of the AND gate 517 and outputs it to the AND gate 519. The AND gate 519 takes the AND of a clear signal *CLR4 with an output of the buffer register 518 and outputs path data P-DATA4. This item of path data P-DATA4 turns out demodulation data.

The buffer registers 510–518 of the path memory circuit 56 are, because of the number of consecutive data [0] being restricted by 5, constructed at five stages.

The address mark detection path memory circuit 57 is, for detecting an address mark, added with a buffer register 520 and an AND gate 521. The buffer register 520 holds an output of the AND gate 519 and output it to the buffer register 521. The AND gate 521 takes the AND of a clear signal *CLR5 with an output of the buffer register 520 and outputs path data P-DATA5.

The error detection correcting circuit 53 has an error detection circuit 60 (FIG. 18), a pointer circuit 61 (FIG. 19) and an error correction signal creating circuit 62 (FIG. 19). The error detection circuit 60 includes an AND gate 600, a timing adjustment delay buffer circuit 601, a register 602, a pair of EOR circuits 603 and 604, an OR circuit 605 and an inverter circuit 606.

The AND gate 600 outputs the clock when the output of the EOR circuit 502 is [1], thus performing the error detecting operation. The register 602, with the output of the AND gate 600 serving as the clock, holds the output of the buffer circuit 601.

The EOR circuit 603 takes the exclusive OR of an output Q of the register 602 with the output of the buffer circuit 601. The EOR circuit 604 takes the exclusive OR of the inverted output Q of the register 602 with an output DDT1 of the input register 601.

The OR circuit 605 takes the OR with respect to the two EOR circuits 603, 604 and outputs the data clear signal *DTCLR. The inverter circuit 606 inverts the data clear signal *DTCLR. The operation of this error detection circuit will be described with reference to FIG. 21.

As illustrated in FIG. 19, the pointer circuit 61 includes a register 610 for holding the data DATA0, a NAND gate 611 and a counter constructed of 5-stage flip-flops 612–616. The register 610 outputs the data DATA0 synchronizing with the clock *CLK. The NAND gate 611 output data *REGCLR of a width of the clock CLK.

The flip-flop 612 is switched ON when a single piece of [0] is inputted. The flip-flop 612 is cleared, when the data *REGCLR is turned ON after inputting [1]. The flip-flop 613 is switched ON when two pieces of [0] are consecutively inputted but is cleared when the data *REGCLR is turned ON after inputting [1].

The flip-flop 614 is switched ON when three pieces of [0] are consecutively inputted and is cleared when the data*REGCLR is turned ON after inputting [1]. The flip-flop 615 is switched ON when four pieces of [0] are consecutively inputted but is cleared when the data *REGCLR is turned ON after inputting [1].

The flip-flop 616 is a zero counter for detecting the address mark. The flip-flop 616 is switched ON when five pieces of [0] are consecutively inputted but is cleared when the data *REGCLR is turned ON after inputting [1].

The error correction signal creating circuit 62 takes the ANDs of the respective data clear signals DTCLR with count signals CNTFF2–CNTFF6 of the flip-flops 612–626. The error correction signal creating circuit 62 has five AND gates 620–624 for outputting clear signals *CLR1–*CLR5.

As shown in FIG. 20, the address mark detection circuit 54 includes an AND gate 640, a 4-bit counter 641 and an AND gate 642. The AND gate 640 takes the AND of pieces of path data P-DATA0–P-DATA5 and detects a sequence of six pieces of [0]. The counter 641 is cleared by an address mark search signal AM-SEARCH and counts outputs of the AND gate 640. The AND gate 642, outputs an address mark detection signal AM-FOUND when a value of the counter 641 becomes [2].

Figure 21:
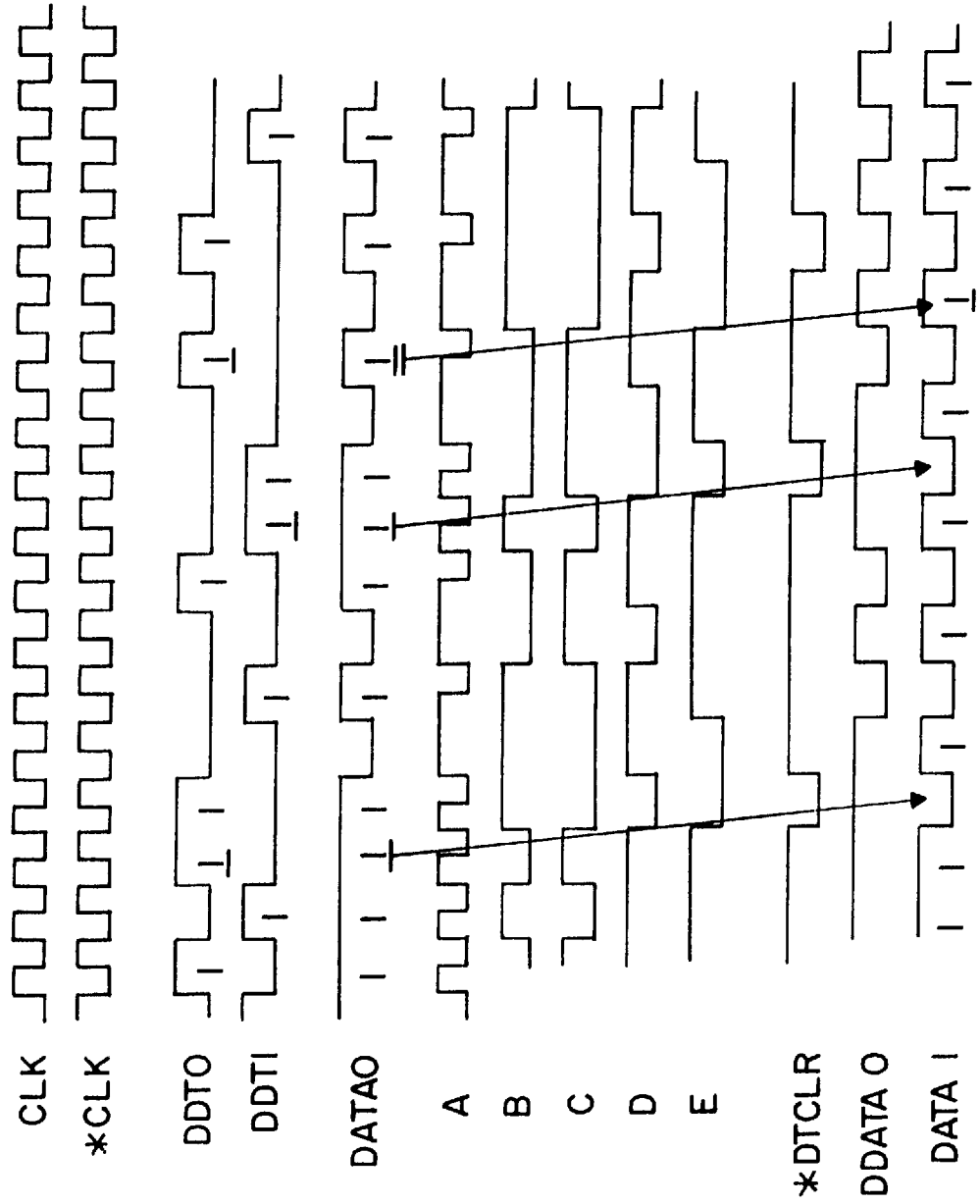
FIG. 21 is a time chart of an error detecting operation in the construction of FIG. 19.
Figure 22:
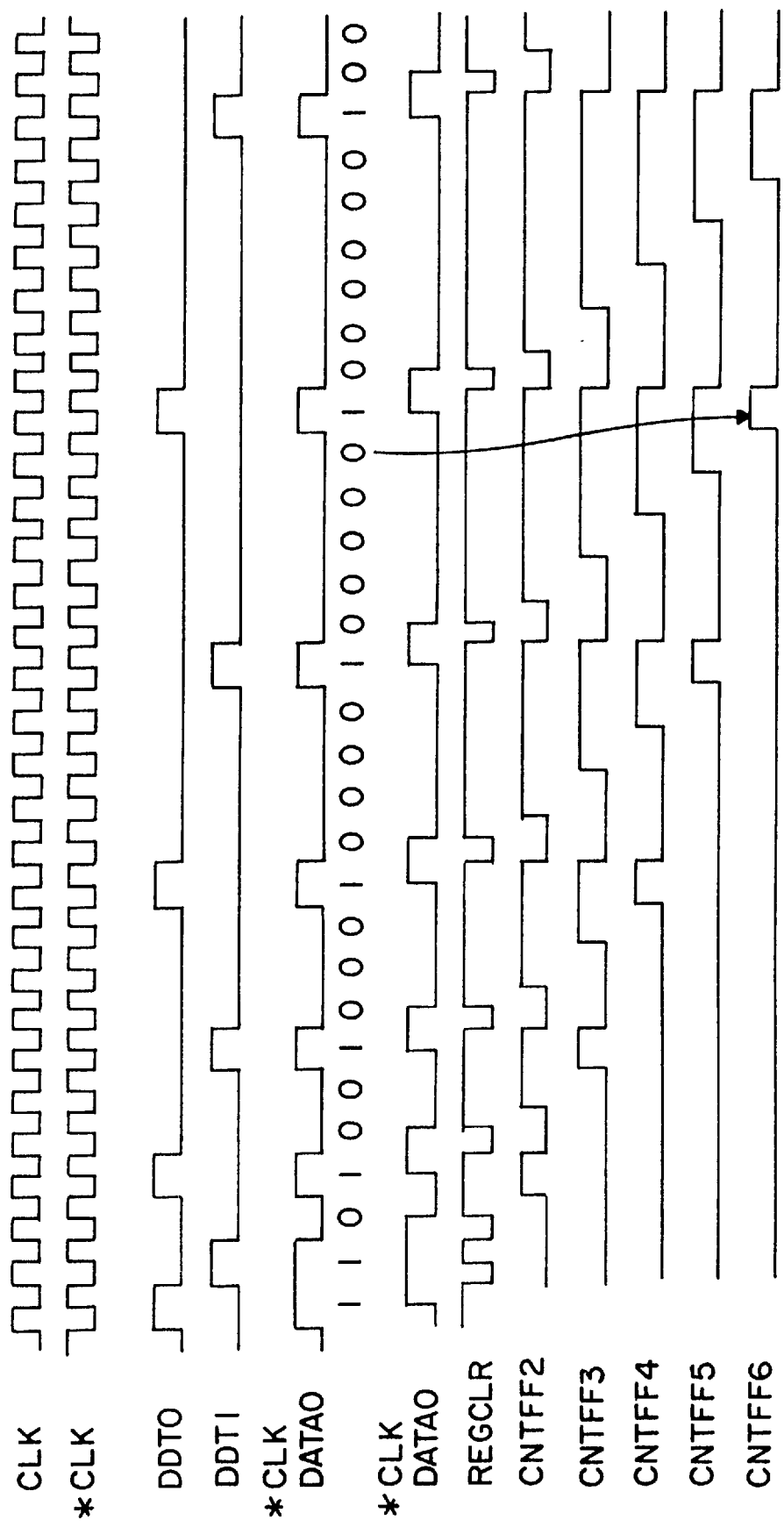
FIG. 22 is a time chart of an error correcting operation in the construction of FIG. 19.
Figure 23:
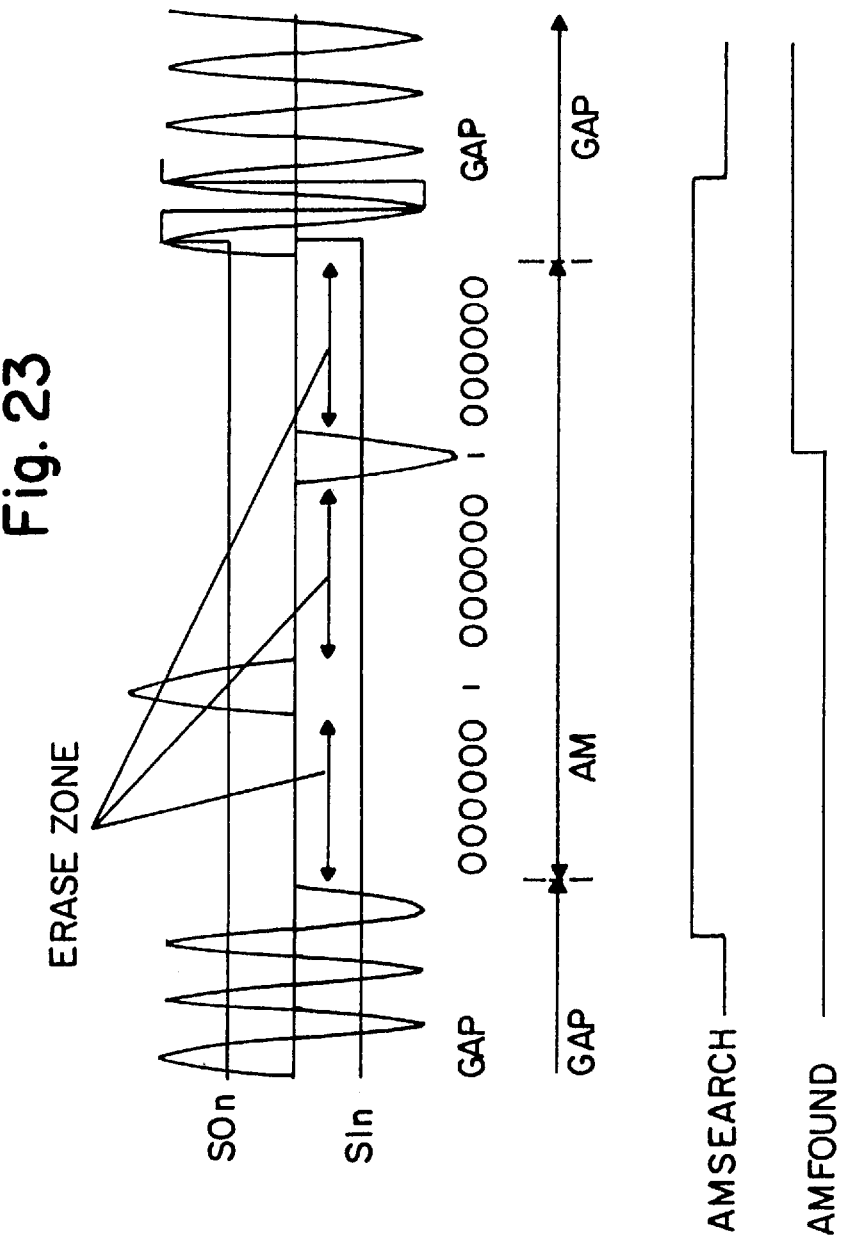
FIG. 23 is an explanatory diagram showing an address mark in FIG. 20.

FIG. 21 is a time chart showing the error detecting operation. FIG. 22 is a time chart showing the error correcting operation. FIG. 23 is a diagram of assistance in explaining the address mark.

To start with, the error detecting operation will be explained with reference to FIG. 21. The AND gate 600 takes the AND of the data DATA0 with the clock *CLK, resulting in a signal A. The flip-flop 602, with the signal A serving as a clock, holds the data DDT0, and, hereupon, the output Q turns out a signal B. An inverted output Q thereof becomes a signal C.

The EOR circuit 603 takes the exclusive OR of the signal B with the data DDT0, resulting in a signal D. Further, the EOR circuit 604 takes the exclusive OR of the signal C with the data DDT1, resulting in a signal E. Accordingly, the data clear signal *DTCLR of the OR circuit 605 is outputted as shown in the Figure. That is, when pieces of data having the same numeral are consecutively inputted, there is outputted the data clear signal *DTCLR for correcting the previous data to [0], and the AND gate 511 corrects the data DATA1.

As seen in FIG. 21, the data to be corrected is underlined. When pieces of data marked with the same numerals are consecutively inputted (e.g., +1 and +1), there is generated the data clear signal *DTCLR for deleting the underlined data. Then, there is taken the AND with respect to DDATA0 with a delay of one clock from the data DATA0, thereby obtaining corrected data P-DATA0 (DATA1).

However, if the data remains unchanged, for instance, [0] enters between [+1] and [+1], the data can not be corrected. Double-underlined data [1] in FIG. 21 corresponds to this. Then, as illustrated in FIG. 18, the path memory circuit 56 is further provided with quintuple combinations of a register and an AND gate. Provided further are the pointer circuit 61 and the error correction signal creating circuit 62 that are shown in FIG. 19.

As illustrated in FIG. 22, the flip-flop 612 is switched ON when a single piece of [0] is inputted but is cleared when the data *REGCLR is turned ON after inputting [1], thus outputting a counter signal CNTFF2. The flip-flop 613 is switched ON when two pieces of [0] are consecutively inputted but is cleared when the data *REGCLR is turned ON after inputting [1], thus outputting a counter signal CNTFF3.

The flip-flop 614 is switched ON when three pieces of [0] are consecutively inputted but is cleared when the data *REGCLR is turned ON after inputting [1], thus outputting a counter signal CNTFF4. The flip-flop 615 is switched ON when four pieces of [0] are consecutively inputted but is cleared when the data *REGCLR is turned ON after inputting [1], thus outputting a counter signal CNTFF5.

The flip-flop 616 is switched ON when five pieces of [0] are consecutively inputted but is cleared when the data *REGCLR is turned ON after inputting [1], thus outputting a counter signal CNTFF6.

Accordingly, if there is one piece of [0] between data having the same numeral, the counter 612 and the AND gate 620 cooperate to generate a clear signal *CLR1, whereby the data is corrected by the AND gate 513. If there are two pieces of [0] between the data having the same numeral, the counter 613 and the AND gate 621 cooperate to generate a clear signal *CLR2, whereby the data is corrected by the AND gate 515.

If there are three pieces of [0] between the data having the same numeral, the counter 614 and the AND gate 622 cooperate to generate a clear signal *CLR3, whereby the data is corrected by the AND gate 517. If there are four pieces of [0] between the data having the same numeral, the counter 615 and the AND gate 623 cooperate to generate a clear signal *CLR4, whereby the data is corrected by the AND gate 519.

If there are five pieces of [0] between the data having the same numeral, the counter 616 and the AND gate 624 cooperate to generate a clear signal *CLR5, whereby the data is corrected by the AND gate 521.

In this way, the maximum-likelihood decoding operation is executed.

Next, the operation of detecting the address mark will be discussed with reference to FIG. 23. A read/write clock of the magnetic disc is, when reading no data, synchronized with a clock synchronizing with a rotation of the magnetic disc. For this reason, before reading the data, the read/write clock is not synchronized with a read waveform of the magnetic disc, and, therefore, the correct data can not be read. Then, before reading the data, the operation take the synchronism is effected by setting the read/write clock in phase.

A phase synchronism thereof is taken by reading a gap pattern of the single frequency that is written onto the magnetic disc. In the magnetic disc apparatus, the gap pattern is at first detected and the read therefrom, thus taking the phase synchronism. As illustrated in FIG. 23, pieces of [0] having a length which is not seen in the codes for encoding are written in an area of the gap pattern. This area is termed an address mark.

The gap pattern is detected by finding out this address mark. Then, the gap pattern is read, thereby starting a phase pull-in of the read/write clock. When synchronized, the data is to be read.

As shown in FIG. 23, three patterns each containing a sequence of six pieces of [0] appear in the address mark (AM). Accordingly, the address mark can be detected by finding out that two patterns each containing the sequence of six pieces of [0].

As shown in FIG. 18, the path memory 56 capable of holding five pieces of consecutive [0] is provided with one path memory 57. Provided further is the address mark detection circuit 54 shown in FIG. 20. It is thus possible to detect the address mark in which there continue two patterns each containing the sequence of six pieces of [0].

In this manner, the address mark can be detected with only an addition of the simple circuit by making effective use of the path memory 56 of the data buffer 52. Thus, the address mark is detectable with the simple circuit.

In this modified example, the ternary determination circuit is constructed of the memory, and hence the configuration of the maximum-likelihood decoder is simplified. Also, the ternary determination can be made simply by accessing the memory, and it is therefore possible to obtain the ternary determination output at the high speed. Further, the optimum ternary determination characteristic corresponding to the head characteristic can be easily changed.

Next, AGC and PLL loops will be explained.

In a partial-response regenerative system, an error signal in the AGC and PPL loops is given as a digital value. For this reason, there is required a converter for converting such a digital error signal into an analog control quantity with a simple construction.

An automatic gain control circuit (AGC circuit) used for the partial-response system has a feedback loop based on the digital data in addition to the feedback loop based on the analog quantity. Further, a phase synchronizing circuit also has the PLL loop based on the digital data. In this digital loop, the digital error signal is converted into the analog control quantity, and hence a charge pump type D/A converter is employed.

In a control loop based on the AGC digital data, a control voltage is generated. For this purpose, a subtracter subtracts a target value (digital amplitude value) from waveform discrete data (digital output) obtained through a digital equalizer, thereby obtaining n-bit amplitude error signals. These amplitude error signals are inputted to n-pieces of charge pump circuits and thus converted into current values.

Each of n-pieces of the charge pumps converts the signal into the current value corresponding to a weight of each of n-bits. Then, a sum of outputs of n-pieces of the charge pump circuits is converted into a voltage by a low-pass filter and turns out an AGC control voltage output.

Similarly, in a phase synchronizing loop circuit by the partial-response system, respective bit outputs of 7-bit digital phase error signals from a phase error detector are inputted to seven pieces of the charge pump circuits and thereby converted into current values corresponding to the bit weights. Then, a sum of the outputs of the seven charge pump circuits is inputted to the filter and thereby converted into a control voltage, whereby a voltage controlled oscillator is controlled.

Generally, in the automatic gain control circuit and the phase synchronizing circuit, a loop gain when pulled in is set higher than at the time of a steady operation, whereby the target amplitude is reached in a shorter time. Further, at the time of the steady operation, the circuit is designed to prevent a follow-up with fast amplitude fluctuations due to variations in the frequency of the data by reducing the loop gain and to absorb slow amplitude fluctuations in modulation, etc.

Hitherto, as an element for changing this loop gain, a single charge pump circuit is provided bitwise of the output data of the error signal. Moreover, there has been taken such a method that the current value of each of the full-bit charge pumps is switched over to a larger value when in the pull-in state but to a smaller value when in the steady state by a pull-in operation/steady operation switching signal.

However, the respective charge pump circuits are needed for the full input bits, and, consequently, there arises a problem in which the circuit configuration becomes complicated. For this reason, the price of the apparatus increases.

Herein, the charge pump type A/D converter having a simple construction will be stated.

Figure 24:
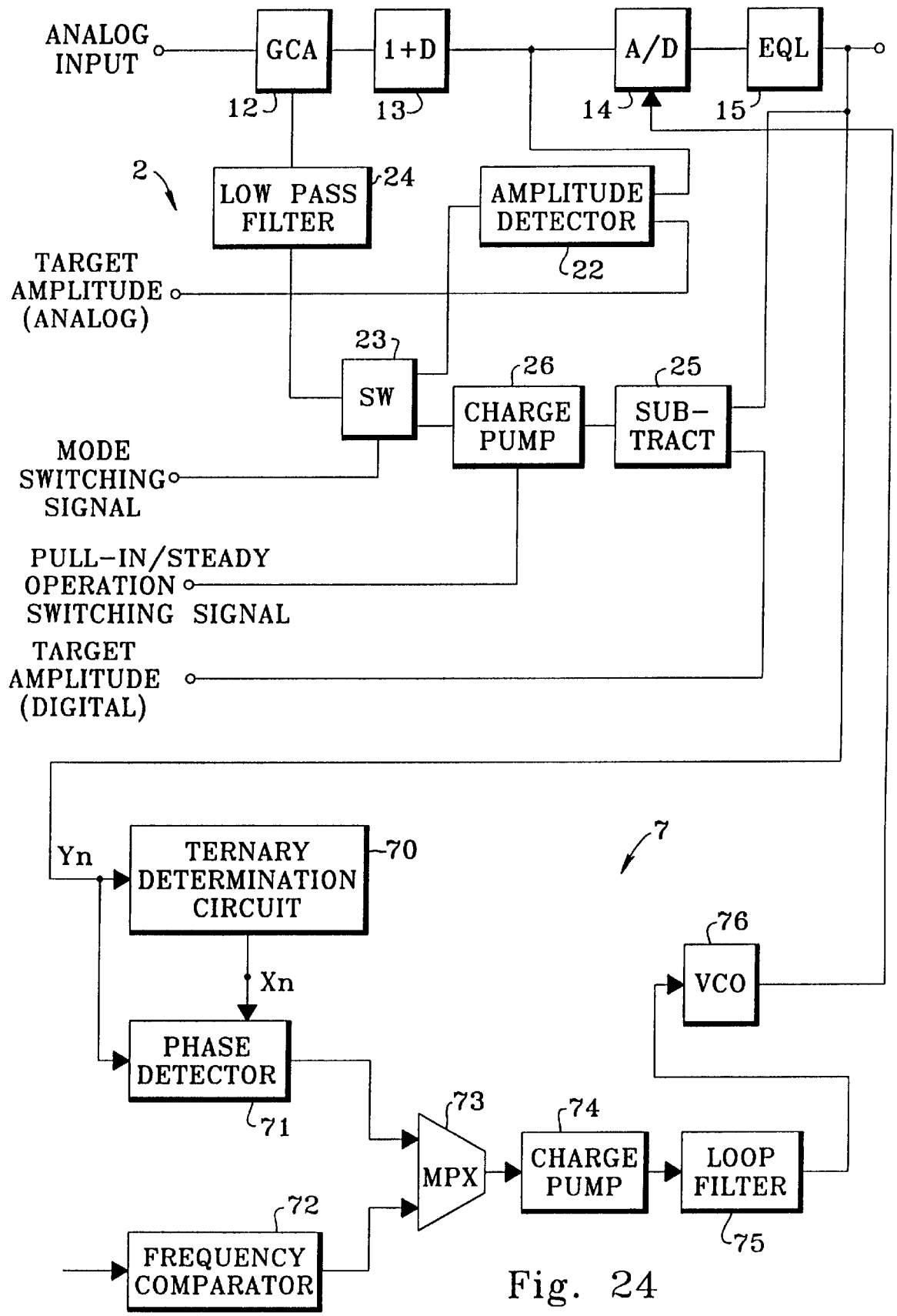
FIG. 24 is a block diagram illustrating the PRML regenerating apparatus in still another embodiment of the present invention.

FIG. 24 is a block diagram of a control loop of a PRML regenerative circuit in one embodiment of the present invention.

Referring to FIG. 24, the same elements as those shown in FIG. 1 are marked with the like numerals. As shown in FIG. 24, the gain control type amplifier (GCA) 12 amplifies a read signal read by the magnetic head from the magnetic disc. This gain control amplifier 12 is capable of making its gain variable by a control voltage from outside. The electric filter 13 is a filter for equalizing a waveform corresponding to (1+D). Note that D means an item of data inputted before one sampling, and (1+D) implies a sum of the data inputted at the present time and the data delayed by 1 sampling period.

The n-bit A/D converter 14 converts the analog outputs into n-bit digital outputs. The digital equalizer 15 is constructed of a known cosine equalizer. The digital equalizer 15 auto-equalizes the signal corresponding to the partial-response characteristic in the radial direction of the disc.

An automatic gain control circuit 2 has an analog AGC loop and a digital AGC loop. An amplitude detector 22 detects a difference between an analog output amplitude of the electric filter 13 and an analog target amplitude. A switching circuit 23 performs a switchover from the analog AGC loop to the digital AGC loop. A low-pass filter 24 converts an output current of the switching circuit 23 into a voltage, thereby generating a control voltage of the gain control amplifier 12.

A subtracter 25 subtracts a digital target value from waveform discrete data given from the digital equalizer 15 and outputs a digital error value. An n-bit charge pump type D/A converter 26 converts n-bit digital error values into analog current quantities and outputs these quantities to the switching circuit 23.

The operation of the automatic gain control circuit 2 will be explained. To begin with, the switching circuit 23 is connected to the amplitude detector 22, thus forming the analog AGC loop. That is, the switching circuit 23 outputs, to the low-pass filter 24, an analog error quantity obtained by subtracting the analog target amplitude from the analog output of the electric filter 13 of the amplitude detector 22. A control voltage is thereby generated from the analog error quantity and then fed back to the gain control amplifier 12, thus controlling the amplitude.

After controlling the amplitude in this analog AGC loop, the switching circuit 23 effects the switchover to the digital AGC loop. That is, the switching circuit 23 is connected to the charge pump type D/A converter 26. Accordingly, the charge pump type D/A converter 26 converts, into the analog current quantity, a digital error value of the subtracter 25, which value is obtained by subtracting the digital target value from the waveform discrete data given from the digital equalizer 15, and this analog current quantity is inputted to the switching circuit 23. This analog quantity is converted into a voltage by the low-pass filter 24, whereby the gain control amplifier 12 is controlled.

Next, the phase synchronizing circuit (PLL loop) 7 includes a ternary determination unit 70 for making a ternary determination about a sample output Y(n) of the digital equalizer 15 and outputting a ternary determination output X(n). The ternary determination unit 70 compares the sample value Y(n) with two slice levels S1, S2 and effects a determination in the form of determination values X(n) of [+1], [0], [−1].

A phase detector 71 calculates a phase difference $\Delta\tau(n)$ from the sample output Y(n) and the ternary determination output X(n) as well. For example, this phase detector for the class-IV of the PRML is stated in an article titled [FAST TIMING RECOVERY FOR PARTIAL-RESPONSE SIGNALING SYSTEMS] (1989 IEEE CH2655-9/89/0000-0573) written by F. Dolivo. W. Scott and G. Ungerbock.

More specifically, the phase difference $\Delta\tau(n)$ is expressed by the following expression:

$$\Delta\tau(n)=Y(n-1)\cdot X(n)-Y(n)\cdot X(n-1)$$

where Y(n) is the sampling voltage of the read signal after effecting the partial equalization, and X(n) is the result of the ternary determination by the ternary determination unit 70.

A frequency comparator 72 determines a frequency of a servo signal read from a servo surface of the magnetic disc and outputs a frequency error. A multiplexer circuit 73, when reading from the magnetic disc, outputs a phase error of the phase detector 71 but, when effecting no reading from the magnetic disc, outputs a frequency error of the frequency comparator 72.

A charge pump type D/A converter 74 converts a digital error signal of the multiplexer circuit 73 into an analog current quantity. A loop filter 75 is constructed of the low-pass filter. The loop filter 75 converts the analog current quantity into a voltage, a hereby controlling a voltage control oscillator 76. The voltage control oscillator 76 generates a synchronous clock utilized as a sample clock of the A/D converter 14.

The operation of the phase synchronizing circuit 7 will be described. During the non-read processing from the magnetic disc, the multiplexer circuit 73 is connected to the frequency comparator 72. With this connection, the voltage control oscillator 76 generates a clock signal synchronizing with the frequency of the servo signal.

On the other hand, during the read processing from the magnetic disc, the multiplexer circuit 73 is connected to the phase detector 71. With this connection, the voltage controlled oscillator 76 generates a clock controlled by the phase error of the sample output of the digital equalizer 15.

Figure 25:
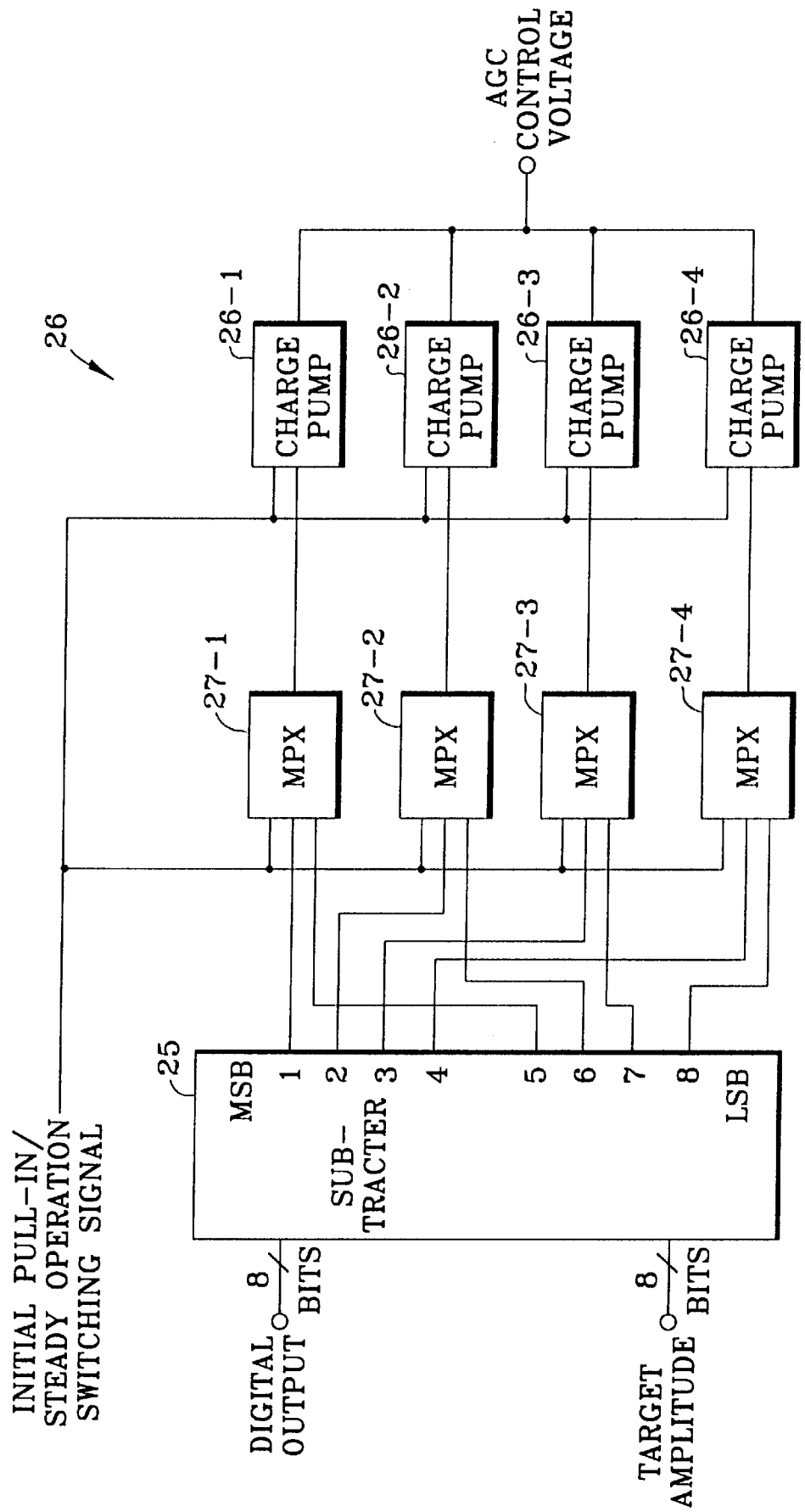
FIG. 25 is a block diagram showing a charge pump type D/A converter in FIG. 24.
Figure 26:
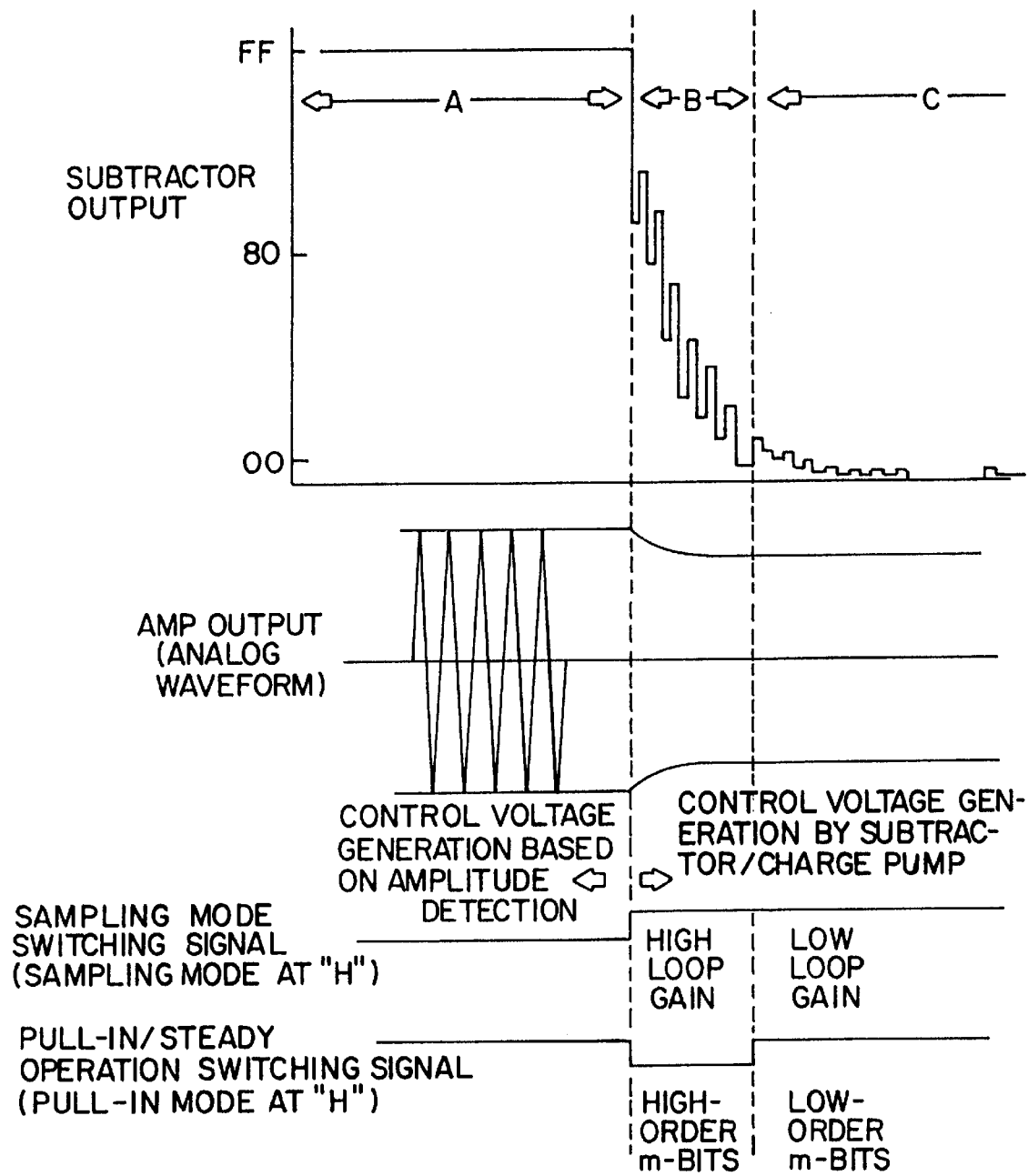
FIG. 26 is an explanatory diagram of the operation in FIG. 25.

FIG. 25 is a block diagram illustrating the charge pump type D/A converter of the automatic gain control circuit 2 of FIG. 24. FIG. 26 is a diagram of assistance in explaining the operation thereof.

As illustrated in FIG. 25, the charge pump type D/A converter 26 is provided with four multiplexers 27-1 through 27-4. In an output of the subtracter 25, the most significant bit is marked with an output terminal number [1], while the least significant bit is marked with an output terminal number [8]. Outputs with the output terminal numbers [1], [5] are inputted to the multiplexer 27-1. Outputs with the output terminal numbers [2], [6] are inputted to the multiplexer 27-2. Outputs with the output terminal numbers [3], [7] are inputted to the multiplexer 27-3. Outputs with the output terminal numbers [4], [8] are inputted to the multiplexer 27-4.

An initial pull-in/steady operation switching signal is inputted to each of the multiplexers 27-1 through 27-4. Then, when the switching signal indicates the initial pull-in, the respective multiplexers 27-1 through 27-4 select the outputs with the output terminal numbers [1], [2], [3], [4]. On the other hand, when the switching signal indicates the steady operation, the multiplexers 27-1 through 27-4 select the outputs with the output terminal numbers [5], [6], [7], [8].

Further, the charge pump type D/A converter 26 is provided with four charge pump circuits 26-1 through 26-4 connected to the multiplexers 27-1 through 27-4. The initial pull-in/steady operation switching signal is also inputted to each of these charge pump circuit 26-1 through 26-4. Then, when the switching signal indicates the initial pull-in, the respective charge pump circuits 26-1 through 26-4 output currents of 128 mA, 64 mA, 32 mA, 16 mA. Further, when the switching signal indicates the steady operation, the charge pump circuits 26-1 through 26-4 output currents of 8 mA, 4 mA, 2 mA, 1 mA.

That is, the multiplexers 27-1 through 27-4 selects, when in the initial pull-in operation, high-order 4 bits but selects, when in the steady operation, low-order 4 bits. Further, each of the charge pump circuits 26-1 through 26-4 outputs, when in the steady operation, a current corresponding to a weight of the low-order 4 bits but outputs, when in the initial pull-in operation, a current corresponding to a weight of the high-order 4 bits that is 16 times as large as the above-mentioned.

The operation thereof will be explained with reference to FIG. 26. When a sampling mode switching signal assumes a low level, the switching circuit 23 is connected to the amplitude detector 22, thereby forming the analog AGC loop. The switching circuit 23 outputs, to the low-pass filter 24, an analog error quantity obtained by subtracting the analog target amplitude from the analog output of the electric filter 13 of the amplitude detector 22. A control voltage is thereby generated from the analog error quantity and then fed back to the variable gain amplifier 12, thus controlling the amplitude.

Next, the sampling mode switching signal assumes a high level, and there is indicated a mode (sampling mode) based on the digital AGC loop. With this processing, the switching circuit 23 is connected to the charge pump type D/A converter 26. Simultaneously with this, there is indicated a pull-in mode in which the pull-in/steady operation switching signal is at [LOW].

The multiplexers 27-1 through 27-4 thereby select the high-order 4 bits in the 8-bit outputs of the subtracter 25. Also, each of the charge pump circuits 26-1 through 26-4 outputs the current corresponding to the weight of the high-order 4 bits.

Accordingly, the charge pump type D/A converter 26 converts, into an analog current quantity, the high-order 4 bits of the 8-bit digital error values of the subtracter 25, which value is obtained by subtracting the digital target value from the waveform discrete data given from the digital equalizer 15, and this analog current quantity is inputted to the switching circuit 23. This analog quantity is converted into a voltage by the low-pass filter 24, thereby controlling the gain controlled amplifier 12.

After finishing the pull-in operation, the pull-in/steady operation switching signal indicates the steady operation of [HIGH]. With this processing, each of the multiplexers 27-1 through 27-4 selects the low-order 4 bits from the 8-bit outputs of the subtracter 25. Further, the charge pump circuits 26-1 through 26-4 output the current corresponding to the weights of the low-order 4 bits.

The charge pump type D/A converter 26 thereby converts the low-order 4 bits of the 8-bit digital error values of the subtracter 25 into the analog current quantities and inputs these quantities to the switching circuit 23. This analog quantity is converted into the voltage by the low-pass filter 24, thereby controlling the gain controlled amplifier 12.

Thus, even when the number of charge pump circuits is halved, the automatic gain control can be performed, wherein the loop gain in the AGC control loop is made variable.

Figure 27:
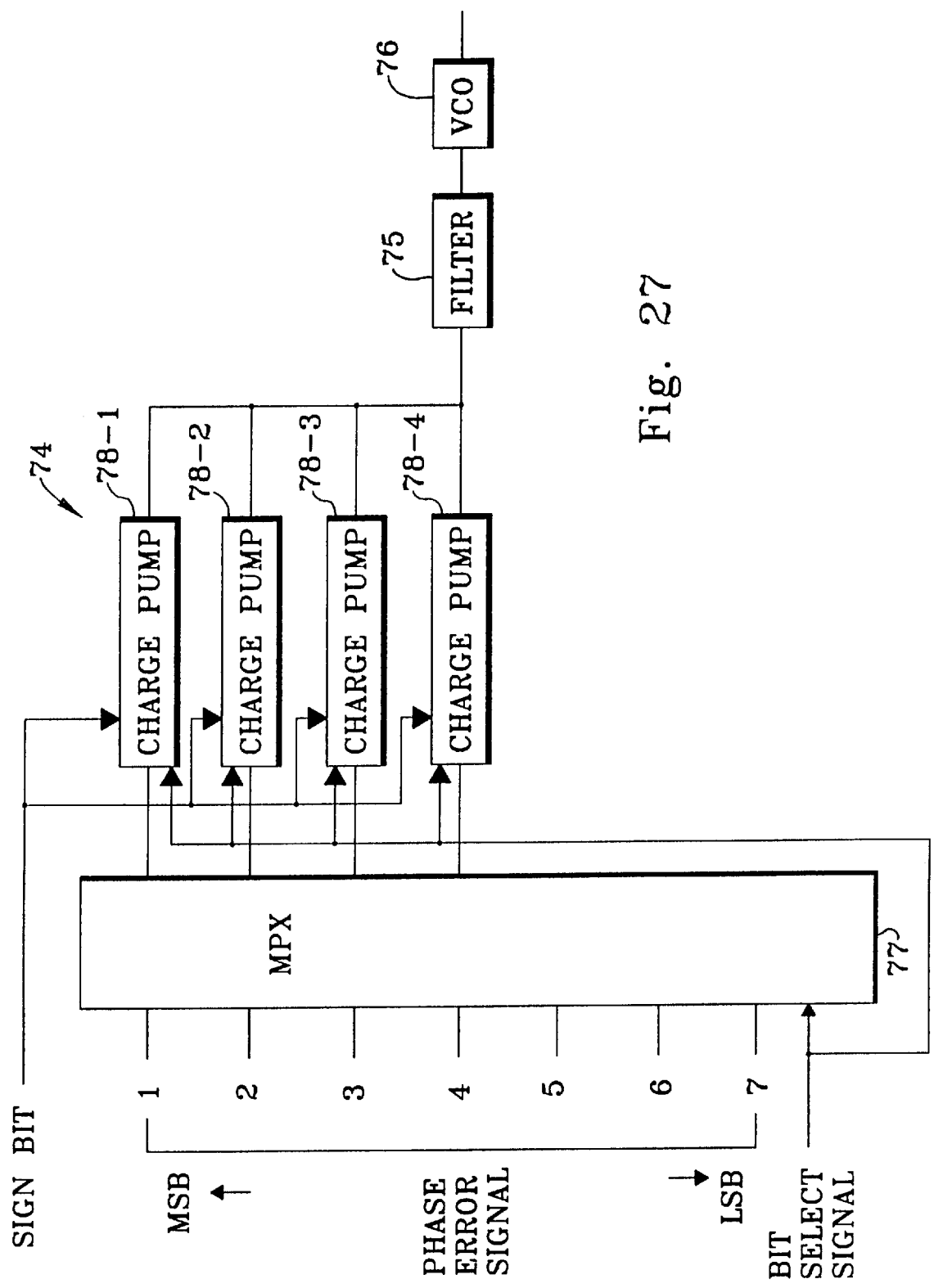
FIG. 27 is a block diagram showing a modified example of the charge pump type D/A converter in FIG. 24.
Figure 28:
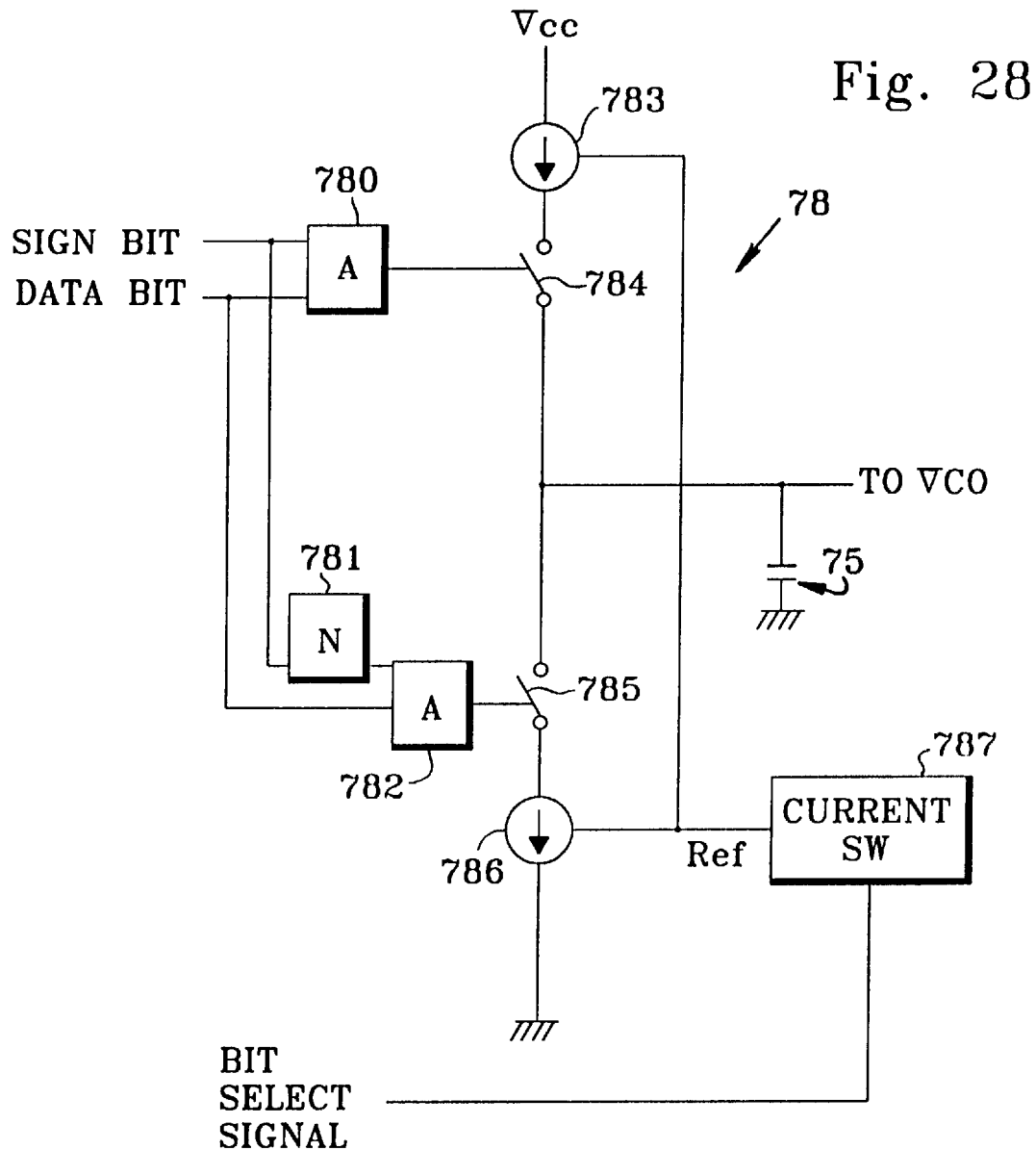
FIG. 28 is a circuit diagram of a charge pump circuit in FIG. 27.

FIG. 27 is a block diagram illustrating a charge pump type D/A converter of the phase synchronizing circuit 7 of FIG. 24. FIG. 28 is a circuit diagram of the charge pump circuit of FIG. 27.

As depicted in FIG. 27, a multiplexer 77 is constructed to have 7-bit inputs and 4-bit outputs. the phase error signal consists of 8 bits, wherein 7 bits are used as data bits, and one bit is used as a sign bit. The sign bit indicates a polarity of the 7-bit data bits. The seven data bits and a bit selection signal are inputted to the multiplexer 77. The multiplexer 77 selects the high- or low-order 4 bits in accordance with the bit selection signal.

The outputs of the multiplexer 77, the bit selection signal and the sign bit are inputted to four charge pump circuits 78-1 through 78-4. Then, when the bit selection signal indicates the initial pull-in, the respective charge pump circuits 78-1 through 78-4 output the currents of 128 mA, 64 mA, 32 mA, 16 mA in accordance with the polarity of the sign bit. Further, when the bit selection signal indicates the steady operation, the individual charge pump circuits 78-1 through 78-4 output the currents of 8 mA, 4 mA, 2 mA, 1 mA in accordance with the polarity of the sign bit.

That is, the multiplexer 77 selects, when in the initial pull-in, the high-order 4 bits but selects, when in the steady operation, the low-order 4 bits. Also, each of the charge pump circuits 78-1 through 78-4 outputs, when in the steady operation, the current corresponding to the weight of the low-order 4 bits but outputs, when in the initial pull-in, the current corresponding to the weight of the high-order 4 bits that is 16 times as large as the above-mentioned.

As illustrated in FIG. 28, each of the charge pump circuits 78-1 through 78-4 includes a AND gate 780 for taking the AND of the sign bit with the data bit, an inverter circuit 781 for inverting the sign bit and an AND gate 782 for taking the AND of an output of the inverter circuit 781 with the data bit.

Further, each of the charge pump circuits 78-1 through 78-4 has a first constant current source 783 for flowing the current in one direction, a first switch circuit 784 opened and closed by an output of the AND gate 780, a second current sourse 786 for flowing the current in one direction and a second switch circuit 785 opened and closed by an output of the AND gate 782.

The individual current sources 783, 786 are connected in series through the switch circuit 784, 785. Then, a loop filter 75 constructed of a capacitor is connected to a mid-point between the current courses 783, 786. A current switching circuit 787 supplies a reference current of the current sourses 783, 786 in accordance with the bit selection signal. This current switching circuit 787, when the bit selection signal indicates the pull-in operation, controls the current sources 783, 786 to flow a current which is 16 times as large as that when the bit selection signal indicates the steady operation.

Accordingly, when the sign bit indicates the positive ([1]), the switch circuit 784 is opened and closed by the data bit output from the AND gate 780, with the result that the current flows out of the first current source 783. While on the other hand, when the sign bit indicates the negative ([0]), the switch circuit 785 is opened and closed by the data bit output from the AND gate 782, with the result that the current flows in the direction of the second current source 786. In this way, the current corresponding to the polarity of the error signal is obtained.

Next, the operation of the phase synchronizing circuit 7 will be explained. When in the non-read processing from the magnetic disc, the multiplexer circuit 73 is connected to the frequency comparator 72. With this connection, the voltage control oscillator 76 generates the clock synchronizing with the frequency of the servo signal.

On the other hand, when in the read processing from the magnetic disc, the multiplexer circuit 73 is connected to the phase detector 71. With this connection, the voltage controlled oscillator 76 generates the clock controlled by the phase error of the sample output of the digital equalizer 15. At this time, the bit selection signal indicates at first indicates a pull-in mode of [LOW].

The multiplexer 77 thereby selects the high-order 4 bits from the 7-bit phase error signal outputs. Further, each of the charge pump circuits 78-1 through 78-4 outputs the current corresponding to the weight of the high-order 4 bits.

Accordingly, the high-order 4 bits of the 7-bit digital error values are converted into the analog current quantity by the charge pump type D/A converter 74 and thereafter converted by the filter 75 into the voltage, thereby controlling the voltage controlled oscillator 76.

After finishing this pull-in, the bit selection signal indicates a [HIGH] steady operation. The multiplexer 77 thereby selects the low-order 4 bits from the 7-bit phase error signals. Also, each of the charge pump circuits 78-1 to 78-4 outputs the current corresponding to the weight of the low-order 4 bits.

With this processing, the low-order 4 bits of the 7-bit digital error values are, after being converted into the analog current quantity by the charge pump type D/A converter 74, converted into the voltage by the filter 75, thereby controlling the voltage control oscillator 76.

Given next is another example of the phase synchronizing circuit.

In the partial-response regenerative system, if the phase of the synchronous clock is shifted, there occurs a demodulation error of the output signal of a record channel. It is therefore required that the phase of the synchronous clock be corrected based on a phase error detected from an equalized amplitude value and a determination value.

Normally, the phase difference when in the read processing is outputted in the form of a voltage difference, and, hence, a smoothing filter involves the use of a gm amplifier filter defined as a voltage control type filter. This gm amplifier filter is a filter constructed such that a plurality of gm amplifiers are connected in series, and a capacitor is provided in the feedback loop.

The reason why this voltage control filter is constructed of the gm amplifier filter is that the gm amplifier is capable of making a cutoff frequency variable. Namely, this is convenient in terms of controlling the cutoff frequency per zone on the magnetic disc.

The gm amplifier filter presents a problem in which the configuration thereof is complicated, and the circuit scale increases. Besides, the complicated configuration leads to such a problem that the price increases.

Herein, there is shown a phase synchronizing circuit for simplifying the circuit configuration of the voltage control filter.

Figure 29:
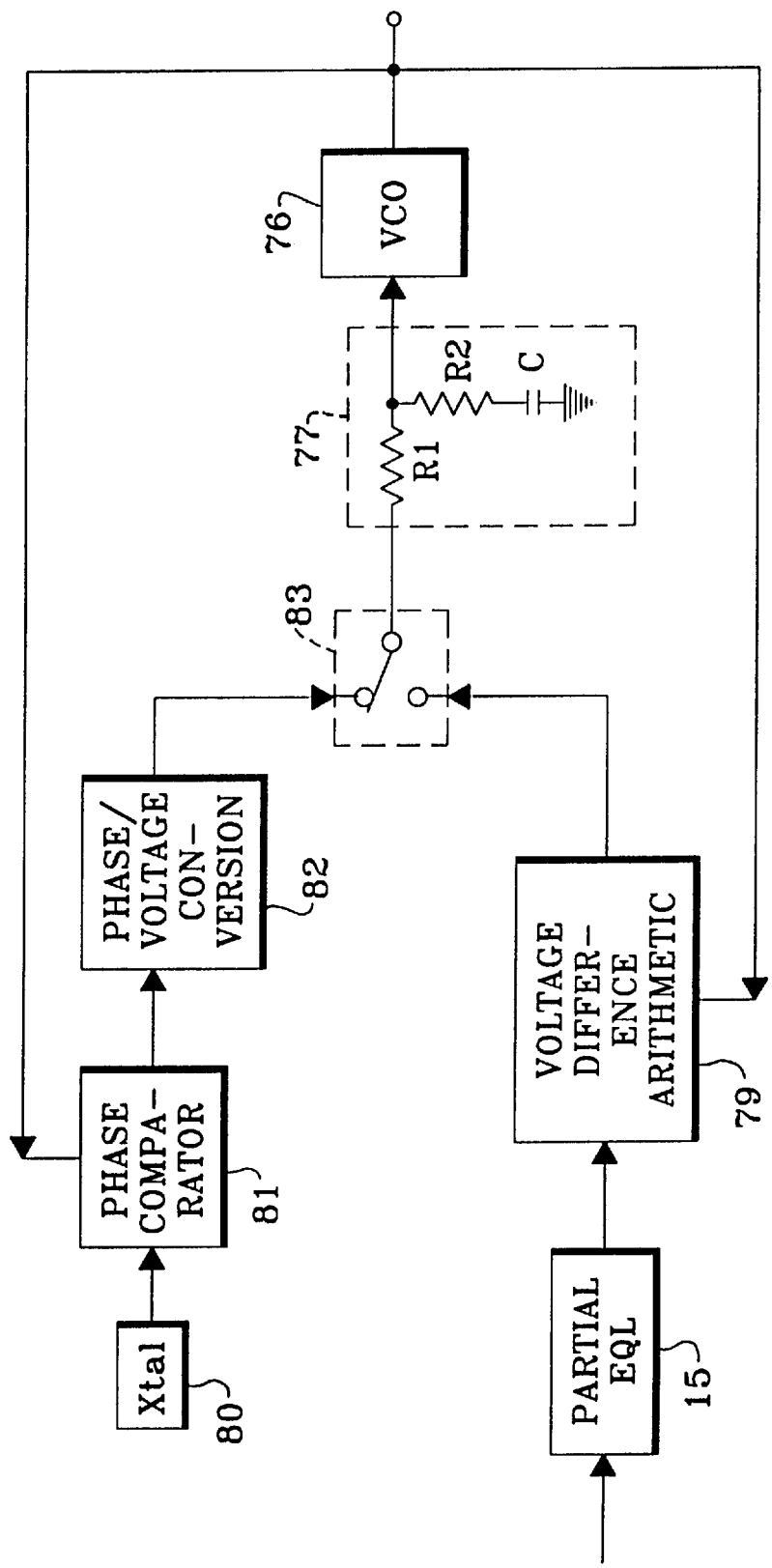
FIG. 29 is a block diagram illustrating a phase synchronizing circuit according to the present invention.
Figure 30:
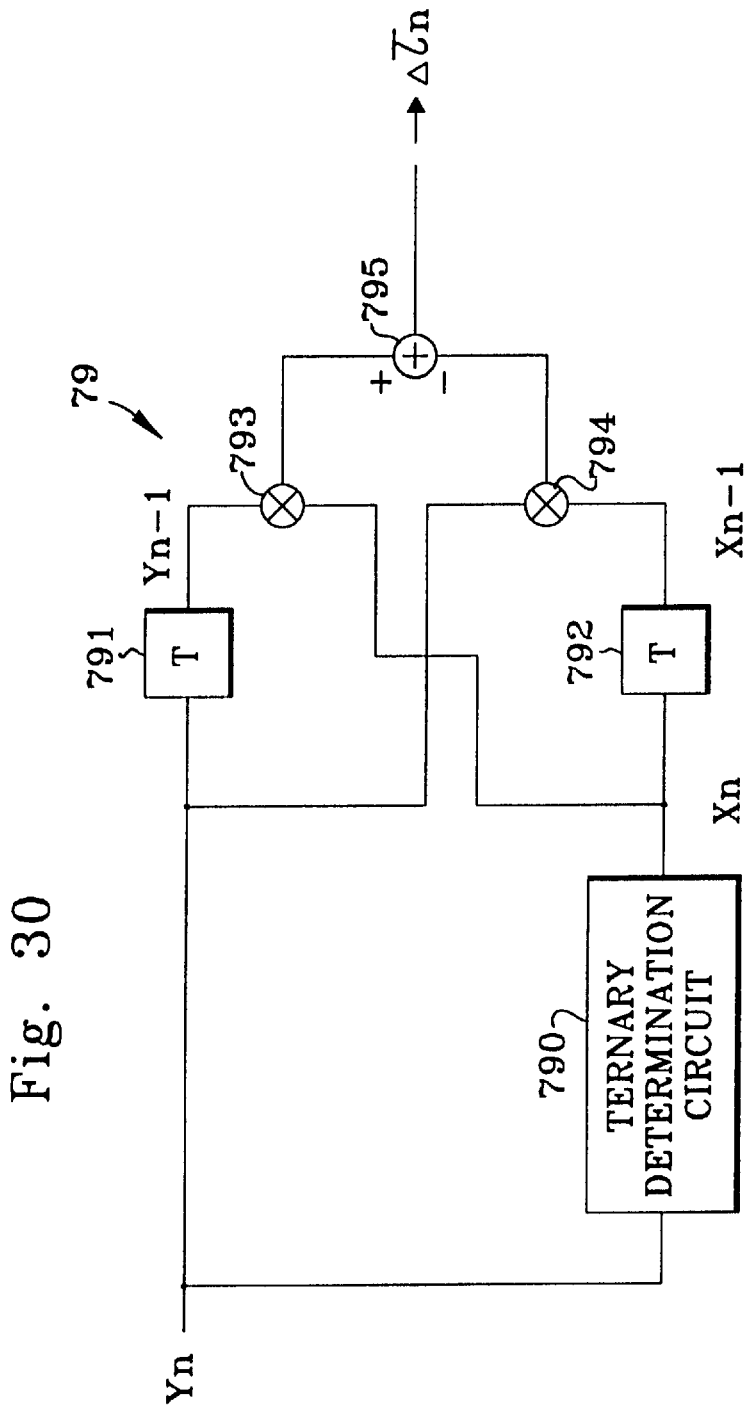
FIG. 30 is a block diagram illustrating a voltage difference arithmetic unit in FIG. 29.
Figure 31:
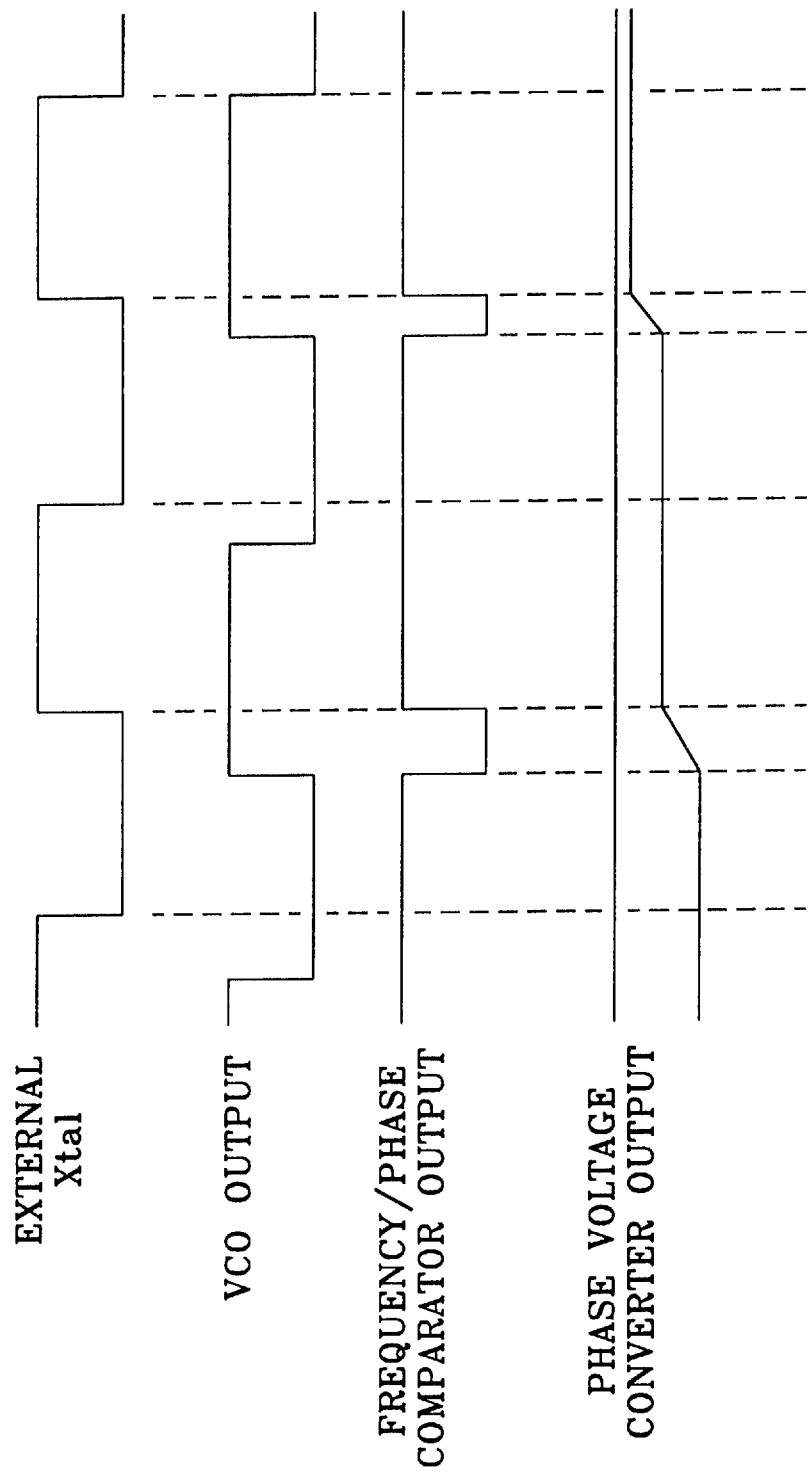
FIG. 31 is a time chart in a non-reading state in the construction of FIG. 29.
Figure 32:
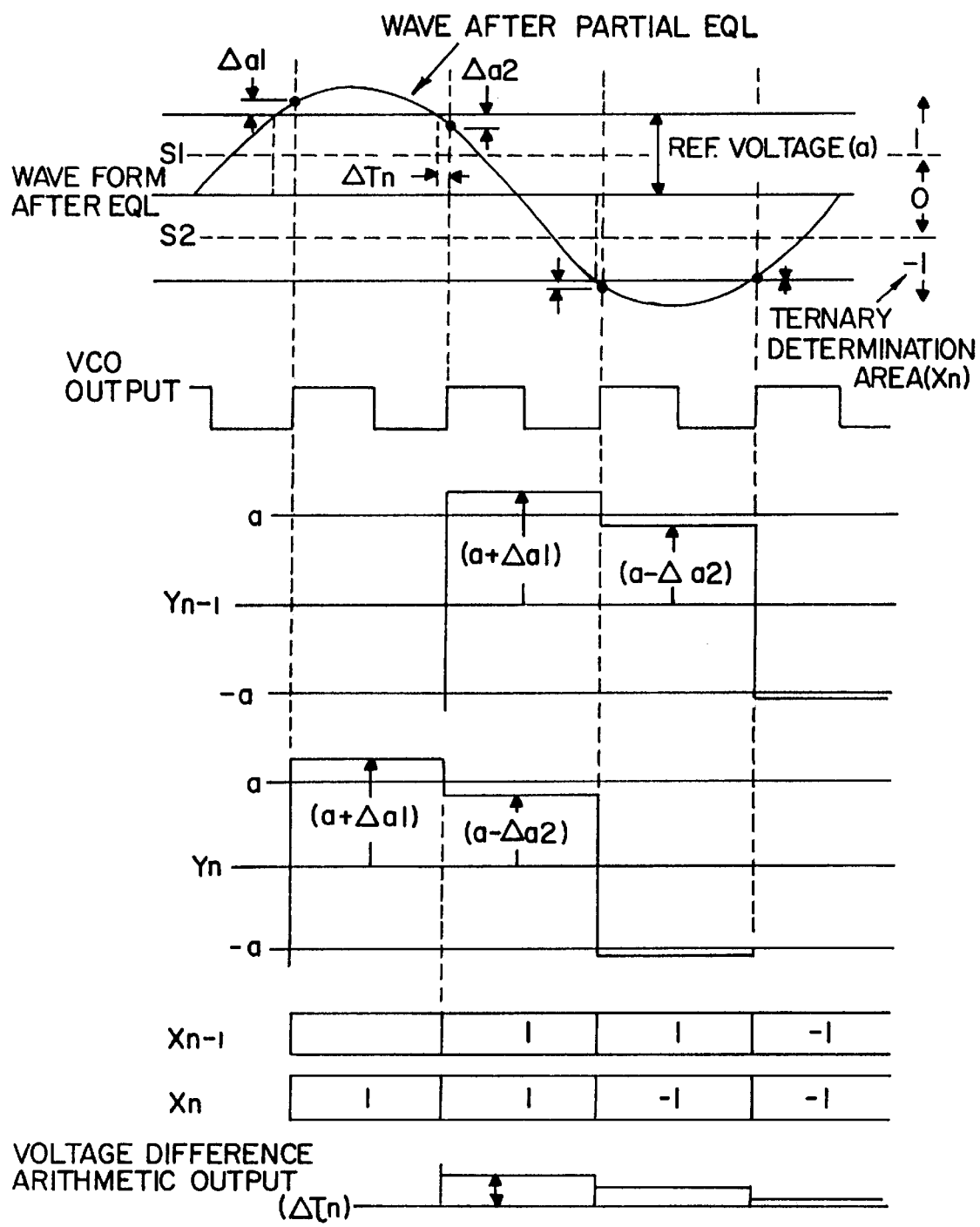
FIG. 32 is a time chart in a reading state in the construction of FIG. 29.

FIG. 29 is a block diagram of the phase synchronizing circuit in one embodiment of the present invention. FIG. 30 is a block diagram of a voltage difference arithmetic unit of FIG. 29. FIG. 31 is a time chart when in the non-read processing of FIG. 29. FIG. 32 is a time chart when in the read processing of FIG. 29.

Referring to FIG. 29, an external oscillator 80 is constructed of a crystal oscillator. Then, the external oscillator 80 generates clocks with a fixed period. A frequency phase comparator 81 compares an output clock of the external oscillator 80 with a synchronous clock of the voltage control oscillator 76 and outputs a signal (phase difference signal) corresponding to a phase difference. A phase/voltage converter 82 converts the phase difference signal transmitted from the frequency phase comparator 81 into a voltage.

The partial equalizer 15 is, as stated earlier, constructed of the cosine equalizer. A voltage difference arithmetic unit 79 comprises a sample circuit constructed of an A/D converter and a phase difference arithmetic circuit shown in FIG. 30. Then, the voltage difference arithmetic unit 79 causes the sample circuit to effect sampling of a signal after being equalized by the synchronous clock. The voltage difference arithmetic unit 79 calculates a voltage signal indicating a phase difference from an amplitude of the sampled signal.

A voltage control filter 77 cuts off a high-frequency component of the voltage signal transmitted from the voltage difference arithmetic unit 79 or a phase/voltage converter 82 and is constructed of an integral circuit. This integral circuit consists of an input resistance R1, a current adjusting resistance R2 provided between the input resistance R1 and the ground and a capacitor C. Accordingly, this integral circuit forms a known integration type passive filter.

The voltage controlled oscillator 76 generates the synchronous clock having a phase corresponding to the voltage. This synchronous clock is outputted to the frequency phase comparator 81 and the voltage difference arithmetic unit 79. A switching circuit 83 connects, when read by the head, the voltage control filter 77 to the voltage difference arithmetic unit 79 but connects, when not read by the head, voltage control filter 77 to the phase/voltage converter 82.

The phase difference arithmetic circuit of the voltage difference arithmetic unit will be explained with reference to FIG. 30.

A ternary determination circuit 790 compares the sample value Y(n) with the two slice levels S1, S2 and performs a determination in the form of the determination values X(n) of [+1], [0], [−1]. A first delay element 791 causes a one-sample delay of the sample value Y(n), thereby obtaining Y(n−1). A second delay element 792 causes the one-sample delay of the determination value X(n), thereby obtaining X(n−1). A first multiplier 793 multiplies Y(n−1) by X(n). A second multiplier 794 multiplies Y(n) by X(n−1). An adder 795 subtracts an output Y(n)·X(n−1) of the second multiplier 794 from an output Y(n−1)·X(n) of the first multiplier 793, thereby obtaining a phase difference $\Delta\tau(n)$.

Next, the operation of the circuit of FIG. 29 will be described. When the head reads a signal on the magnetic disc medium, the switching circuit 83 connects the voltage control filter 77 to the voltage difference arithmetic unit 79. Then, a PLL loop is formed of the partial equalizer 15, the voltage difference arithmetic unit 79, the voltage control filter 77 and the voltage controlled oscillator 76.

In this PLL loop, when in the read processing, the signal read from the disc medium is waveform-equalized by the partial equalizer 15 serving as an equalizer for the partial-response regeneration. As illustrated in FIG. 32, the waveform-equalized signal undergoes sampling in the A/D converter of the voltage difference arithmetic unit 79 at a timing of the synchronous clock of the voltage control oscillator 76. The ternary determination circuit 790 performs a ternary determination with respect to the sample value Y(n).

As shown in FIG. 32, a difference $\Delta a$ between the amplitude of the sample value Y(n) and a reference voltage a is proportional to a phase difference $\Delta T(n)$. The phase difference arithmetic circuit of the voltage difference arithmetic unit 79 shown in FIG. 30 calculates the phase difference $\Delta\tau(n)$ in the formula given above. That is, the adder 795 obtains a difference between the output Y(n−1)·X(n) of the first multiplier 793 and the output Y(n)·X(n−1) of the second multiplier 794. The voltage output $\Delta\tau(n)$ of this adder 795 is Y(n−1)·X(n)−Y(n)·X(n−1).

The voltage difference arithmetic unit 79 smooths this voltage signal by use of the capacitor C. Then, the voltage controlled oscillator 76 is controlled by an output of the voltage control filter 77. With this processing, the clock defined as an output of the voltage controlled oscillator 76 is synchronized with the read signal.

On the other hand, when in processing exclusive of the read processing, the switching circuit 83 connects the voltage control filter 77 to the phase/voltage converter 82. A PLL loop is thereby formed of the external oscillator 80, the phase comparator 81, the phase/voltage converter 82, the voltage control filter 77 and the voltage control oscillator 76.

This operation will be explained with reference to FIG. 31. Inputted to the frequency phase comparator 81 are an output of the external oscillator 80 and an output of the voltage controlled oscillator 76. The frequency phase comparator 81 outputs a signal corresponding to the phase difference between the output of the external oscillator 80 and the output of the voltage controlled oscillator 76. The phase/voltage converter 82 outputs a voltage signal corresponding to the phase difference signal thereof. Then, this voltage is smoothed by the voltage control filter 77, thereby controlling the voltage controlled oscillator 76.

In this manner, the voltage control filter is constructed of the passive filter consisting of the integral circuit, and, therefore, the voltage control filter can be easily and simply constructed at low cost. Also, a difference between the frequency characteristics in the radial direction of the magnetic disc can be absorbed to some extent by the voltage controlled oscillator 76.

In accordance with this embodiment, the partial equalizer has been explained as the one having the analog output. As illustrated in FIG. 1, however, the A/D converter is provided in front of the cosine equalizer, and, besides, the cosine equalizer may be constructed of a digital equalizer. In this case, the A/D converter of the voltage difference arithmetic unit 79 is not required.

As discussed above, the voltage control filter of the phase synchronizing circuit is composed of the integration type filter, resulting in the simplified configuration. Further, the integration type filter is employed, and hence an inexpensive construction can be offered.

Given next is an explanation of a modified example of the phase synchronizing circuit when using the MR head.

In the phase synchronizing circuit, the phase error value $\Delta\tau(n)$ is expressed by the following relational expression:

$$\Delta\tau(n)=Y(n)\cdot X(n-1)-Y(n-1)\cdot X(n)$$

Then, the voltage control oscillator generates such a synchronous lock that this phase error value $\Delta\tau(n)$ becomes zero.

Figure 33:
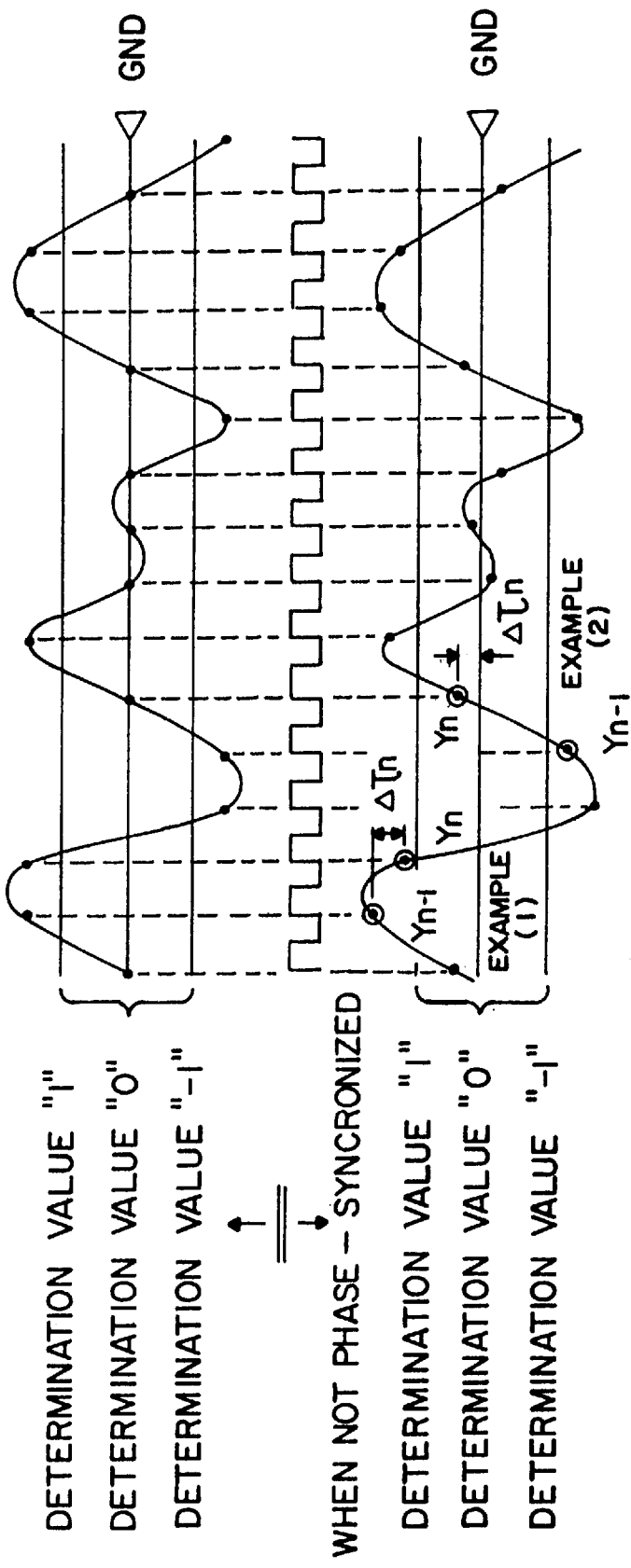
FIG. 33 is an explanatory diagram showing a phase synchronizing operation.

As illustrated in FIG. 33, in a comparison with a phase-synchronous state, the non phase-asynchronous state goes as follows. That is, as shown in the example (1), when the determination value of two pieces of consecutive data is (1, 1), from the above relational expression, the phase error value $\Delta\tau(n)$ is given such as:

$$\Delta\tau(n)=Y(n)\cdot 1-Y(n-1)\cdot 1=Y(n)-Y(n-1)$$

Namely, a level difference in the data when individually determined as [1] is detected in the form of a phase error.

Similarly, as shown in the example (2), when the determination value of two pieces of consecutive data is (−1, 0), the phase error value $\Delta\tau(n)$ is expressed as follows:

$$\Delta\tau(n)=Y(n)\cdot -1-Y(n-1)\cdot 0=-Y(n)$$

Namely, this time, the data level when determined as [0] is detected in the form of the phase error.

Thus, according to the phase synchronizing system, the phase error between the data and the clock is detected not as a time region but as a level variation. Then, this phase error is fed back to the phase synchronizing circuit, whereby the phase synchronizing control is carried out.

Figure 34:
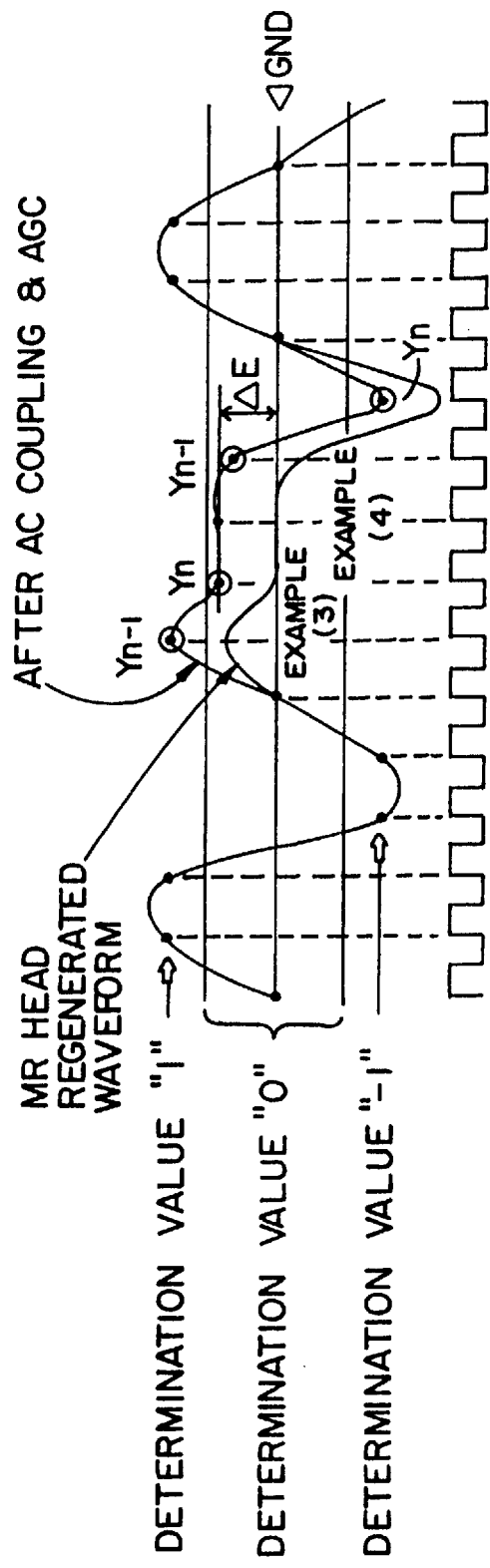
FIG. 34 is an explanatory diagram showing an offset error.

By the way, if the regeneration from the magnetic disc medium involves the use of the MR head, as illustrated in FIG. 34, there is produced a positive/negative asymmetry of the read waveform. This waveform asymmetry, as a result, appears in the form of an offset error $\Delta E$ when the determination value is [0]. For instance, in the example (3) of FIG. 34, the phase error value $\Delta\tau(n)$ is given by:

$$\Delta\tau(n)=Y(n)\cdot 1-Y(n-1)\cdot 0=Y(n)=\Delta E$$

Similarly, in the example (4) of FIG. 34, the phase error value $\Delta\tau(n)$ is expressed such as:

$$\Delta\tau(n)=Y(n)\cdot 0-Y(n-1)\cdot -1=Y(n-1)=\Delta E$$

Accordingly, as shown in FIG. 34, even in a state where the data synchronizes with the clock, it follows that the phase error value contains ΔE in addition to the original error with respect to the data containing [0].

For this reason, the synchronism with the data afterward is lost, and this may be a cause for producing a demodulation error.

Herein, there is shown a phase synchronizing circuit for preventing a phase correction error due to an asymmetry of the read waveform when the MR head is used as a read head.

Figure 35:
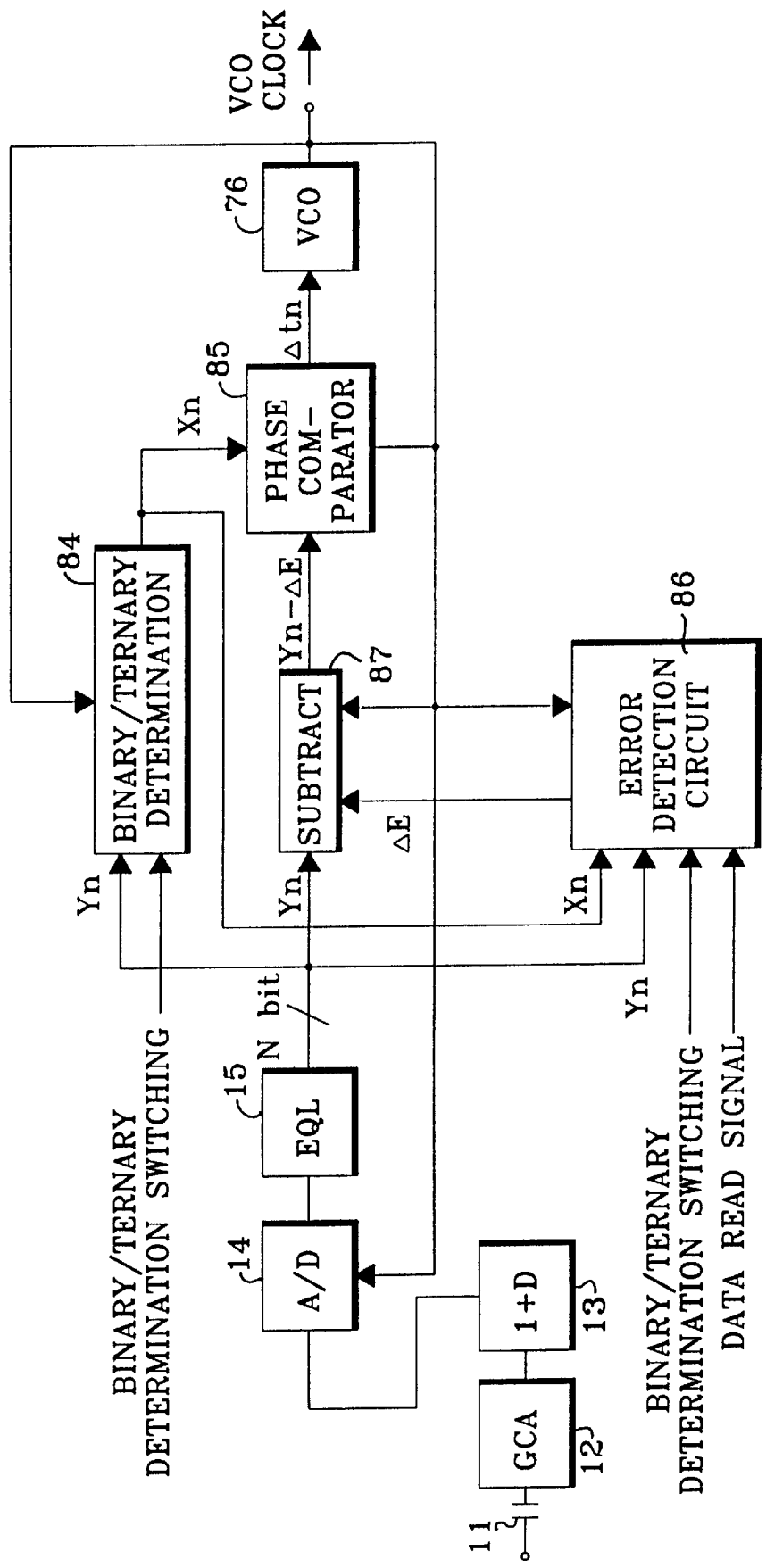
FIG. 35 is a block diagram illustrating a modified example of the phase synchronizing circuit according to the present invention.
Figure 36:
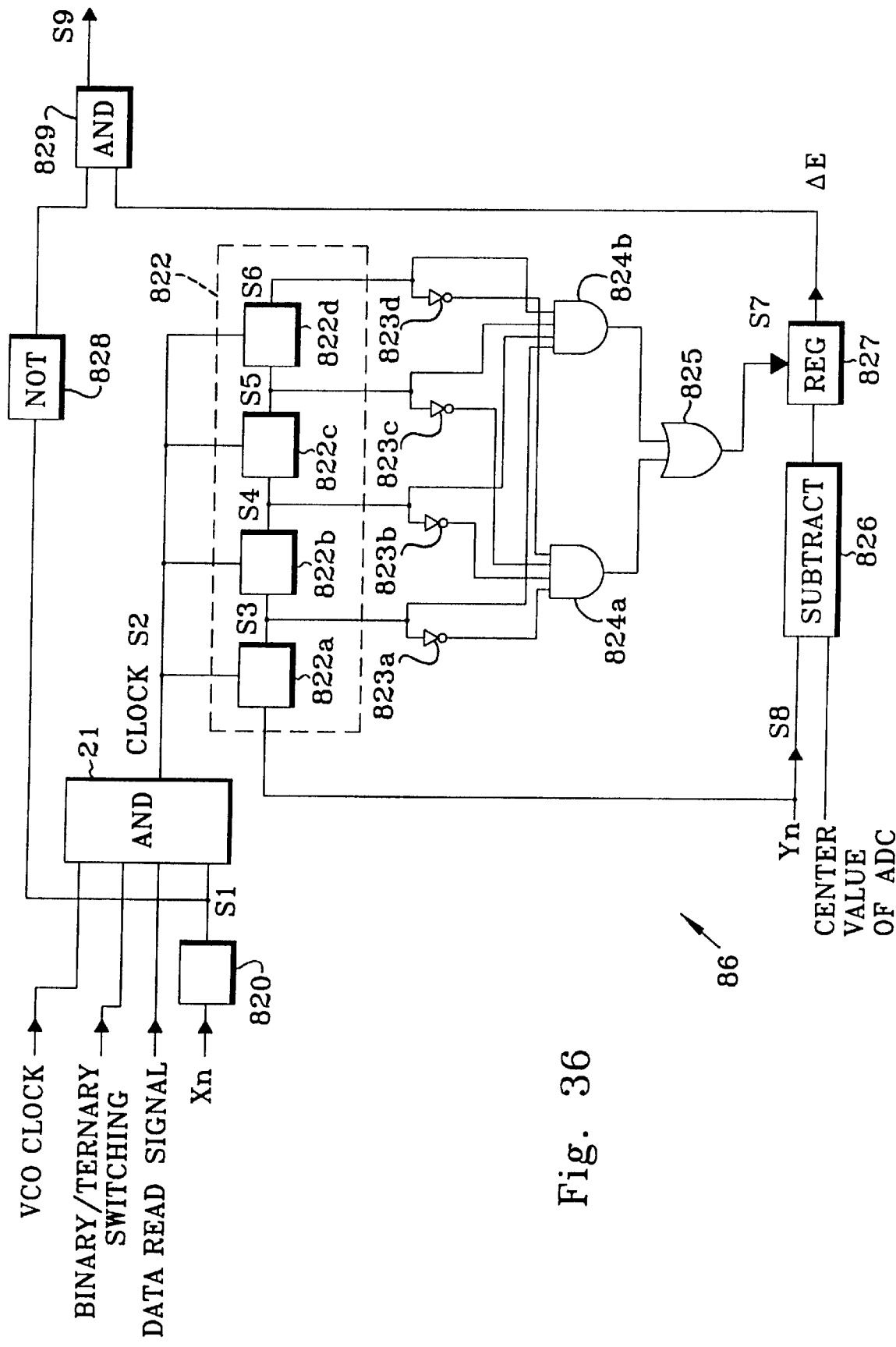
FIG. 36 is a circuit diagram of an error detection circuit in the construction of FIG. 35.
Figure 37:
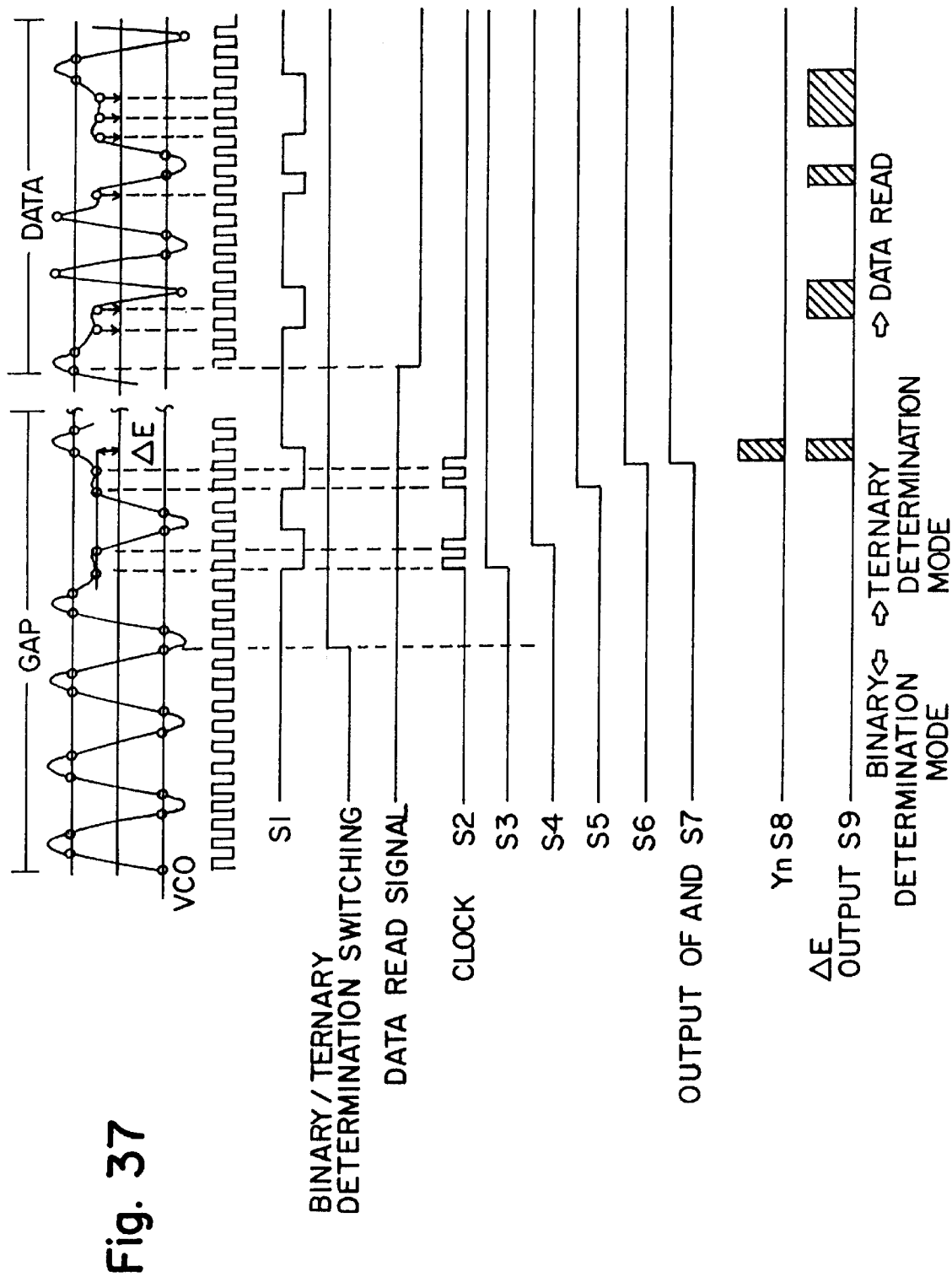
FIG. 37 is a time chart in the construction of FIG. 35.

FIG. 35 is a block diagram showing another modified example of the phase synchronizing circuit of the present invention. FIG. 36 is a circuit diagram of the error detection circuit 86 of FIG. 35. FIG. 37 is a time chart in the construction of FIG. 35.

Referring to FIG. 35, the same elements as those shown in FIG. 1 are marked with the like numerals. As shown in FIG. 35, the phase synchronizing circuit includes a binary/ternary determination unit 84, a phase comparator 85 and a voltage controlled oscillator (VCO) 76. The binary/ternary determination unit 84 makes a binary determination of the amplitude value Yn in the gap pattern of the read signal and then makes a ternary determination of the amplitude value Yn in the data pattern. The phase comparator 85 calculates the phase error value Δτn from the amplitude value Yn and the determination value Xn.

The error detection circuit 86 detects that the read signal is in a measurement area of the gap pattern from a binary/ternary determination switching signal and a data read signal. The error detection circuit 86 detects the offset error value ΔE from the amplitude value Y(n) and the determination value X(n). Then, the error detection circuit 86 holds the offset error value ΔE and outputs the offset error value ΔE only when the determination value X(n) is [0].

A subtracter 87 subtracts the offset error value ΔE from the amplitude value Y(n) and outputs a subtracted output (Yn−ΔE) to the phase comparator 85.

The error detection circuit 86 will be explained with reference to FIG. 36.

As illustrated in FIG. 36, a decoder 820 decodes the determination value X(n) and outputs a decode signal S1. The decode signal S1 generates an output assuming a low level, when the determination value X(n) is [0]. In other cases, the decode signal S1 generates an output assuming a high level.

An AND gate 821 outputs a VCO clock as a clock S2 only when the binary/ternary determination switching signal given from the unillustrated control circuit is at the high level, the data read signal is at the high level, and the decode signal S1 is at the low level. That is, the AND gate 821 outputs the clock only when the determination value X(n) is zero in the measurement area of the gap pattern.

A shift register 822 is constructed of 4-stage shift registers 822*a*–822*d*. The above-described clocks are inputted to the 4-stage shift registers 822*a*–822*d*. The most significant bit of the amplitude value Y(n) is inputted to the 1st-stage shift register 822*a* among the 4-stage shift registers 822*a*–822*d*.

Inverter circuits 823*a*–823*d* invert outputs S3–S6 of the respective shift registers 822*a*–822*d*. An AND gate 824*a* takes the AND of the outputs of the individual inverter circuits 823*a*–823*d*. An AND gate 824*b* takes the AND of the outputs S3–S6 of the shift registers 822*a*–822*d*. An OR gate 825 takes the OR (logical sum) of outputs of the AND gate 824*a*, 824*b*.

A subtracter 826 subtracts a center value of the A/D converter 14 from the amplitude value Y(n). A register 827 holds an output of the subtracter 826 in response to a signal S7 of the AND gate 825.

An inverter circuit 828 inverts the decode output S1 of the decoder 820. An AND gate 829 outputs the offset error value ΔE of the register 827 in accordance with an output of the inverter circuit 828.

At the first onset, the operation in the construction of FIG. 35 will be explained.

A DC component of the read signal of the read head is cut off by an AC coupling constructed of a capacitor of the head IC circuit 11. A gain control amplifier 12 imparts a predetermined gain to the read signal to be inputted and outputs it.

Further, the equalizing filter 13 exhibits the (1+D) characteristic and fixedly equalizes an output of the gain control amplifier. Next, the A/D converter 14 effects the sampling when nT+τ by the synchronous clock and outputs a digital sample value. The cosine equalizer 15 automatically equalizes the digital sample value in accordance with the partial-response characteristic in the radial direction of the disc and outputs the amplitude value Y(n).

On the other hand, as illustrated in FIG. 37, the gap pattern area formed in front of the data pattern area is an area in which the determination values [1], [−1] alternately appear. Herein, the binary/ternary determination unit 84 performs a binary determination. Then, the phase comparator 85 calculates a phase error in the relational expression given above in accordance with this binary determination value and the amplitude value, thereby controlling the voltage controlled oscillator 76. With this processing, in the gap pattern, the clock phase is synchronized.

In the gap pattern area where these determination values [1], [−1] alternately appear, the offset error value of the MR head does not appear. On the other hand, in the data pattern area, the determination value [0] appears, and, therefore the offset error value is seen. In the data pattern area, measuring the offset error does not suffice, and, hence, an offset error quantity is measured in the gap pattern.

For this purpose, a ternary measurement area is formed in the gap pattern area. This measurement area is provided posterior to the above binary area. That is, after effecting the binary phase synchronization, the offset error is to be detected. A pattern containing a sequence of a plurality of determination values [0] is formed in this measurement area. As illustrated in FIG. 37, herein, there is used such a pattern that if two pieces of determination values [0] continue, two pieces of determination values [−1] continue, and further two pieces of determination values [0] continue.

As described above, when providing the area containing the sequence of the determination values [0], it is feasible to prevent the measurement of the offset error on the basis of the amplitude value which happens to be the determination value [0]. The offset error can be thereby accurately detected.

Accordingly, the error detection circuit 86 detects the measurement area from the binary/ternary detection switching signal and the data read signal coming to take the high level from the heading of the data pattern. The error detection circuit 86 then calculates the offset error value ΔE from the amplitude value Y(n) when the determination value X(n) is [0] and hold this value.

Then, in the data pattern area, corresponding to the fact that the determination value X(n) is [0], the error detection circuit 86 outputs this offset error value ΔE to the subtracter 87. Hence, as shown in FIG. 37, the subtracter 87 subtracts the offset error value ΔE from the amplitude value Y(n) only when the determination value is [0].

On the other hand, when the determination value Y(n) is [1] or [−1], the error detection circuit 86 does not output the offset error value, and, therefore the subtracter 87 outputs the amplitude value Y(n) as it is. That is, the subtracter serves as a mere buffer.

In this way, the amplitude value Y(n) from which the offset error value ΔE of the MR head is subtracted is inputted to the phase comparator 85. With this processing, the phase comparator 85 executes the calculation based on the above phase error calculation formula, thereby calculating the phase error Δτn). For this reason, the voltage control oscillator 76 is controlled by this phase error and therefore generates the clock phase-synchronizing with the input signal.

The operation in the construction of FIG. 36 will be described.

The decoder 820 decodes the determination value X(n) and, when the determination value X(n) is [0], generates a low-level output. Further, the binary/ternary determination switching signal assumes the high level from a point of start of the gap pattern measurement area. Also, the data read signal assumes the low level from a point of start of the data pattern area.

The AND gate 821 outputs the VCO clock as the clock S2 only when the binary/ternary determination switching signal is at the high level, the data read signal is at the high level, and the decode signal S1 is at the low level. That is, the AND gate 821 outputs the clock S2 only when the determination value X(n) is zero in the measurement area of the gap pattern.

Next, the most significant bit of the amplitude value Y(n) is inputted to the 1st-stage shift register 822a among the 4-stage shift registers 822a–822d. Accordingly, the most significant bit of the amplitude value Y(n) when the determination value X(n) is [0] is sequentially set in the shift registers 822a–822d. Herein the MSB of the amplitude value Y(n) is [1] if the amplitude value is not smaller than a center voltage of the A/D converter 14. Contrastingly when the amplitude value is less than the center voltage of the A/D converter 14, the MSB is [0].

Accordingly, as illustrated in FIG. 37, if all the amplitude values Y(n) of the determination values X(n) of [0] in the measurement area are the center voltage or larger, outputs S3–S6 of the respective flip-flops 822a–822d assume the high level. Therefore, an output S7 of the AND gate 825 takes the high level. The register 827 thereby holds the offset error value ΔE obtained by subtracting the center voltage from the amplitude value Y(n) of the subtracter 826.

Herein, if all the amplitude values Y(n) of the determination values X(n) of [0] in the measurement area are smaller than the center voltage, the outputs S3–S6 of the respective flip-flops 822a–822d assume the low level. Therefore, the output S7 of the AND gate 825 takes the high level. The register 827 thereby holds the offset error value ΔE obtained by subtracting the center voltage from the amplitude value Y(n) of the subtracter 826.

As explained above, both in the case where all the amplitude values Y(n) of the determination values X(n) of [0] in the measurement area are the center voltage or larger and in the case where all these amplitude values Y(n) are less than the center voltage, the offset error is measured. It is because the offset value is the center voltage or larger and less than the center voltage depending on the characteristics of the MR head.

Further, the cases where all the amplitude values Y(n) of the determination values X(n) of [0] are the center voltage or larger and less than the center voltage are set in the measurement area. The reason for this lies in detecting the stable offset value in the gap pattern area.

On the other hand, the decode output S1 of the decoder 820 is inverted by the inverter circuit 28 and inputted to the AND gate 829. Accordingly, the AND gate 829 outputs the offset error value ΔE of the register 827 to the subtracter 87 only when the determination value X(n) is [0]. Also, the AND gate 829 outputs [0] when the determination value X(n) is [1] or [−1].

Hence, as illustrated in FIG. 37, the subtracter 87 subtracts the offset error value ΔE from the amplitude value Y(n) only when the determination value X(n) is [0].

On the other hand, when the determination value X(n) is [1] or [−1], the error detection circuit 86 outputs [0], and therefore the subtracter 87 outputs the amplitude value Y(n) as it is. That is, the subtracter 87 serves as a mere buffer.

Thus, the offset quantity of the MR head is detected from within the gap pattern and subtracted from the amplitude value of the data pattern. For this reason, it is possible to reduce the VCO clock error due to the waveform asymmetry intrinsic to the MR head. Further, all the circuits are constructed of the logic circuits and therefore suited to a transformation into the LSI.

As described above, the offset quantity of the MR head is detected from within the gap pattern and subtracted from the amplitude value of the data pattern. The VCO clock error due the waveform asymmetry intrinsic to the MR head can be therefore reduced. Further, all the circuits are constructed of the logic circuits and therefore suited to the transformation into the LSI.

Although the present invention has been discussed so far by way of the embodiments, the embodiments can be modified in a variety of forms within the range of the gist of the present invention, and these modifications are not excluded from the scope of the present invention.

What is claimed is:

1. A PRML regenerating apparatus for regenerating a signal read by a head from a storage medium, comprising:

a waveform equalizing circuit for waveform-equalizing the read signal;

a maximum-likelihood decoder for maximum-likelihood-decoding a determination value by comparing the equalized output with upper and lower slice levels; and a phase synchronizing circuit for generating a clock which phase-synchronizes with the read signal, said phase synchronizing circuit including:

a ternary determination unit for making a ternary determination of the equalized output;

an error detector for detecting an offset error when the ternary determination value is zero using the equalized output of the read signal from within a gap pattern, and holding this offset error;

a subtractor for subtracting the detected offset error value from the equalized output when the ternary determination value is zero;

a phase comparator for calculating a phase error value from the equalized output undergoing the subtraction and the ternary determination value; and a voltage control oscillator for generating a synchronous clock having a phase corresponding to the phase error value.

2. A PRML regenerating apparatus according to claim 1, wherein said error detector outputs the detected error value to said subtracter when the ternary determination value is zero.

* * * * *